Inventor
Walter T. Gollwitzer
By Wallace and Cannon
Attorneys

June 7, 1955 W. T. GOLLWITZER 2,710,406
MACHINES FOR PRODUCING BUSINESS INSTRUMENTS
Filed Dec. 16, 1950 27 Sheets-Sheet 2
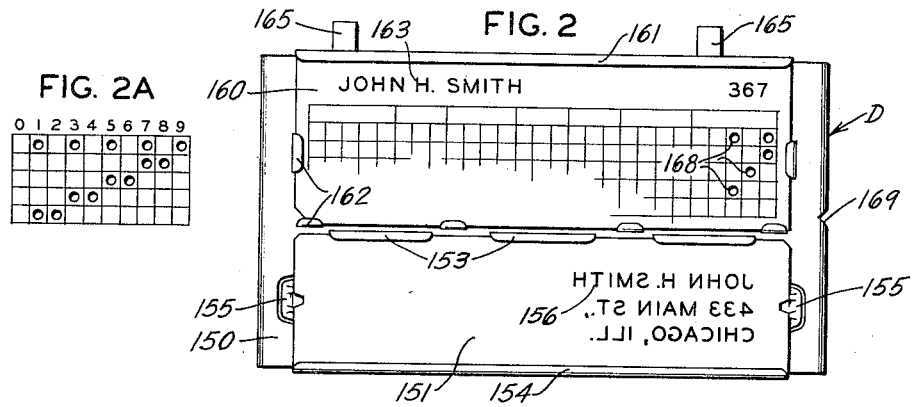
FIG. 2
FIG. 2A
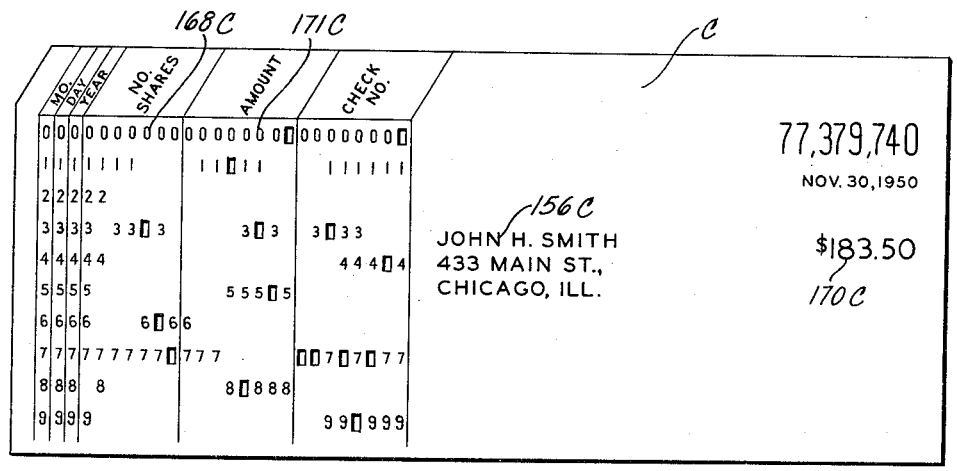
FIG. 3
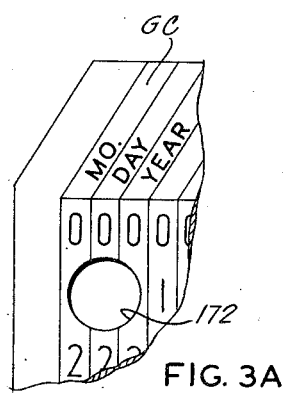
FIG. 3A
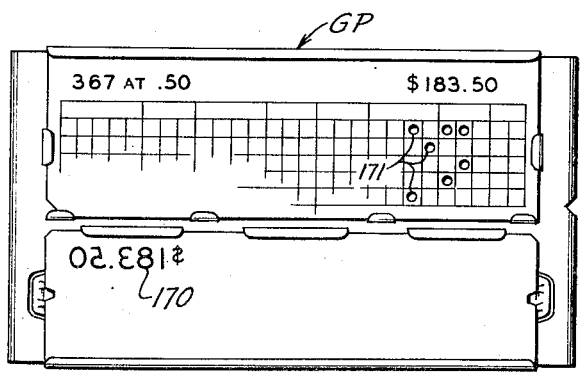
FIG. 3B
INVENTOR.
WALTER T. GOLLWITZER
BY Wallace and Cannon
ATTORNEYS June 7, 1955 W. T. GOLLWITZER 2,710,406
MACHINES FOR PRODUCING BUSINESS INSTRUMENTS
Filed Dec. 16, 1950 27 Sheets-Sheet 3

Inventor
Walter T. Gollwitzer
By Wallace and Cannon
Attorneys

June 7, 1955  W. T. GOLLWITZER  2,710,406
MACHINES FOR PRODUCING BUSINESS INSTRUMENTS
Filed Dec. 16, 1950  27 Sheets-Sheet 7

Inventor
Walter T. Gollwitzer
By Hallock and Cannon
Attorneys

June 7, 1955

W. T. GOLLWITZER 2,710,406

MACHINES FOR PRODUCING BUSINESS INSTRUMENTS

Filed Dec. 16, 1950

Inventor
Walter T. Gollwitzer
By Wallace and Cannon
Attorneys

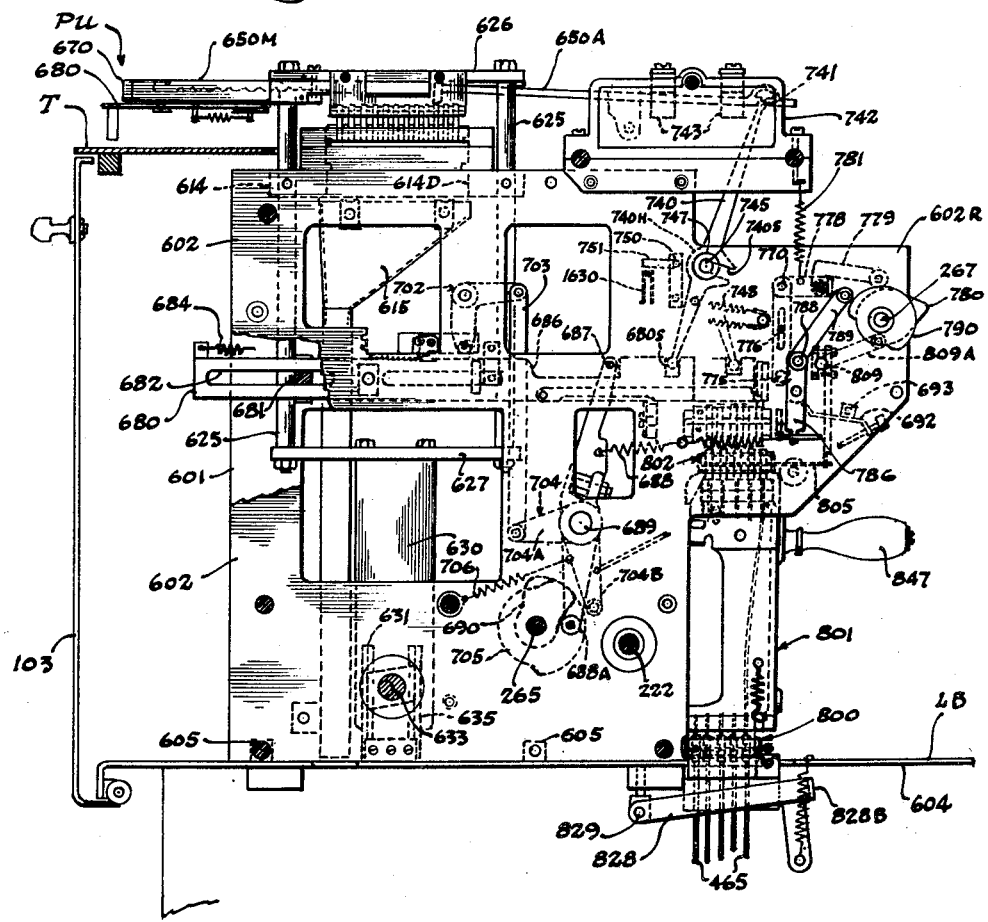

June 7, 1955 W. T. GOLLWITZER 2,710,406
MACHINES FOR PRODUCING BUSINESS INSTRUMENTS
Filed Dec. 16, 1950 27 Sheets-Sheet 10

Inventor
Walter T. Gollwitzer
By Wallace and Cannon
Attorneys

June 7, 1955 W. T. GOLLWITZER 2,710,406
MACHINES FOR PRODUCING BUSINESS INSTRUMENTS
Filed Dec. 16, 1950 27 Sheets-Sheet 11

Inventor
Walter T. Gollwitzer
By Wallace and Cannon
Attorneys

June 7, 1955   W. T. GOLLWITZER   2,710,406
MACHINES FOR PRODUCING BUSINESS INSTRUMENTS
Filed Dec. 16, 1950   27 Sheets—Sheet 14

Inventor
Walter T. Gollwitzer
By Wallace and Cannon
Attorneys

June 7, 1955  W. T. GOLLWITZER  2,710,406
MACHINES FOR PRODUCING BUSINESS INSTRUMENTS
Filed Dec. 16, 1950.  27 Sheets-Sheet 15

Inventor
Walter T. Gollwitzer
By Wallace and Cannon
Attorneys

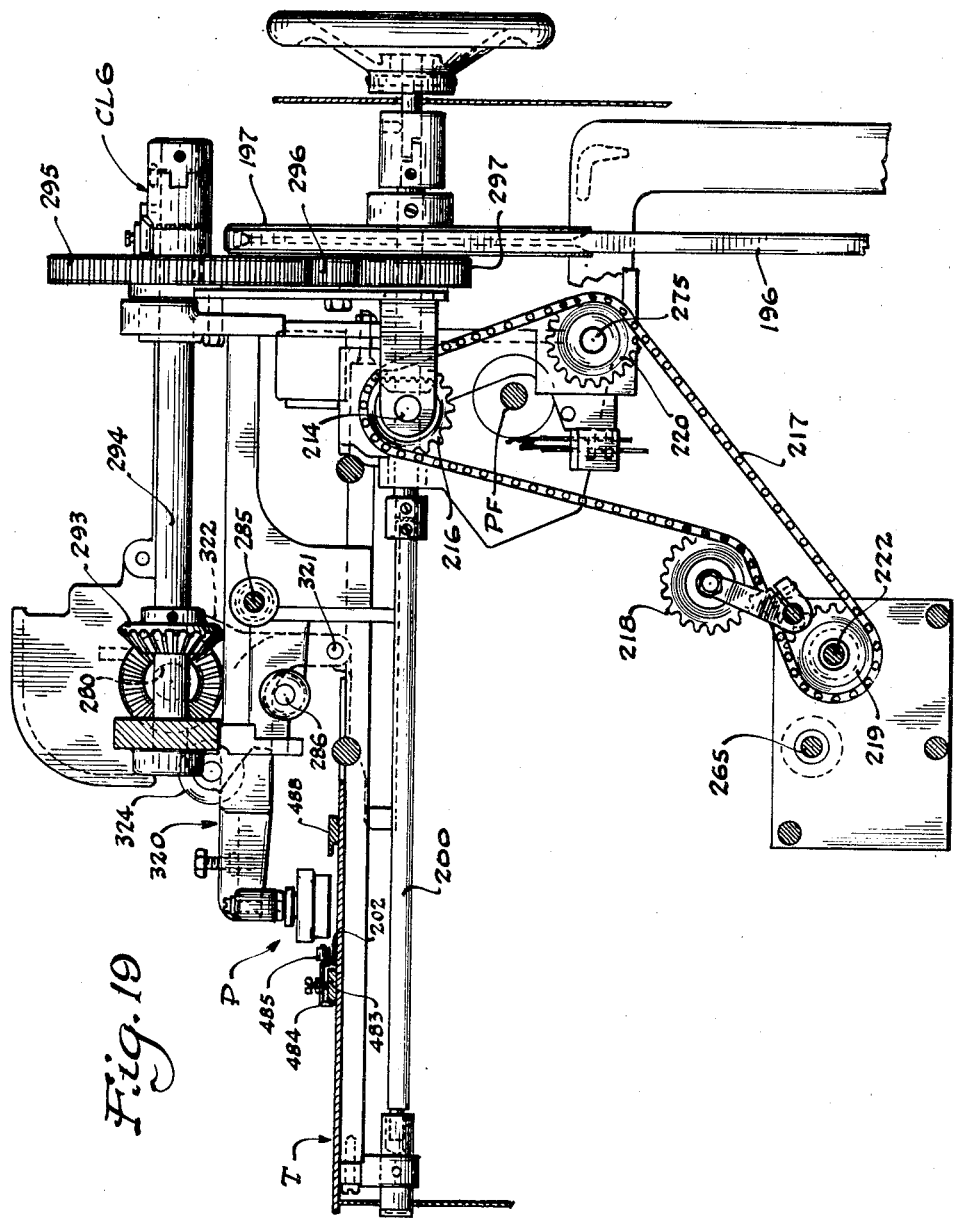

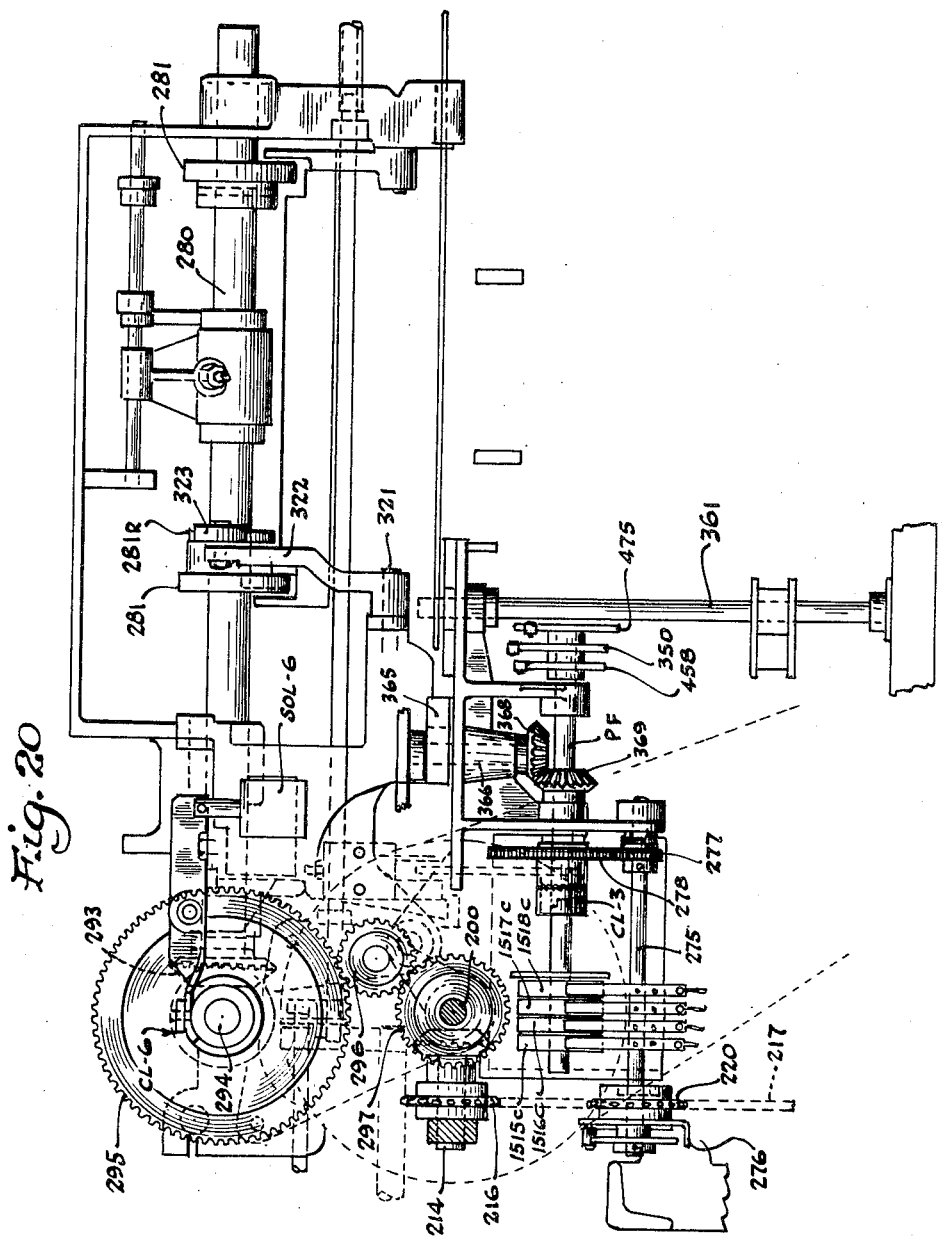

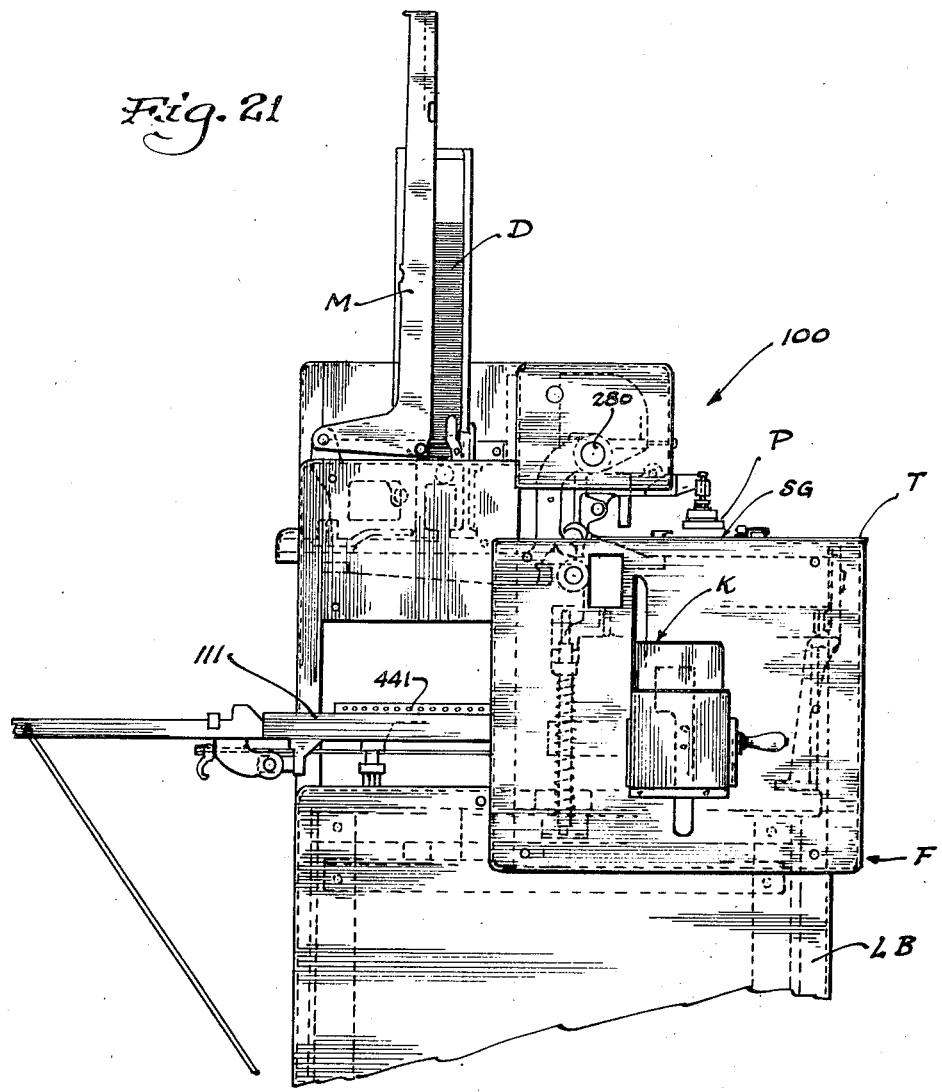

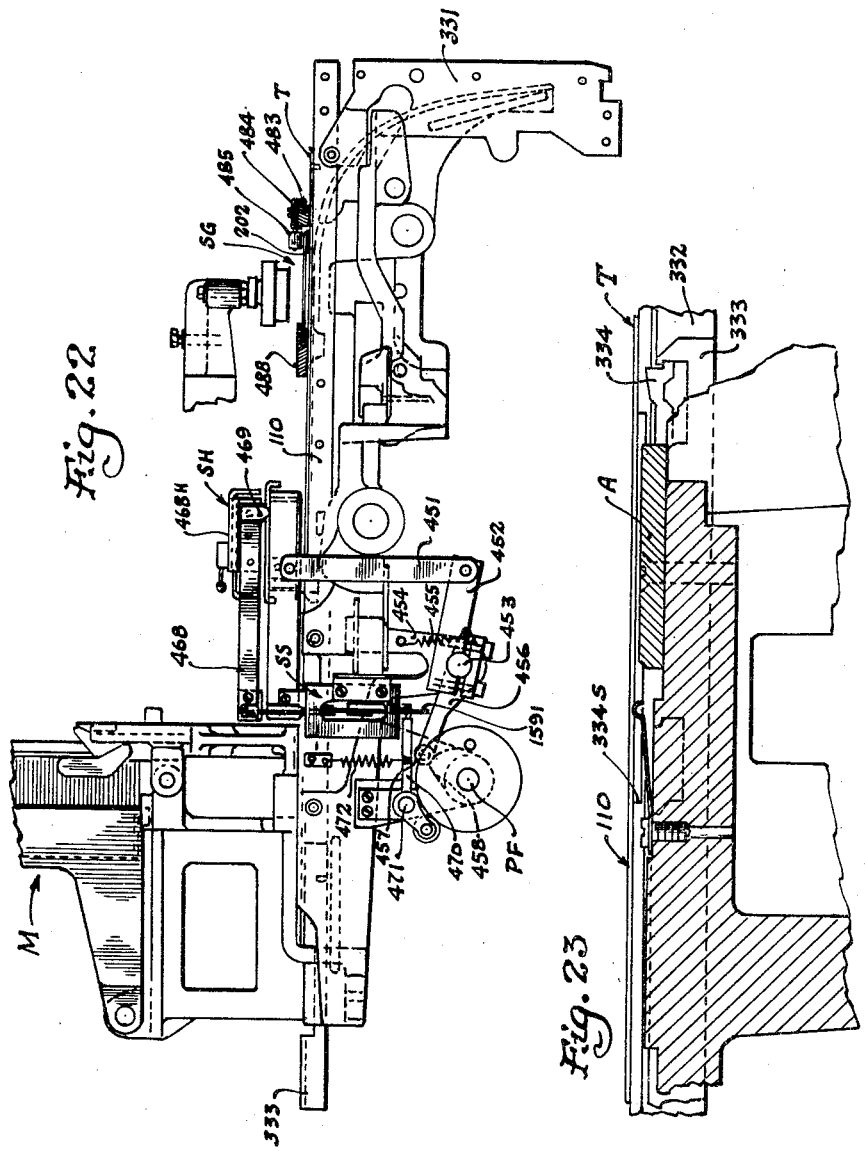

June 7, 1955  W. T. GOLLWITZER  2,710,406
MACHINES FOR PRODUCING BUSINESS INSTRUMENTS
Filed Dec. 16, 1950  27 Sheets-Sheet 20

Inventor
Walter T. Gollwitzer
By Wallace and Cannon
Attorneys

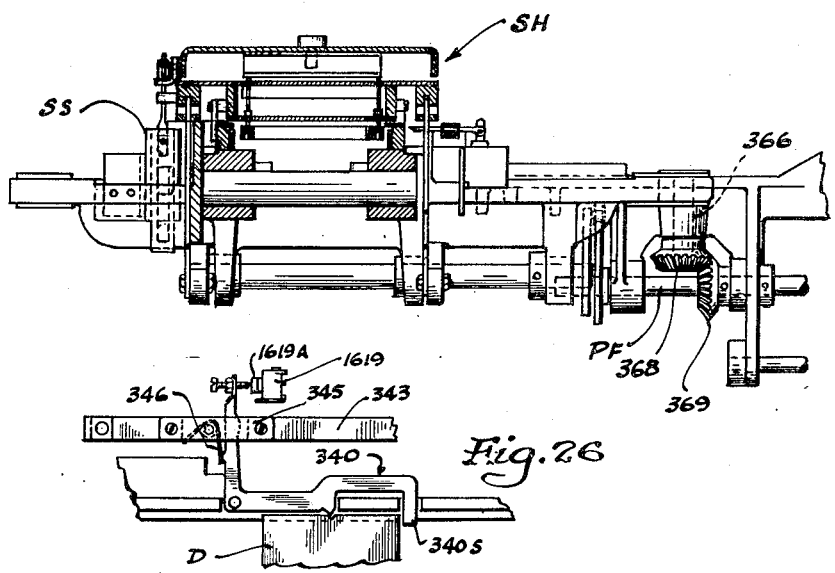
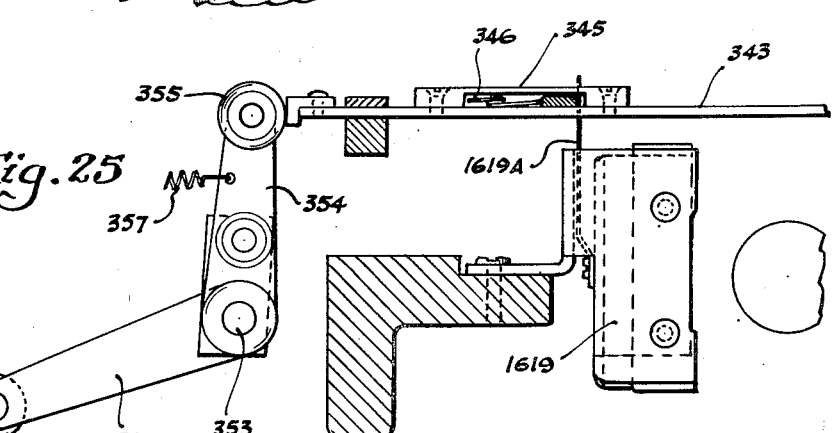
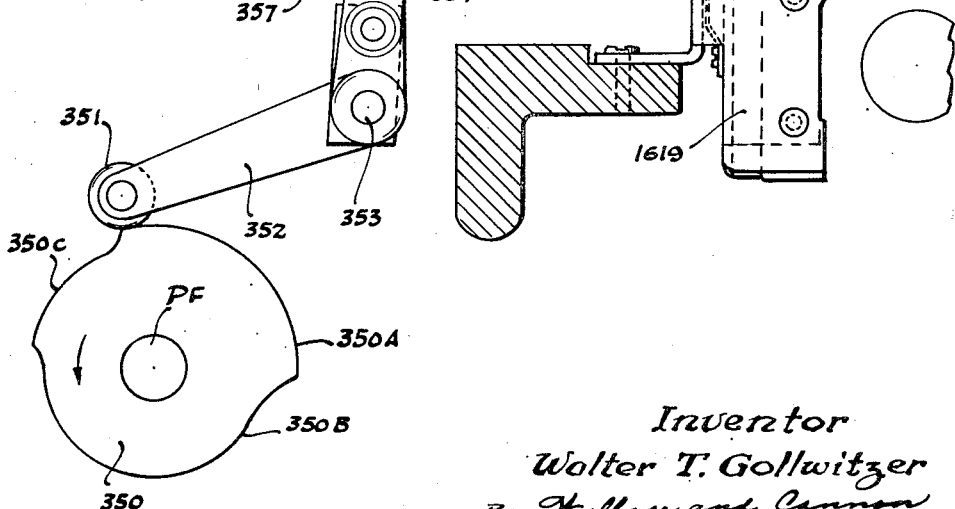

June 7, 1955 W. T. GOLLWITZER 2,710,406
MACHINES FOR PRODUCING BUSINESS INSTRUMENTS
Filed Dec. 16, 1950. 27 Sheets-Sheet 26

INVENTOR.
WALTER T. GOLLWITZER
BY Wallace and Cannon
ATTORNEYS

June 7, 1955 W. T. GOLLWITZER 2,710,406
MACHINES FOR PRODUCING BUSINESS INSTRUMENTS
Filed Dec. 16, 1950 27 Sheets-Sheet 27

INVENTOR.
WALTER T. GOLLWITZER
BY Wallace and Cannon
ATTORNEYS ns
2,710,406
MACHINES FOR PRODUCING BUSINESS INSTRUMENTS Walter T. Gollwitzer, Euclid, Ohio, assignor to Addressograph-Multigraph Corporation, Wilmington, Del., a corporation of Delaware Application December 16, 1950, Serial No. 201,102

13 Claims. (Cl. 101—19)

This invention relates to machines for producing business instruments such as checks, insurance premium notices, bills and the like.

In business establishments where bills, checks and the like are prepared in large numbers, it has been customary in many instances to prepare such business instruments through the use of individual printing and control devices such as the printing and control devices illustrated in my Patent No. 2,132,412, patented October 11, 1938. Such printing and control devices embody a carrier or frame having one or more printing plates fixed thereon and such printing plates are provided with embossed type which may be utilized for printing numerical amounts, and which may be used for printing the name and address and the other identifying data that may pertain to the person, company or the like, to which such printing devices may be assigned. In such printing and control devices as shown in my aforesaid patent, an upper area of the frame of the printing device is utilized for carrying physically represented information such as numerical data and such numerical data are represented as shown in such patent by perforations located in accordance with a predetermined positional code. Such printing and control devices also are arranged in most instances to carry identifying means such as tabs at one or more selected identifying positions along the upper edge thereof and these tabs may, of course, be formed and arranged in accordance with any of the systems known in the art which include full solid tabs, notched tabs and perforated tabs. The numerical data represented by the coded perforations in the printing and control devices may be sensed to control mechanisms in a machine so that such mechanisms may cooperate with the printing or other operative mechanism of such machine to produce a business instrument that includes not only printed impressions from the embossed type of the particular printing and control devices but other physical representations such as printed information or data representing perforations or the like made under control of the data representing perforations of the printing devices. Moreover, such printing and control devices may be selectively utilized in such printing machines through the use of selector mechanism that is responsive to the identifying means such as tabs that may be carried on the printing and control devices, and the control operation that is accomplished by the selector mechanism in such machines is effective primarily to govern the print-skip operation of such machines. In other words, under the control of the identifying tabs, the machine may be rendered effective to produce business instruments with respect to only a portion of the printing and control devices that may be passed through the machine.

In the production of business instruments of the aforesaid character on a large quantity basis in large establishments such as, banks, governmental agencies, utility billing departments and the like, it is of course desirable that a sustained high production rate be established, and it is the primary object of the present invention to enable this to be accomplished in a novel manner. A further and related object is to enable such hgih production to be accomplished whether the business instruments are being produced with a single printed impression thereon or whether such instruments are being produced with duplicate or other multiple numbers of printed impressions thereon from a particular printing and control device.

In printing machines utilized for producing business instruments in the past from individual printing and control devices, it has been customary to sense the data representations of each printing device in one machine cycle and to produce the printed impressions from such printing devices in the next or some succeeding cycle, and where this mode of operation has been utilized, the stopping of the machine at the end of any particular machine cycle has resulted in leaving a partially completed business instrument in the machine. This has in many instances been found to be undesirable, and a further and important object of the present invention is to enable such machines to be operated in such a way that the sensing and printing operations in respect to each printing and control device are performed in the same machine cycle, thereby to insure that upon stoppage of the machine at the end of a machine cycle, there will be no partially processed business instrument left in the machine.

Another important object of the present invention is to afford a novel machine of the aforesaid character in which the data representations of the printing and control devices are sensed and the mechanism to be operated under control thereof set up in such a way as to increase the production rate of such machines. Other and related objects are to enable this to be accomplished in such a way that stopping of the machine will not cause an unnecessary lapse in the production of the machine, or in other words, so as to avoid the necessity for special operations in respect to those printing devices or business instruments that are in the machine at the time when the machine is stopped, as for example, in response to the safety mechanisms in the machine.

Another object of the present invention is to provide a machine of the aforesaid character in which supplemental operations such as punching are performed in addition to the printing operations, and to enable such machines to be constructed in such a way that the machine may readily be converted or set for production of documents having either individual printed impressions or multiple printed impressions, and to enable this to be done through the use of interchangeable control elements that may readily be removed and put in place. A related object is to afford a supplemental mechanism such as a punch that is set up in such a way that the setting of the mechanism is maintained until the end of a machine cycle, thereby to simplify the completion of a proper business instrument in the event that a faulty paper or card feed operation is encountered. More specifically, it is an object of the present invention to afford such a machine in which the punching elements are restored in the early stages of each machine cycle and then thereafter set up to thereby simplify the production of a proper document where a faulty card or sheet feed is encountered.

Another important object of the present invention is to enable the sensing of the data perforations of a printing and control device to be accomplished early in the machine cycle, and to preserve this sensed pattern for set up of the punching mechanism after the actual sensing mechanism of the machine has completed its operation; and a related object is to enable the sensing operations to be performed in such a way that the subsequent feeding or advancing movement of the printing device may be initiated even before the related mechanism such as a punch mechanism has been set up, thereby to simplify the attainment of a machine cycle wherein the printing and punching operations relating to a particular printing device may be performed in a single machine cycle.

Where numerical data are represented as by perforations in a printing and control device, such data are of course represented in what may be termed particular orders or positions on the printing and control devices, and in the preparation of a business instrument from and under control of the printing devices, it is often desirable to reproduce the numerical data in what may be termed a different order or column of the check or bill that is being produced, and to simplify the attainment of this result is another object of the present invention. A further and related object is to afford a data transfer frame adapted to be interposed between the data sensing mechanism and the set up mechanism of the controlled unit such as a punch, and to afford such a transfer frame in a form such that it may be readily set up and may be readily put in place in the data transmitting train between the sensing mechanism and the controlled unit. Other and related objects are to so arrange such a transfer frame in such a way that the elements of a punching apparatus which are normally set up automatically may at the will of the operator be placed under manual control, and to accomplish this in such a way that the normal automatic operations in the punching unit may remain undisturbed.

In punching mechanism for producing data representing perforations in cards or business instruments, it is essential that the punch guiding block and the cooperating die block be accurately formed and related to each other so that the data representing perforations will be properly located and related in the business instruments produced thereby, and a further object of the present invention is to simplify the attainment of such an accurately produced structure. More specifically, it is an object of the present invention to afford a novel and advantageous method of producing the punch blocks of such a machine so that the accuracy desired may be attained in a relatively economical manner.

Where a punch is controlled through the use of shiftable interposers for selectively punching a business instrument or the like, there is a possibility that the interposers that are automatically set will become blocked so as to prevent proper restoring movement thereof and since there is usually a positively applied force somewhere in the train of motion in the restoring mechanism, there is a possibility in such instances that the train of mechanism will become distorted or broken in such instances, and to enable this possibility to be avoided is another object of the present invention. A related object is to accomplish the restoring movement of the interposers in such instances through the use of levers that are yieldingly maintained in a pivoted relationship and which are adapted to shift against such yielding forces to a displaced relationship when an interposer is blocked in its actuated position, and to enable such displacement of the transmitting levers to stop operation of the machine in such an instance.

Where a sheet or card is being fed to an operating position such as a punching position, it is of course desirable that the sheet be stopped in an accurate relationship with respect to the operating mechanism, and in many instances it is desirable to provide for changing this positioning of the sheet, and to simplify the attainment of such accurate positioning as well as the changing of such position is still another object of the present invention. More specifically it is an object of the present invention to afford a new and improved stop finger structure for locating sheets at an operating position in a machine of the aforesaid character.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 2 is a face view of a printing and control device that is adapted to be used in the machine of Fig. 1;

Fig. 2A is a view showing a five element numerical code utilized in forming data representing perforations in the printing and control device of Fig. 2;

Fig. 3 is a face view of a business instrument in the form of a card check produced by the machine of Fig. 1;

Fig. 3A is a fragmental face view of a group control card utilized in controlling operation of the machine in group printing;

Fig. 3B is a face view of a representative group printing device utilized in the machine when it performs group printing operations;

Fig. 7A is an enlarged sectional view taken substantially along the line 7A—7A of Fig. 7 and showing details of construction of the stop finger rocker;

Fig. 9 is a vertical sectional view taken substantially along the line 9—9 of Fig. 8;

Fig. 9A is a detail view of the transverse card feed and guideway;

Fig. 10 is a vertical sectional view taken along the line 10—10 of Fig. 8;

Fig. 10A is an enlarged portion of Fig. 10 showing details of the rack bar locking mechanism;

Fig. 16A is a sectional view along the line 16A—16A of Fig. 16;

Fig. 19 is a vertical sectional view taken substantially along the line 19—19 of Fig. 18;

Fig. 20 is a vertical sectional view taken substantially along the line 20—20 of Fig. 18;

Fig. 21 is an end elevational view of a portion of the machine as viewed from the left in Fig. 1;

Fig. 22 is a vertical sectional view taken substantially along the line 22—22 of Fig. 18;

Fig. 23 is an enlarged fragmentary vertical sectional view taken substantially along the lines 23—23 of Fig. 18;

Fig. 24 is a vertical sectional view taken transversely of the printing device guideway and substantially at the rear edge of the sensing station;

Fig. 25 is a vertical sectional view illustrating the operating means for the positioning pawl at the sensing station;

Fig. 26 is a plan view of this positioning pawl and showing its operative relationship to the operating means;

Fig. 28A is a front perspective view of the collecting tray and the packer mechanism;

The machine in general

Figure 1:
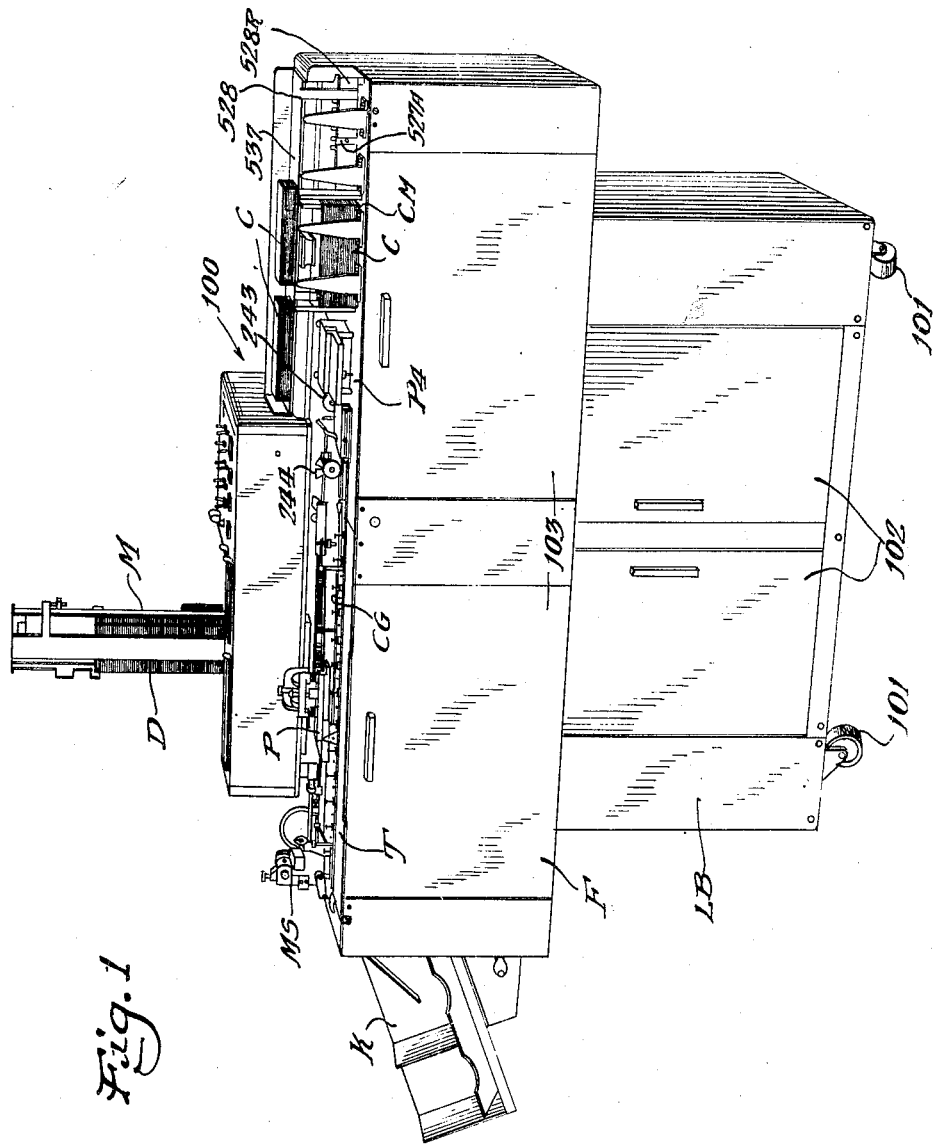
Fig. 1 is a front perspective view of a machine embodying the features of the invention.
Figure 4:
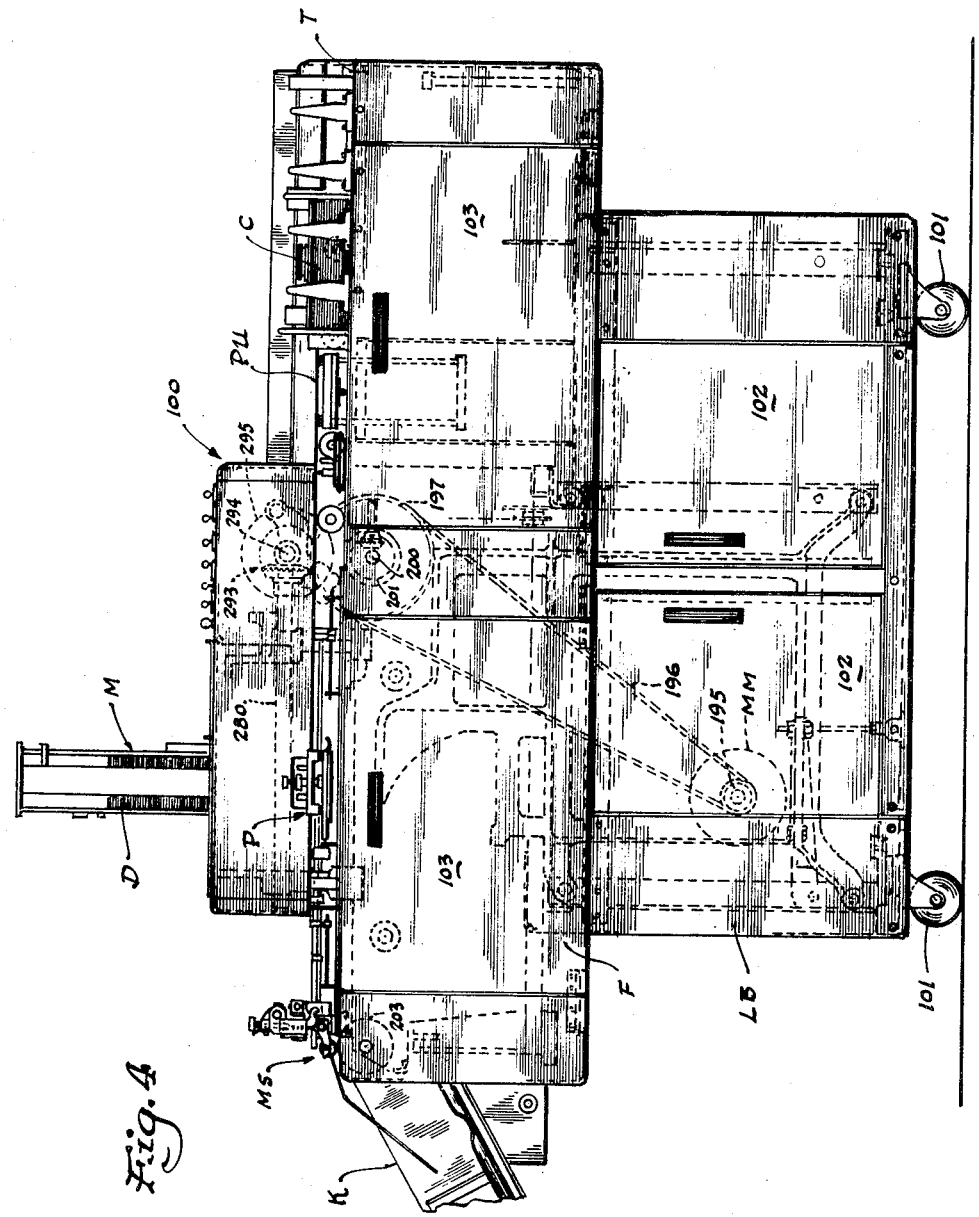
Fig. 4 is a front elevational view of the machine.

For the purpose of disclosure the invention is herein illustrated as embodied in a printing machine 100 that is adapted to produce business instruments such as bills, checks and the like in the form of tabulating cards containing printed data, as well as physically represented data afforded by means of perforations in the cards, and such documents in the form of cards C are produced from and under control of printing devices D that are passed through the machine. The machine 100 has a main enclosed frame F that is supported on top of a lower base LB which in the present instance is mounted on casters 101. The lower base LB has access doors 102 afforded as parts of the usual enclosing cover plates, and the upper frame F is similarly provided with access doors 103 as well as other removable cover plates whereby access may be had to mechanism enclosed within the frame. The machine frame F also affords a table top T that is relatively elongated and which has an elongated card guideway CG extended along what may be termed the forward edge portion of the table top. The cards C are supplied to a card magazine CM which in the present instance is adjustable as to its overall size so as to provide for handling cards C of different lengths, and these cards C are discharged edgewise or in a rearward direction one by one from the bottom of the card magazine CM and into the card guideway CG and are thereafter fed along the card guideway by means to be hereinafter described into cooperation, first, with a punching unit PU, which produces the desired coded perforations in the card C, and such card C is thereafter advanced in a left-hand direction, as viewed in Fig. 1, into a printing position beneath a platen P whereby a printed impression may be made from the printing means of a printing device D onto the card C, and the card is thereafter released from printing position and is discharged through a micrometer sensing or safety device MS into a collector hopper K that is afforded at the left-hand end of the machine as viewed in Fig. 1.

The printing devices D are stacked in a magazine M that is located at the rear edge of the machine in an upstanding relationship and in front to rear alignment with the printing position that is defined by the platen P. The printing devices D are withdrawn one by one from the bottom of the magazine M and are advanced in step-by-step manner forwardly along a printing device guideway 110, and in the first such movement, the printing device is advanced from magazine M into a sensing position that is defined by and located beneath a sensing head SH that is of the general character shown in my co-pending application, Serial No. 58,742, filed November 6, 1948, and while the printing device D is at rest in this sensing position, the sensing head SH is moved downwardly through a sensing stroke and physically represented data on the printing and control device D are sensed and this sensing is effective as will hereinafter be described to set up certain of the control elements of the punching unit PU so that such data may thereafter be represented by perforations formed in a card C by the punching unit PU. In the course of such sensing operation, other representing means or identifying means on the printing and control device D are sensed as described in my aforesaid copending application to determine whether or not a document is to be produced from and under control of such printing device, and this may be referred to as a sensing operation to determine the print-skip functioning of the machine as a whole. After the performance of the aforesaid sensing operation by the sensing head SH, the printing device is in the same machine cycle, advanced into the printing position wherein it is located over an anvil A that is afforded in the printing device guideway 110, such anvil A being disposed beneath the platen P and cooperating in defining the aforesaid printing position. While the printing device D is in position at the printing station, and in the same machine cycle, a printing operation may be performed therefrom by operation of the platen P, and the printing device is thereafter, in the next machine cycle, advanced forwardly along the printing device guideway and is then directed downwardly into the forward end of a collecting tray 111 which has packer mechanism associated therewith and operated in timed relation to the printing device feed mechanism. This printing device or plate feed mechanism is designated in a general way as the plate feed unit 120, Fig. 5.

The printing and control device D

The printing and control device D may, of course, take many different forms, but, as herein illustrated in Fig. 2, such devices D are of the general form shown in Walter T. Gollwitzer Patent No. 2,132,412, patented October 11, 1938. This printing device D comprises a carrier 150 that is rectangular in form and which has spacing flanges (not shown) along its opposite end edges. In the lower portion of the forward face of the frame 150, an embossed printing plate 151 is secured by means including stationary retaining elements 153, a rolled lower edge 154 and spring retaining devices 155. In the present instance, the plate 151 has the name of the person to whom the printing device is assigned embossed thereon as at 156, and data such as the number of shares of stock owned by such person may be embossed thereon as at 157. In the area of the frame 150 above the printing plate 151, an index card 160 is mounted by means including a curled-up edge 161 and stationary retaining devices 162, and a portion of the information contained on printing plate 151 may be printed thereon as at 163. Along the upper edge of the frame 150 a plurality of mounting sockets are provided in the usual manner, and in these sockets, identifying means such as tabs 165 may be selectively mounted. The tabs 165 may, of course, be of solid form, notched form, or perforated form, in accordance with practices well known in the art, and by the selective mounting and perforation or notching of these tabs, a large number of different identifying characteristics for the printing devices may be physically represented on such printing devices so that these characteristics may be sensed through operation of the sensing head SH.

A portion of the area occupied by the index card 160 is allocated in the present instance to the physical representation of numerical data that is to be reproduced by perforations on the cards C, and this numerical data in the present instance is represented in such area of the printing device in accordance with a five-element code that is illustrated in Fig. 2A of the drawings. These perforations 168 may be formed through the index card 160 and the frame 150 in accordance with the code of Fig. 2A, and these perforations 168 may be sensed through the action of the sensing head SH and the sensed numerical data may be transferred to the punching unit PU so as to control the setting and operation thereof, as will hereinafter be described. Where data is represented by tabs 165 and by perforations 168 in a printing and control device, it is essential that such printing and control device be accurately located or positioned during the sensing operation, and to enable this to be readily accomplished, each printing device D has a V-notch 169 formed in one end edge of the frame 150, as described in the aforesaid Walter T. Gollwitzer Patent No. 2,132,412, patented October 11, 1938.

The card C

The card C that is produced by the present machine may, or course, take many different forms so that it may constitute a check or a bill, and it may be of solid form or it may be of sectional form. In the present instance the card C is illustrated as having the size and proportion of the usual Holerith tabulating card that is provided with space for eighty vertical columns of punched data and wherein each column has twelve positions representative of zero, the digits 1 to 9, and two additional factors usually identified as the "X" and "R" positions. In the present machine, the punching unit PU is arranged to have a forty-column capacity and in the card C, as illustrated in Fig. 3 of the drawings, the left-hand forty columns have been positioned for cooperation with the punching unit PU. It will be recognized, of course, that any forty columns of the card C might be utilized where a single punching operation of the punching operation of the punching unit PU is relied upon, or that by successively positioning the card C in two different positions along the card guideway CG, punched representations might be formed in all of the eighty columns of the card.

The card C as herein shown is one which has been produced by the process of group printing, as will hereinafter be described, and in such process the card is first passed through the machine to have a printed impression 156C formed thereon from the correspondingly numbered type on the printing plate 151, and at the same time to have the data represented by the perforations 168 in the printing and control device D reproduced in accordance with the ten-unit positional code at 168C in the card C. It will be recognized that other data such as ledger numbers, dates and the like may be represented by other perforations formed either by previous gang punching of the cards that are to be passed through the machine, or produced under the control of manually settable means embodied in the punching unit PU, as will hereinafter be described. After such initial printing, the cards C are sorted into groups according to the number of shares represented at 168C, and these groups are arranged in the card magazine CM with a group card GC, Fig. 3A, disposed as the first or leading card in each of such groups. The magazine M is loaded with a series of group printing devices GP, Fig. 3B, allocated to and arranged in the same order as the groups of cards, and the corresponding group printing device is retained at printing position while all of the cards C of the related group are passed through punching and printing positions. Each group printing device GP has the extended money amount relating to the particular group represented thereon by embossed type 170 on a printing plate 151A forming part of the printing device, and it also has this figure represented by perforations 171. Such perforations are effective to set up the punch unit PU for punching this amount in the card C at 171C, while the type 170 is effective to print the amount at 170C on the cards C. The group card GC has a large perforation 172 therein which is sensed, as will hereinafter be described, to cause a new group printing plate GP to be fed into sensing and printing positions upon completion of each group of cards C.

It will be recognized that the money amount could be printed directly from the printing device D, but that for illustrative purposes the more complicated method of group printing has been selected in order that the capabilities of the present machine may be more fully described.

The driving and control connections

Under and in accordance with the present invention the production rate of the machine is maintained at the maximum by so constructing and arranging the machine that the over-all cycle may be held at the minimum consistent with the performance of the required number of printing or other data representing operations.

Figure 6:
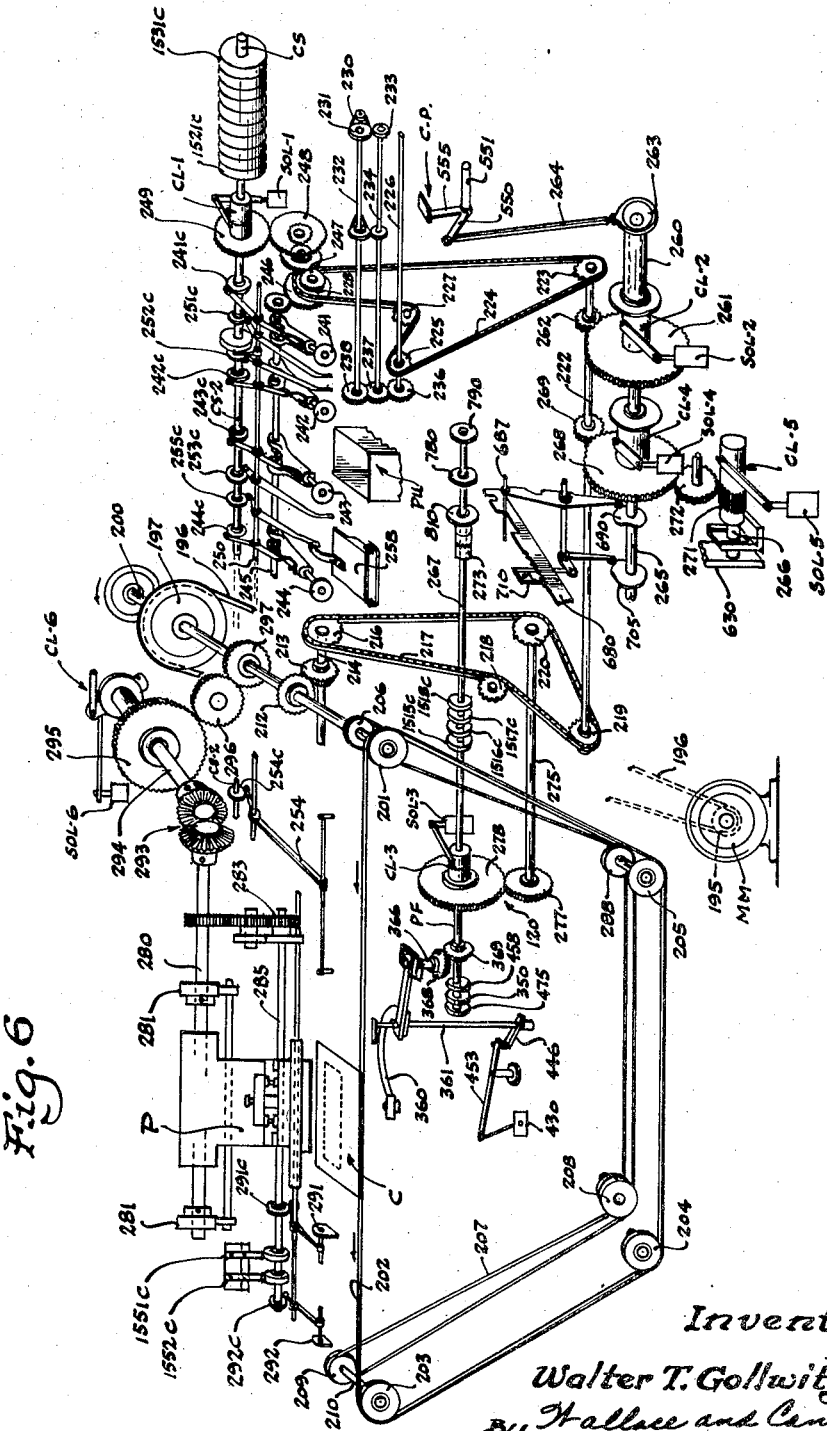
Fig. 6 is a schematic and partially perspective view illustrating the drive-transmitting means and the related control clutches of the machine.

In accomplishing this advantageous operation and control, the driving and control elements of the machine are arranged and related in the manner shown diagrammatically in Fig. 6 of the drawings. Thus, the main motor MM has a belt connection afforded by a motor pulley 195, a belt 196, and a main pulley 197 to a main drive shaft 200 that extends horizontally from front to rear of the machine just beneath the table top T and between the punch unit PU and the printing station, and this main shaft 200 is operated constantly and serves to drive certain constantly operating elements of the machine as well as to afford constantly operating drive source for the several independently clutched elements or units of the machine.

Thus, the main shaft 200 has a pulley 201 fixed thereon for driving an endless card feed belt 202 that has its upper run extended along and in the card feed guideway CG from a point adjacent to the punch unit PU to the discharge end of the guideway, and at such discharge end of the guideway, the belt extends over a pulley 203 and thence downwardly and about two spaced guide pulleys 204 and 205. The pulley 203 is also driven so as to maintain the belt 202 taut within the guideway and this is accomplished by a drive pulley 206 on the shaft 200, and a belt 207 extended about guide pulleys 208 and to a pulley 209 that is fixed to the same shaft 210 as the pulley 203.

Rearwardly of the pulley 206, the shaft 200 has a bevel gear 212 fixed thereon and meshing with a bevel gear 213 fixed on a horizontal and transversely related shaft 214. On the other end of the shaft 214 a sprocket 216 is fixed and an endless chain 217 extends about this sprocket 216 beneath an idler sprocket 218 and about a pair of sprockets 219 and 220 that are disposed on fixed axes. The sprocket 219 is fixed on a horizontal shaft 222 which extends to the right past the punching unit PU and on its right hand end, the shaft has a sprocket 223 fixed. An endless chain 224 extends about the sprocket 223 and upwardly over and about a sprocket 225 that is fixed on a shaft 226, and the chain then extends rearwardly beneath an idler sprocket 227 and then upwardly and over a sprocket 228 from which it extends downwardly to the sprocket 223.

The shaft 226 serves as a drive for a plurality of transverse feed belts 230 that are over a part of the card guideway CG opposite the card magazine CM. The feed belts 230 are arranged in relatively deep annular slots or grooves in upper feed rollers 231 that are fixed on a shaft 232, and beneath the feed rollers 231, opposed feed rollers 233 are arranged and are fixed on a drive shaft 234. The feed rollers 231 and 233 cooperate to continue the infeeding movement of each card C after the card has been projected for a short distance from the magazine by a reciprocating card picker CP, and after discharge of the card from the bight of the rollers 231 and 233, the feed belts 230 become effective to complete the in-feeding movement as will be described. Gears 236, 237 and 238 meshed in series, are fixed respectively on the shafts 226, 234 and 232 to transmit drive from the constantly operated shaft 226.

The sprocket 228 also serves to drive a series of card feed wheels 241, 242, 243 and 244 that are disposed in spaced relation along and over the card guideway CG and are arranged to be lowered into engagement with the cards at certain times in the cycle as will be described. These card feed wheels are of similar form and each is mounted on the forward end of a shaft 240S that is carried in a frame 240F which is pivotally carried on a longitudinal drive shaft 245. The wheel supporting shafts 240S are geared to the shaft 245 so as to be driven thereby, and this shaft 245 has a pinion fixed thereon which is meshed with a gear 246 that is fixed to the sprocket 228 so that the shaft 245 and the associated feed wheels are constantly driven.

Figure 11:
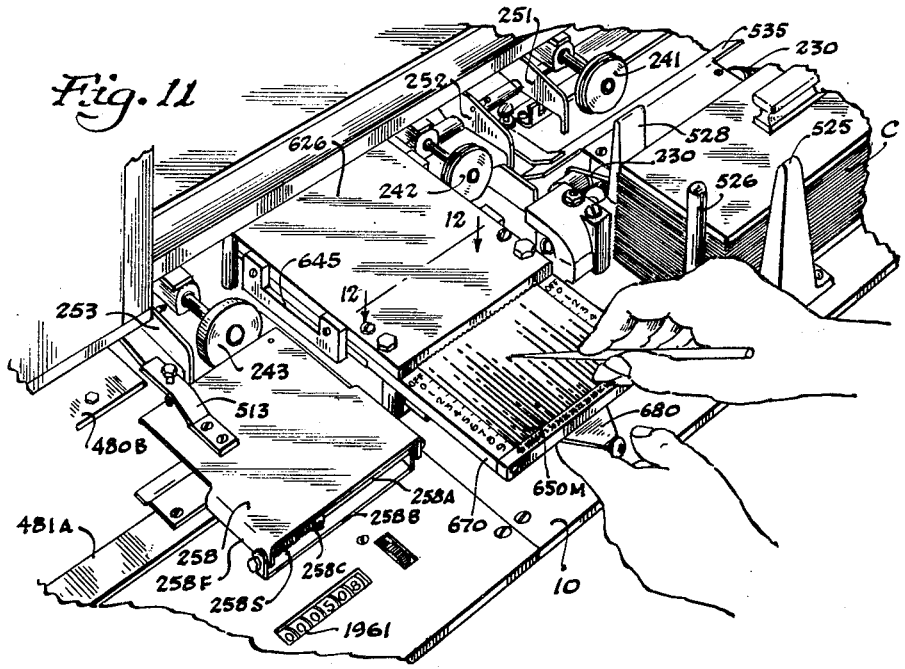
Fig. 11 is a perspective view illustrating the punch unit and particularly the manually settable portions thereof.

The sprocket 228 also has a pinion 247 fixed thereto which is associated by means including a replaceable change gear 248 with a gear 249 which is loosely mounted on one section CS–2 of a main cam shaft CS, section CS–2 of which serves as a punch stop finger cam shaft and to operate or raise and lower the card feed wheels 241 to 244, while the section CS serves to carry a plurality of switch control cams 1521C to 1531C which exercise control on the machine operation as will be described hereinafter. A pivot shaft 250 is disposed forwardly of the shaft CS–2 and the cam shaft CS–2 has a cam 241C thereon which engages an arm 241A pivoted on the shaft 250 for raising and lowering the wheel 241; a cam 242C thereon which engages a similarly pivoted arm 242A for applying downward pressure to the wheel 242; a cam 243C thereon which engages a similarly pivoted arm 243A for applying downward pressure to the wheel 243; and a cam 244C thereon which engages a similarly pivoted arm 244A for applying downward pressure to the wheel 244. The cam shaft CS also has cams 251C, 252C, 253C and 254C thereon for operating the card sensing fingers 251, 252, 253 and 254, respectively, that are pivoted on the shaft 250 and disposed along the card guideway, and these sensing fingers are operated through card sensing operations in each rotation of the cam shaft CS. In addition, the cam shaft CS has a cam 255 thereon which operates a transmitting arm 255A which is pivoted on the shaft 250 and serves to raise and lower a stop finger rocker 258 that is disposed at the punching station for stopping the card C in the desired relation to the punch. This stop finger rocker is pivoted at its forward edge by a horizontal pivot 258A that extends through downwardly projecting ears on flanges 258F on the rocker. The pivot pin 258A is supported in a bracket 258B with the ears 258F disposed within or between the upstanding elements of the bracket as shown in Fig. 11. Accurate location of the rocker 258 is assured by affording the pivot 258A in the form of a bolt that may be tightened between the elements of the bracket, and by affording a spring 258S surrounding the pivot to the left of a collar 258C fixed on the pivot. The spring thus urges the rocker to the left and against the upstanding left element of the bracket.

The gear 249 serves as the driving element of a one revolution clutch CL–1 the driven element of which is fixed to the cam shaft CS, and the stop lever of this clutch may be released by operation of a clutch control solenoid SOL–1. This clutch, as well as the other one-revolution clutches to be described hereinafter, may be of the construction shown in my Patent No. 2,256,133, patented December 9, 1941.

The drive for the card picker CP includes an operating sleeve 260 mounted loosely on a shaft 265, and a gear 261 is loosely mounted on the shaft 265 adjacent the sleeve 260. This gear 261 is constantly driven by a pinion 262 fixed on the shaft 222. The gear 261 serves as the driving element of a one-revolution clutch CL–2, the driven element of which is rotatively fixed to the sleeve 260, and this clutch is governed by a solenoid SOL–2. The sleeve 260 has an eccentric 263 fixed thereon, and a connecting link 264 has a bearing surrounding such eccentric and is operatively connected to the card picker as will be described.

The punch unit PU includes three operating cam shafts that are afforded by the shaft 265 and additional shafts 266 and 267 as will be described hereinafter, the first cam shaft 265 being used primarily for restoring the set-up racks of the punch unit as will be described. This shaft 265 has a gear 268 loosely mounted thereon and constantly driven by a pinion 269 fixed on the shaft 222. The gear 268 constitutes the driving member of a one-revolution clutch CL–4, the driven member of which is fixed to the punch unit shaft 265, and a solenoid SOL–4 serves to control this clutch.

The shaft 266 serves to operate the punch ram, and has a toothed sleeve 271 loosely mounted thereon and connected to the gear 268 by an idler pinion 272. The toothed sleeve 271 constitutes the driving element of a one-revolution clutch CL–5, the driven element of which is connected to the punch ram operating shaft 266, and this clutch is controlled by a solenoid SOL–5.

The plate feed unit 120 includes a main operating shaft PF which is aligned with the shaft 267 of the punch unit PU and connected therewith by a universal joint 273 so that these shafts operate in unison. The shaft PF serves to drive the plate feed mechanism, the packer mechanism, the sensing head SH, and a plurality of switch operating cams 1515C to 1518C, as will be described hereinafter, and the shaft PF is driven from the sprocket 220. Thus, the sprocket 220 is loosely mounted on a shaft 275 and is connected thereto by an overload release 276. A pinion 277 fixed on the shaft 275 is meshed with a gear 278 loosely mounted on the shaft PF and this gear serves as the driving element of a one-revolution clutch CL–3, the driven element of which is fixed to the shaft PF. This plate feed clutch CL–3 is governed by a solenoid SOL–3.

The platen P is operated by a platen cam shaft 280 having cams 281 thereon for forcing the platen P through its printing stroke, and this shaft 280 serves through change gears 283 to drive a platen stop finger cam shaft 285. A stop finger pivot shaft 286 is mounted forwardly of the cam shaft 285. The shaft 285 has cams 291C and 292C fixed thereon which serve to operate stop fingers 291 and 292 that are pivoted on the shaft 286 and act to stop the card C in first and second positions beneath the platen P, it being noted that in consecutive operation the shaft 285 is driven in a one-to-one relation to the shaft 280 and that the finger 292 is blocked so that only the stop finger 291 is effective, while in duplicate operation the shaft 285 is driven in a one-half-to-one relation, and that the stop fingers 291 and 292 are effective successively to stop the card in successive printing positions. The stop finger cam shaft 285 also has switch control cams 1551C and 1552C thereon as will be described hereinafter.

The platen cam shaft 280 has a bevel gear connection 293 at one end thereof with a rearwardly projecting shaft 294, and on this shaft 294 a gear 295 is loosely mounted. The gear 295 is connected by an idler gear 296 with a gear 297 fixed on the main drive shaft 200. The gear 294, which is thus constantly driven, serves as the driving element of a one-revolution plate feed clutch CL–6, the driven element of which is fixed on the shaft 294, and this clutch is controlled by a solenoid SOL–6.

*The main cam shaft drive*

As hereinbefore pointed out, the main cam shaft CS is arranged so that it may be driven at different speeds, and the details of this drive are shown in Figs. 6, 7, 8 and 9 of the drawings. Thus, the gear 247 that is constantly driven by the sprocket 228 is meshed with the larger gear element 301A of a cluster gear which has a smaller gear element 301B. This smaller gear 301B has a gear 302 meshed therewith, and the gear 302 is mounted on a swingable arm 303 that is pivoted on the axis of the gears 301A and 301B. The gear 302 has a coupling element 302C rigid therewith, and this coupling element is adapted to be drivingly engaged with a coupling 248C that is formed on the change gear 248. This change gear 248 of course meshes with the gear 249, and when a gear 248 of a particular diameter is put in place, it is, of course, coupled with the gear 302 so as to be rotated thereby, and the gear 248 is moved into meshing relationship with the gear 249 by swinging movement of the arm 303. In this connection it should be observed that a knurled fastening element 305 is provided for fixing this change gear 248 in place, and this fastening element 305 is effective on the mounting stud to effect a clamping operation of such stud with respect to an arcuate slot 306 in which such stud is mounted so as to hold the arm 303 in such position that the change gear 248 is meshed with the gear 249. This arcuate slot 306 is centered on the axis of the gears 301A and 301B.

The cam shaft CS has a permanently mounted portion CS-2 upon which the driven element of the clutch CL-1 is fixed, and this section CS-2 serves as a mounting for the various cams that actuate the feed rolls and the sensing and stop finger mechanisms. To the right of the driven element of the clutch CL-1, the cam shaft CS is afforded as a removable or replaceable section that is joined to the driven element of the clutch CL-1 by a driving coupling 310 and at its other end is supported by a releasable supporting element 311. In this connection it should be noted that the cam shaft CS is removed upwardly, and that the switches 1521 to 1531 are supported rearwardly of the cams on a support bar 312 so as to facilitate the mounting and removal of the cam shaft section. This removable section of the cam shaft constitutes the support for the cams 1521C to 1531C and by removal and replacement of the cam shaft section just described, the machine is adapted for consecutive or duplicate operation as required.

*The platen P and its drive*

The platen P is of the stamper arm type and is carried on the forward end of a rocking frame 320 which, as shown in Figs. 19 and 20, is generally U-shaped in form so as to afford rearwardly and downwardly projecting supporting arms at opposite ends that are supported on pivoted pins 321 at substantially the level of the printing devices as such printing devices come to rest at printing position. The U-shaped frame 320 has an arm 322 adjacent one end thereof which has a cam roller 323 formed thereon which engages the rear edge of a return cam 281R on one of the cams 281, and this return cam 281R is effective to rock the frame 320 in a clockwise direction, Fig. 20, to its upper or raised position at which the platen comes to rest at the end of each printing cycle. Forwardly of the cams 281, the frame 320 has cam rollers 324 that engage the lower forward edges of the cams 281 and the cams 281 act on the rollers 324 to operate the frame 320 in a counterclockwise direction so as to move the platen P downwardly through a printing stroke.

*The printing device guideway and feeding means*

The printing device guideway 110 is afforded by a pair of spaced side rails 331 and 332, as shown in Figs. 18, 22, 23, 24, 25 and 26, and within and between these side frames, a pair of interconnected carrier bars 333 are mounted for reciprocating movement in a front to rear direction. The side frame elements 331 and 332 extend rearwardly of the machine frame so as to afford a support upon which the upstanding printing device magazine M is carried, and the lowermost printing device in the magazine is arranged to rest on the upper edges of the carrier bars 333. The carrier bars have one pair of feed shoulders and two sets of spring-pressed pawls 334 mounted therein in pairs that are spaced apart in such a way that in reciprocation of the carrier bars 333, the pair of feed shoulders and the two sets of pawls will engage and impart forward advancing movement to printing devices disposed respectively at the magazine M, the sensing station and the printing station. In this respect it should be observed that the spacing of the pairs of pawls 334 is such that in an advancing movement of the carrier bars 333, the printing plates at the magazine M and at the sensing station are engaged and movement thereof initiated sometime prior to the time in which the printing device at printing position is engaged, this being shown in the timing chart of Fig. 29, and in this way the printing device D that is at the printing station is allowed to remain in this station for a relatively longer period than heretofore so that impressions may be made from such printing device during this extended period of rest.

When a printing device is brought to rest either at the sensing station, or at the printing position, it is, of course, desirable to accurately locate such printing device, and for this purpose a pair of locating pawls 340 and 341 are pivoted on vertical axes on the side frame member 332 for cooperation with the V-notch 169. These pawls may take the form illustrated in the Carl J. Hueber Patent No. 2,359,851, patented October 10, 1944. In the present instance, however, these pawls 340 and 341 are operated by a reciprocating bar 343 that is shown in detail in Figs. 18, 25 and 26. This reciprocating bar has a pair of housing elements 345 mounted thereon on their upper faces so as to provide a slot 346 beneath such housing element and over the bar 343. Within one such slot, an arm 340A of the pawl 340 is extended, while an arm 341A of the pawl 341 extends into the other such slot 346. Within each such slot, a hairpin type spring 347 is mounted so that forward movement of the slide bar 343 is applied yieldingly to the respective arms 340A and 341A so as to urge these arms and the relating positioning pawls toward their effective positions. In the event that a printing device is not positioned in the sensing position, the arm 340A is effective upon the operating arm 1619A of a V-notch safety switch 1619 to open this switch, and as will hereinafter be described in detail, this is effective to stop the operation of the machine.

The slide bar 343 is arranged for operation by a cam 350 that is fixed on the plate feed cam shaft PF, and this cam 350 operates on a roller 351 carried on a rocking arm 352 that is fixed to one end of a shaft 353. On the other end of the shaft, an upwardly extending arm 354 is provided which has a roller 355 at its upper end which engages the rear end of the slide bar 343. This slide bar 343 is urged rearwardly by a spring 356, and the cam roller 351 is held in engagement with the cam 350 by a spring 357. The cam 350 has a dwell surface 350A that is relatively high and which is effective to hold the pawls 340 and 341 in their engaged position. In the rotation of the shaft PF, and when the printing devices are to be fed in a forward direction, the cam roller 351 rides off of the dwell surface 350A unto a relatively low dwell surface 350B which moves the pawls 340 and 341 out of the guideway 110. After the printing device has been completely moved out of the sensing position and before the new printing device is completely moved into this position, the cam roller 351 rides unto an intermediate dwell surface 350C which positions a stop finger 340S in the path of the advancing plate that is entering the sensing position, this being in accordance with the aforesaid Hueber patent. After the printing device has advanced until it strikes the stop finger 340S, the cam roller 351R rides unto the highest dwell surface 350A, thereby to move the pawls 340 and 341 into their fully effective positions.

Figure 18:
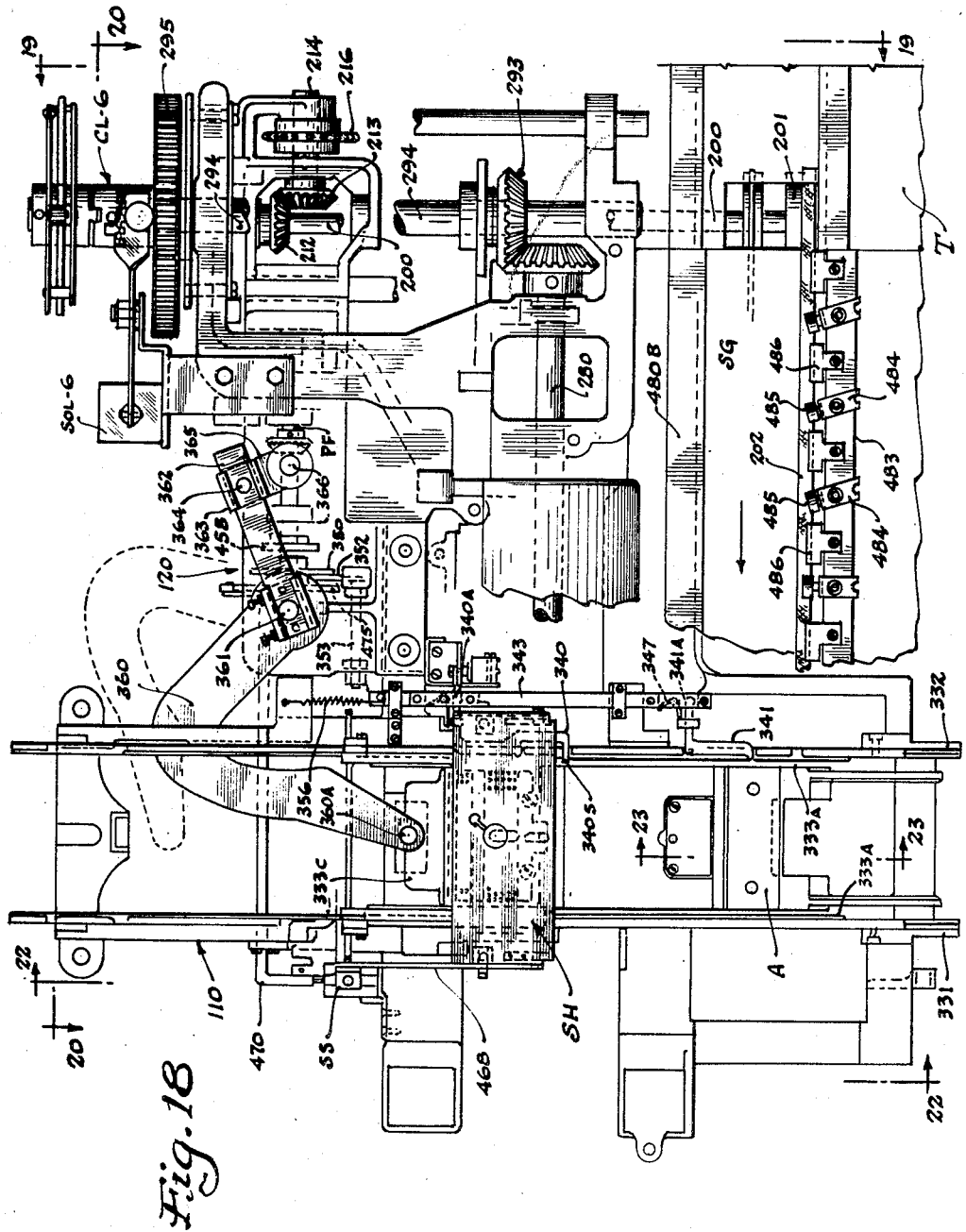
Fig. 18 is a plan view of the printing device guideway and related portions of the card guideway, the cover plates of the machine being removed to show details of internal structure.

The carrier bars 333 are connected by a cross member 333C, as shown in Fig. 18, and the forces for reciprocating the carrier bars are applied to this cross member. Thus, an operating arm 360, a generally V-shaped form, has one end pivoted at 360A on the cross member 333C, and at its other end the arm 360 is fixed on the upper end of a shaft 361. The shaft 361 also has an operating arm 362 fixed thereto and extends to the right therefrom, as viewed in Fig. 18, and this arm extends through a slidable bearing block 363 that is pivoted at 364 on the end of a driving arm 365. This driving arm is fixed on the upper end of a vertical shaft 366 so that the arm 365, the block 363 and the arm 362 constitute what may be termed a "Scotch yoke," which is effective to impart rocking movements to the shaft 361 and the arm 360 in the course of rotation of the shaft 366. The shaft 366 has a bevel gear 368 at its lower end that is meshed with a bevel gear 369 that is fixed on the plate feed cam shaft so that the shaft 366 is operated through one revolution each time the plate feed cam shaft PF operates through one revolution. It should be observed that the rest position of the arm 360 is such that the carrier bars 333 are in their forward positions, and in the course of an operation of the plate feed cam shaft PF, the carrier bars are withdrawn in a rearward direction in the first portion of the cycle of the shaft PF and are advanced in a forward direction in the subsequent portions of this cycle, as shown in the timing chart of Fig. 29.

*The packer mechanism*

Figure 28:
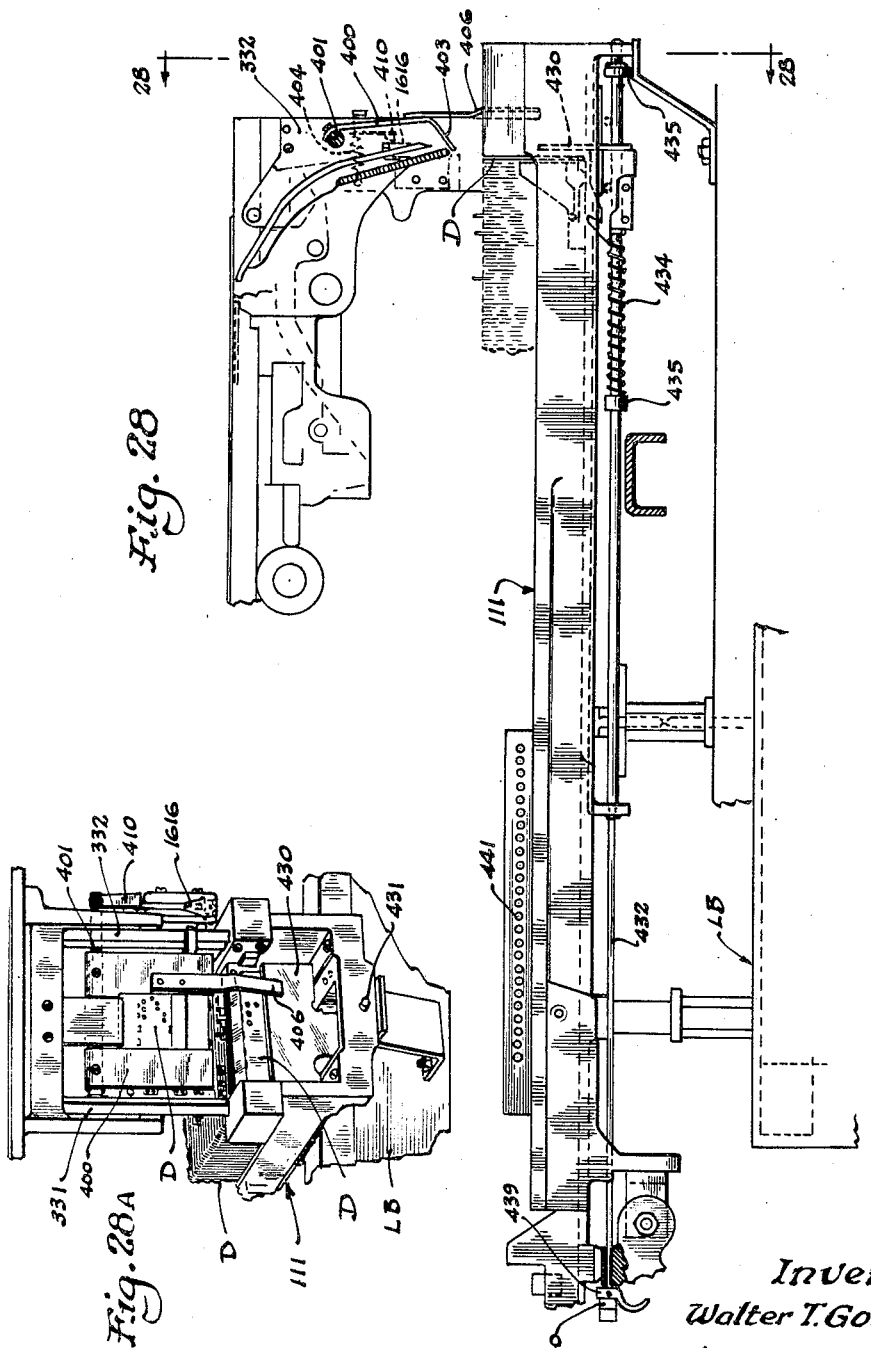
Fig. 28 is a side elevational view, taken partially in section and showing the collecting tray and the packer mechanism.

When a printing device is discharged from the printing position, it moves forwardly and then is allowed to slide downwardly into a generally vertical plane and comes to rest above the forward end of the collector tray 111 on a horizontally pivoted, depending plate drop member 400 that is fixed on a horizontally pivoted shaft 401 that is carried in the side frame members 331 and 332. Adjacent to its lower end, this plate drop member has rearwardly projecting supporting arms 403, and a spring 404 acting on the plate drop member normally pivots the lower end portion of this plate drop member into such a position that the arms 403 are disposed in the path of the downwardly discharged printing device D. Thus, each printing device comes to rest initially on the arms 403 of the plate drop member 400, and when a printing device D is to be discharged into the collector tray 111, the plate drop member 400 is rocked in a forward direction against the force of the spring 404 so as to withdraw the arms 403 from beneath the printing device, thus to allow such printing device to drop downwardly. This rocking movement is applied to the plate drop member 400 by means including a downwardly extending arm 406. If the printing device D drops downwardly beyond the arms 403, the plate drop member 400 returns to the normal position shown in Fig. 28, but if the printing device remains in the path of the arms 403, then upon release of the rocking force that has been applied to the plate drop member 400, the plate drop member 400 does not fully return to its normal position, and this characteristic of the present mechanism is utilized to exert a control action which stops operation of the machine. Thus, an operating arm 410 is fixed on the pivoted shaft at 401 outside of the side frame member 332, and a plate drop safety switch 1616 is placed in the path of the arm 410. The arrangement is such that the switch 1616 is opened when the plate drop member 400 is out of the normal position, and through cooperation of a timing switch that will hereinafter be described, the plate drop safety switch 1616 is effective to stop operation of the machine in the event that the printing device has not dropped downwardly beyond the plate drop member 400.

It will be observed that the plate drop member 400, as above described, does not have the usual plate packing functions, and such plate packing functions in the present instance are attained through the provision of an independently operable packer member 430 which is adapted for reciprocation within the collector tray 111 and which, as will hereinafter be pointed out, is effective to engage the lower end of the arm 406 and to impart the plate dropping movements to the plate drop member 400. The packer member 430 is mounted for reciprocation along a centrally located guide rod 431 that is mounted longitudinally of and beneath the collector tray 111.

The packer 430 is adapted to be released from its forward or packing position and to be withdrawn in a rearward direction so as to serve as a rake for pulling the collected printing devices D rearwardly for removal from the rearwardly projecting portion of the collector tray 111. Thus a withdrawing rod 432 is provided along the left-hand portion of the collector tray 111 as viewed in Fig. 27 and at its forward end this rod extends through the downwardly projecting lower portion of the packer 430. At its forward end the rod 432 has a nut 433 so that a rearward withdrawing movement of the rod 432, the packer 430 will likewise be moved. Rearwardly of the packer 430, the rod 432 has an expansive coil spring 434 arranged thereabout and acting at its rear end against a collar 435. When the rod 432 is moved in a forward direction, the packer 430 is moved toward its forward or operative packing position and when it reaches the position shown in Fig. 28, such forward movement of the packer is stopped by abutment of an ear 436, Fig. 27, with an operating arm 438 as will hereinafter be described. In further forward movement of the rod 432 the spring 434 is compressed, and the rod 432 is fixed in its forward position, with the spring 434 under compression, by engaging a locking arm 439 with a positioning notch 440 that is afforded in the tray 111. In the rearward withdrawing movement of the packer 430, at which time the packer serves as a rake, the collected printing devices D are moved rearwardly past a spring detent structure 441 which is of the character disclosed in the Franklin E. Curtis application, Serial No. 78,205, filed February 24, 1949.

When the packer 430 is first moved to its forward position, it is necessary to put a slidable follower 430F in position in the collector tray 111 just rearwardly of the packer 430 so as to hold the printing devices in upright positions as they are collected and packed. When this is done, the follower 430F engages the operating arm of a safety switch 1617, Fig. 27, that is mounted at one side of the tray 111. This serves to close the switch 1617 which is included in a safety circuit of the machine as will be described, and as the follower 430F moves rearwardly in the plate collecting operation, the collected plates serve to hold the switch closed.

When the packer 430 is to be operated through its packing movements, this is accomplished by moving the operating arm 438. This arm 438 is carried on the forward end of an operating link 442 that is disposed beneath the right-hand edge portion of the collector tray 111 as viewed in Fig. 27. At its rear end the link 442 is connected to one end of an operating rocker 443 that is pivoted centrally on a fixed pivot 444. The action of the spring 434 serves normally to urge the arm 443 in a counter-clockwise direction to the position shown in Fig. 27, and this maintains the right-hand end portion of the arm 443 in engagement with a roller 445 that is provided on an operating arm 446. This operating arm 446 is fixed on the lower end of the shaft 361 of the plate feed unit so as to be operated through its rocking movements in timed relation to the operation of the carrier bars 333. Hence when a printing device has been dropped onto the plate drop arms 403, the arm 446 is moved in a clockwise direction from the position shown in Fig. 27 so as to allow the link 442 and the packer member 430 to move in a forward direction. This moves the packer 430 away from the most forward one of the printing devices in the collector 111 and affords a space into which the next printing device may be dropped. The packer 430 then engages the arm 406 so as to impart a plate drop movement to the plate drop member 400. The plate D is thus allowed to drop from the arms 403 into the space between the packer 430 and the most forward one of the previously collected plates. The movement of the arm 445 is then reversed and the packer 430 is positively actuated in a rearward or packing direction, in the course of which the plate drop member 400 is released for return to its normal position of Fig. 28.

Figure 5:
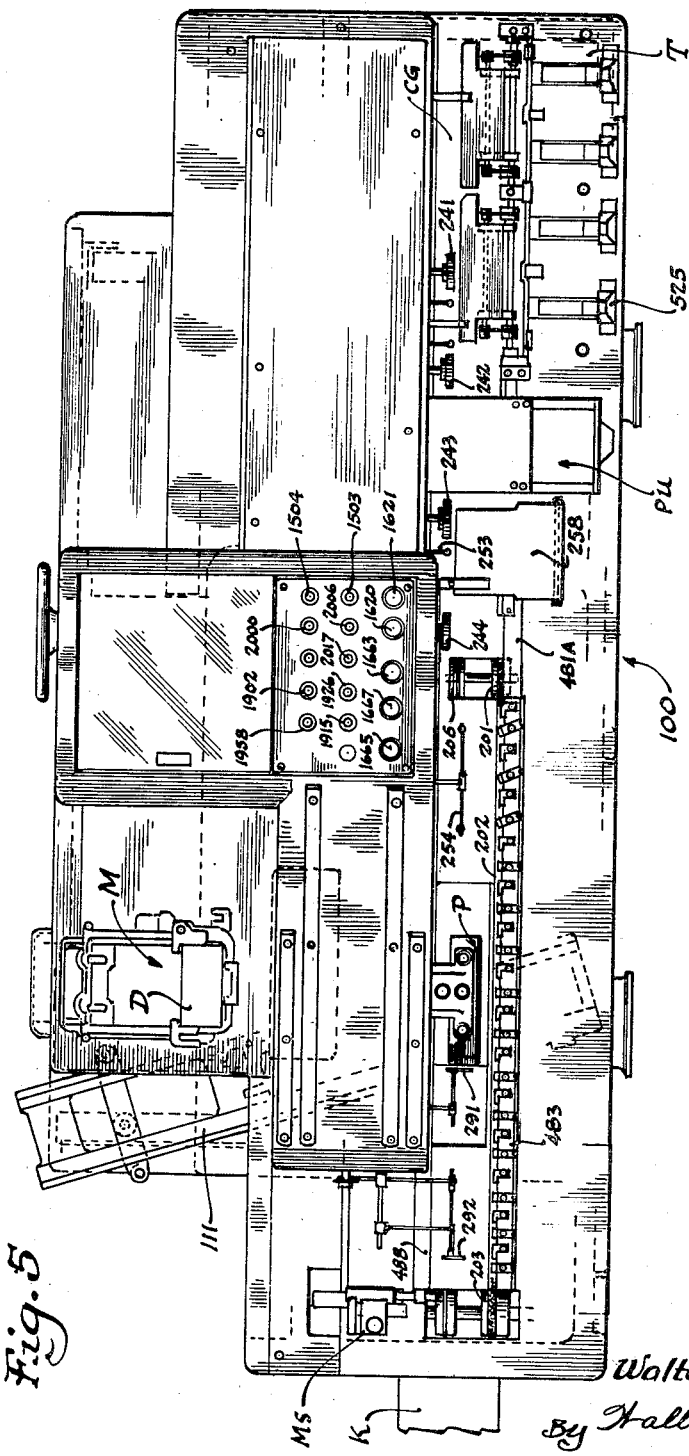
Fig. 5 is a plan view of the machine.
Figure 27:
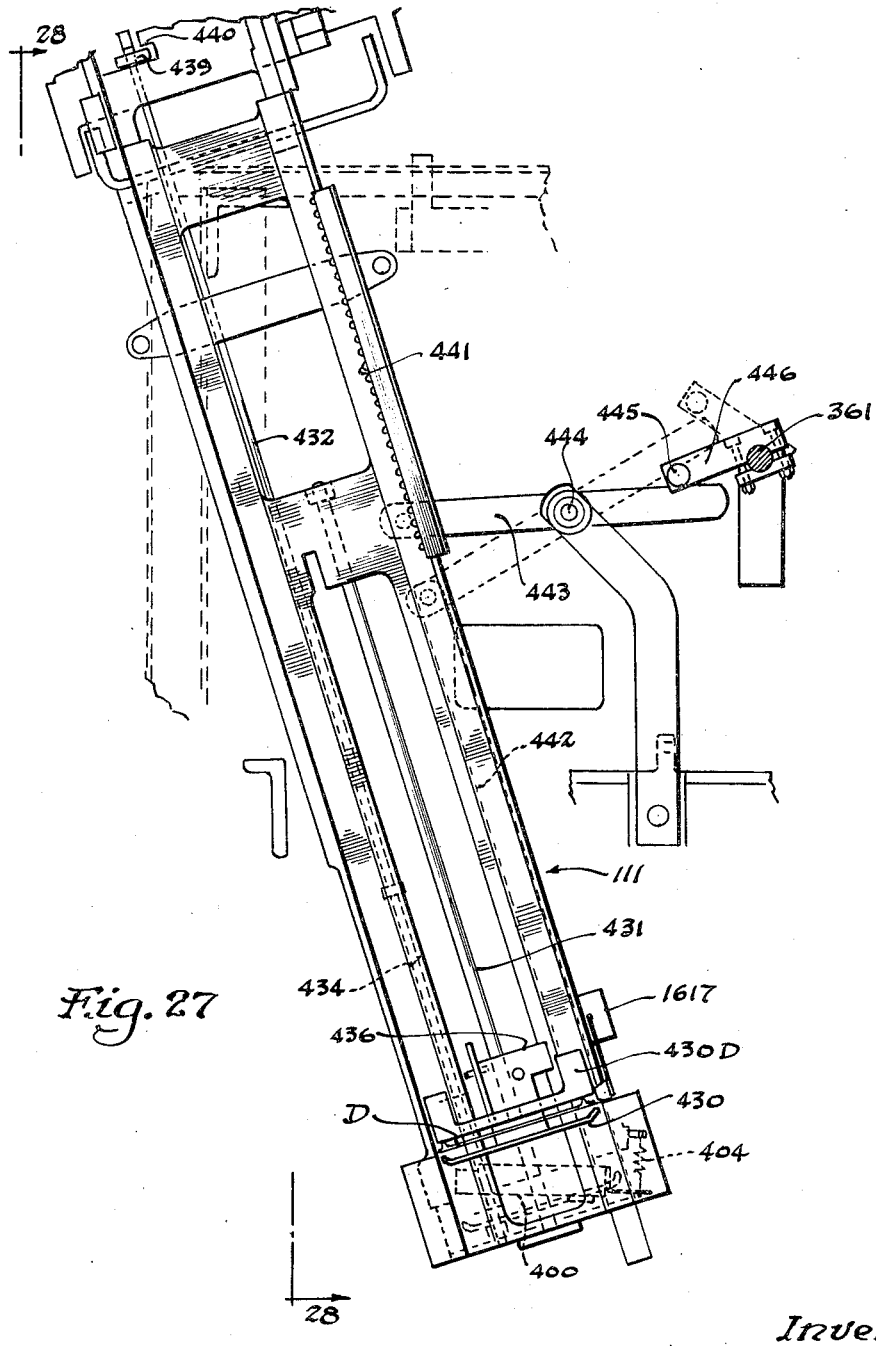
Fig. 27 is a plan view of the printing device collecting tray and the packer mechanism thereof.

It will be observed that the packer mechanism as thus described is effective to accomplish the desired plate drop and packing functions even though the collector tray 111 is disposed at an angle with respect to the printing device guideway, as shown in Figs. 5 and 27, and this enables the collector tray 111 to be disposed so that clearance is afforded beneath the printing device guideway at the sensing station so that the cooperating sensing structure such as Bowden cables or the like beneath the printing device guideway may be associated with the sensing head SH.

*The sensing head SH and its drive*

The sensing head SH, Fig. 22, is of the general character disclosed in my aforesaid co-pending application, Serial No. 58,742, and reference may be had to such co-pending application for details of construction and operation thereof. For present purposes it is sufficient to note that the sensing head SH is pivoted at its rear end on knife-edge pivots so that the forward end thereof may be brought downwardly into sensing cooperation with a printing device D that is located at sensing station. The pivoting movements are imparted to the sensing head SH by means driven by the plate feed cam shaft PF and for this purpose a pair of downwardly extending links 451 are pivoted at their upper ends on the sensing head adjacent to the forward end thereof and at their lower ends, links 451 are connected to arms 452 that are fixed on a horizontal rock shaft 453. This rock shaft is supported by bearings 454 that extend downwardly from the frame members 331 and 332, and springs 455 act on the arms 452 so as to urge the sensing head SH towards its upper or raised position. The rock shaft 453 has a rearwardly extending arm 456 fixed thereon and a cam roller 457 on the rear end of this arm rides on the upper edge of an operating cam 458 that is fixed on the plate feed cam shaft PF adjacent to the cam 350. The sensing head SH is operated through its sensing cycle during the retracting movements of the carrier bars 333, as shown in the timing chart of Fig. 29, and the sensing movements are completed relatively early in the cycle of operation of the plate feed unit 120.

Figure 23A:
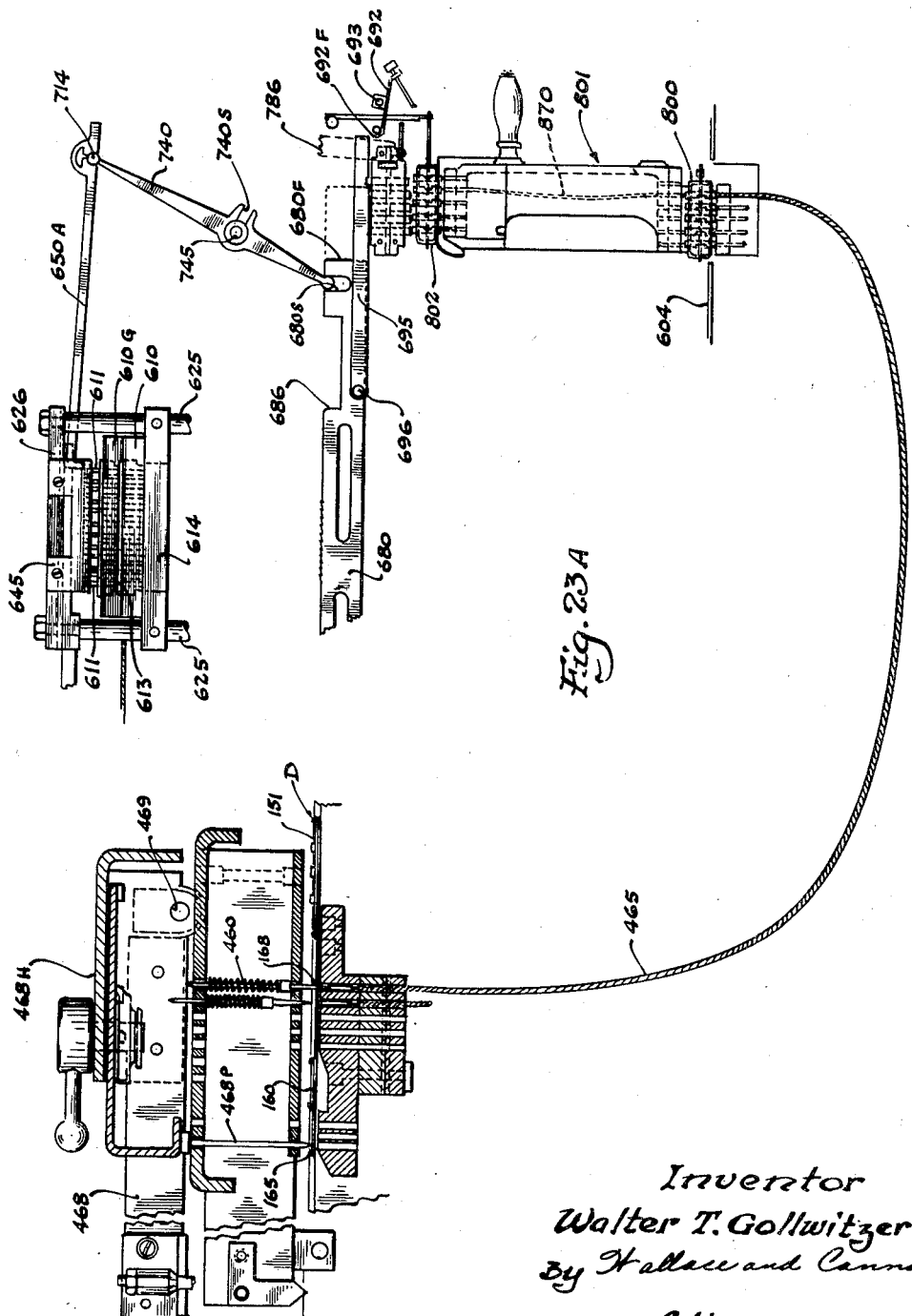
Fig. 23A is a schematic view illustrating the way in which the data representations are sensed in the printing and control device, transmitted, translated and then set up on the punch.

As is diagrammatically shown in Fig. 23A of the drawings, the sensing head SH has a plurality of sensing pins 460 therein that are spring-pressed in a downward direction with respect to the sensing head, this structure being shown in my aforesaid co-pending application, and in the downward sensing movement, when a perforation 168 or 170 is aligned with one of such pins 460, this pin passes through such perforation and exerts a downward operating pressure on an aligned operating pin 261 that is disposed beneath the sensing position, as disclosed in my aforesaid co-pending application. It will be understood that one such sensing pin 460 and one such lower pin 461 is provided for each index point on the printing device D at which a perforation 168 or 170 may appear, and these sensing pins and the related lower pins 461 are arranged in columns of five such pins in each column. These columns correspond to the several orders that may appear in the numerical data represented by perforations 168 or 170 on the printing devices D. Such lower pins 461 are each associated with a Bowden cable 465 that is extended to the set-up mechanism of the punching unit PU, as diagrammatically illustrated in Fig. 23A of the drawings, and as will hereinafter be described in some detail.

The sensing head SH also has a print-skip control arm 468 that is fixed to and extends rearwardly from an upper head 468H that is pivoted near its forward edge of the forward edge of the sensing head SH at 469, as shown in Figs. 23 and 23A. The sensing head SH has one or more tab-sensing pins 468P mounted therein beneath the rear edge of the upper head 468H so that this head 468H and the arm 468 are shifted or rocked in clockwise direction about such pivot 469, thus to raise the rear end of the arm 468, and this serves to impart an upward setting movement to the movable element of the sensing switch SS when an identifying tab 165 is sensed by the tab-sensing pin 468P mounted in the sensing head SH. The sensing switch SS is substantially like that shown in my aforesaid co-pending application, and after the setting of the switch SS has been utilized in the control of the print-skip operation of the machine, as will hereinafter be described, the movable contact 159i of the sensing switch is restored in a downward direction. This is accomplished by a restoring arm 470 that is fixed on a horizontal rock shaft 471. The spring 472 normally urges the arm 470 in an upward direction toward an ineffective position, shown in Fig. 22, and when the sensing switch SS is to be restored, the rock shaft 471 is rocked in a downward or restoring direction at the time indicated in Fig. 29 of the drawings. The rock shaft 471 is extended to the right, as shown in Fig. 18, and has an arm thereon which engages a selector switch restoring cam 475 that is fixed on the plate feed cam shaft PF adjacent to the cams 350 and 458.

*The card guideway CG and related elements*

Figure 7:
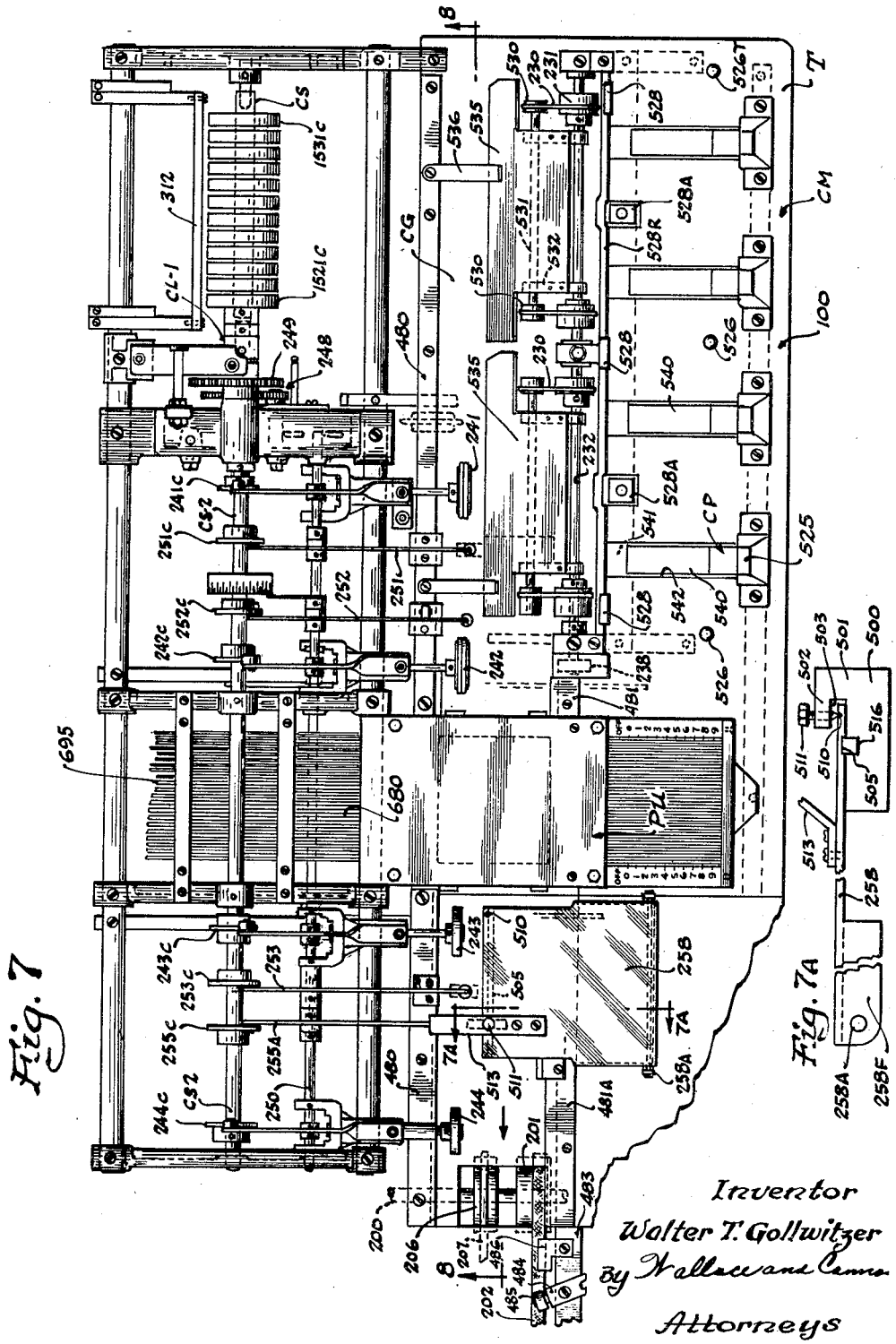
Fig. 7 is an enlarged plan view of the right-hand portion of the machine, the cover plates being removed in some instances to show details of internal construction.

The card guideway CG is defined along its rear edge by rear rails 430, Figs. 7 and 9 that are secured to the table top T. In that portion of the card guideway CG that is opposite the card pickers CP, the forward edge of the card guideway is defined by a strip 481 as shown in Fig. 9A, and the cards are advanced in a transverse direction by the feed rolls 231 and 233 over the strip 481 and then are dropped into the card guideway CG between the strips 480 and 481 as will be described. To the left of the card magazine CM, the forward edge of the card guideway is defined by a continuation of the strip 481 that extends to the punching unit PU, and by a similar strip 481A that extends from the left hand side of the punching unit PU beneath the stop finger rocker 258 and to a point just beyond the pulley 201. In the left hand portion of the card guideway CG, the forward edge of such card guideway CG is defined by a rail 481B that is fixed to the table top T, and on this rail 481B, a mounting bar 483 is secured. This mounting bar 483 has a plurality of angularly arranged support brackets 484 arranged thereon and these brackets have skid rollers 485 rotatably supported thereon so as to tend to displace the cards laterally in a forward direction and thereby maintain the same in engagement with the forward guide rail 481B, while at the same time holding such cards downwardly in engagement with the feed belt 202. A plurality of guide shoes 486 are also secured to the mounting rail 483 so as to maintain the cards C in engagement with the feed belt 202 in the spaces intermediate the skid rollers 485. The rear portion of the card guideway CG in the zone that is opposite the feed belt 202 is defined by a rear rail 488 that is secured to the table top T.

When the card C that is in its initial position in the card guideway CG opposite the card magazine CM is to be advanced in a left hand direction, as viewed in Fig. 7, the constantly driven card feed wheel 241, which has been in an elevated position, is moved downwardly into engagement with the card C by the action of its cam 241C and the card is thus advanced into position beneath the card feed wheel 242 which is at all times in its lowered position and which at this time has had downward pressure applied thereto by its cam 242C. The card is then advanced into the throat of the punching unit PU and its forward end moves on through this throat and under the card feed wheel 243 which at this time has downward pressure applied thereto. The card, however, comes to rest with its forward end beneath the stop finger rocker 258, there being a downwardly projecting stop finger element on the rocker 258, as will be described. The card C remains in this position and is held against the stop finger by the continued feeding action of the feed wheel 243, while the punching operation takes place, and the stop finger rocker 258 is raised just prior to completion of the withdrawal of the punching elements so that when such withdrawal releases the card, the card feed wheel 243 immediately starts the advancing movement of the card into position beneath the card feed wheel 244 which continues such movement of the card and causes the forward edge of the card to move into position over the feed belt 202 which continues such advancing movement. With particular reference to the card feed wheels 241 to 244, it should be observed that when a card is not in position beneath such wheels, these wheels engage free running idler rollers 489 that are disposed in position beneath slots in the card guideway.

The stop finger rocker 258 is relatively wide in a direction parallel to the card guideway and this width is in the present instance somewhat greater than the width of forty columns on the card C, thus to enable this rocker to serve as a mounting for a stop finger element 500 that is shown in detail in Figs. 7 and 7A of the drawings. This stop finger 500 is in the form of a relatively small and generally rectangular plate having an upwardly extending arm 501 and a rearwardly extending arm 502 at the upper end of the arm 502. This defines a slot 503 that is adapted to embrace the free or rear edge of the rocker 258. Along the lower surface of this rear edge of the rocker 258, a downwardly facing slot 505 is formed, and a key 506 is mounted in the edge of the plate 500 and within the slot 503 and is arranged to engage this slot 505. The stop finger plate 500 may thus be adjusted along the rear edge of the rocker 258 and will at all times be maintained in a depending and perpendicular relationship with respect to the rocker 258. The plate 500 has a plurality of tapered positioning recesses 510 formed therein at the positions at which the stop finger is to be selectively mounted, and a set screw is extended downwardly through the horizontal arm 502 and into the tapered guide or positioning recesses 510. In the present instance, the stop finger plate 500 is disposed directly beneath a rearwardly projecting arm 513 which is connected to the rocker 258 and which overlies the forward end of the arm 255A. To enable the set screw 511 to be put in place in this position, a clearance opening 514 is formed in the arm 513.

The stop fingers 291 and 292 that are mounted in the printing position are of more or less conventional form with their pivot rollers underlying the related cams 291C and 292C.

Figure 29:
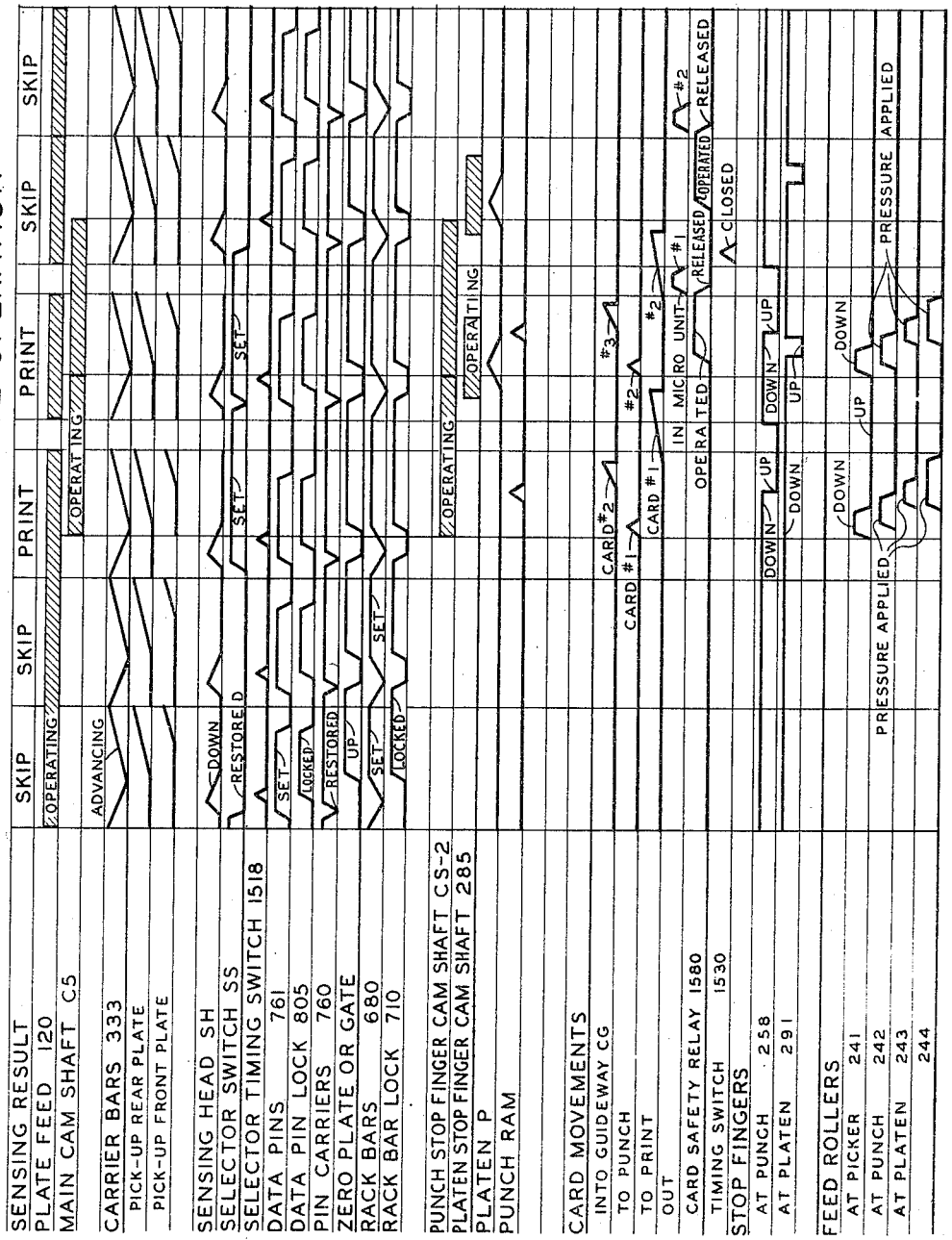
Fig. 29 is a timing chart illustrating the timing of the elements of the machine in consecutive operation.

The timing for the raising and lowering of feed roll 241, and the pressure application to the feed wheels 242 to 244, and for the raising and lowering of the stop fingers 258, 291 and 292 is shown on the timing chart that constitutes Fig. 29 of the drawings.

The sensing fingers 251, 252, 253 and 254 are arranged so that their forward ends are positioned over safety or control switches that are located beneath the card guideway. Thus, the sensing finger 252 is arranged over a switch 1611A so that this switch 1611A is opened when the sensing finger 252 passes downwardly through the bottom of the card guideway and into operative engagement with the switch 1611, and this downward movement takes place immediately after a card C has been fed laterally into the card guideway by the card picker CP and the transverse belts 230. The sensing finger 251 is operated at the same time as the sensing finger 252, and when a card is not in position in the guideway, the sensing finger 251 is operable to open a normally closed switch 2027 that is disposed beneath the card guideway. In ordinary machine operation, the stop finger 252 serves as a safety which operates when a card is not in a position in the guideway at the proper time to open the switch 1611 and stop the operation of the machine, as will hereinafter be described. In operation of the machine for group printing, the stop finger 252 is utilized to sense the special opening 172 in a group card CG to initiate the group change operations, and incidentally to cause stopping of the machine between such groups. In such group printing operations, the stop finger 251 serves as a safety, and prevents the group printing change when a card is not in position in the card guideway.

The sensing finger 253 is utilized to determine that a card C is in position at the punch, and this sensing finger 253 is lowered at the time when a card C should have been advanced to such punching position. The sensing finger 253 is arranged, when a card is not sensed in a punching position, to close a normally opened card safety switch 1618 that is disposed beneath the card guideway, and such closure of the switch 1618 causes stopping of the machine, as will hereinafter be described.

The sensing finger 254 is utilized to determine whether or not a card C that has been released by the stop finger 258 has passed onwardly through a relatively long intermediate space in the card guideway and into a printing position, and the operation of this sensing finger 254 takes place at a time when such card should have passed through such intermediate space. Thus, if improper feeding movements of the card have caused this card to be delayed so that it remains in this intermediate space when the safety sensing finger 254 is lowered, such sensing finger is ineffective to open a normally closed card safety switch 1612 that is located beneath the card guideway, and the continued closure of the safety switch 1612 at this time, cooperates with a related timing switch 1521, to cause the machine to stop, as will be described hereinafter.

As a final safety sensing feature, the discharge of each card from the printing device guideway CG is sensed by the micrometer stop switch 1608, as will hereinafter be described, the operation of this structure being such that unless the micrometer stop switch structure 1608 is actuated by discharge of a card from the printing device guideway, the next cycle of the machine will be stopped.

*The card magazine and related card feed means*

The card magazine CM is provided on the table top T forwardly of the right hand portion of the card guideway CG, and this card magazine is defined on its forward edge by a plurality of upstanding stationary columns 525. In the present instance, the card magazine is constructed so that it may be arranged to accommodate either a single length card C or a card D of double length and for this purpose provision is made for threading upstanding retaining pins 526 into threaded openings in the table top at positions which define either the single length card or the double length card. Three such mounting positions are provided, and these mounting positions are defined by tapped openings 526T, one such opening appearing in Fig. 7, while two pins 526 are shown in this figure. As thus set up, the card magazine CM is adapted to have cards placed therein in a stack between the two pins 526, and these cards may be advanced one by one from the bottom of the stack and laterally toward the card guideway CG through the operation of the card picker CP, as will hereinafter be described. It should be observed that on the rear side of the card magazine, upstanding columns 528 are afforded near the ends thereof and that these columns are supported by a rail 528R that is spaced upwardly from the table top. The rail 528R carries a plurality of vertically adjustable members 528A so that the lower ends thereof may be adjusted with respect to upwardly and rearwardly sloping card guide blocks 528G to thus form a clearance throat or slot 528S through which the lowermost card may be fed into the bight formed by the upper and lower feed rolls 231 and 233. In this regard it should be noted that the guide blocks 528G serve to elevate the advancing card to the level of the front strip 481, and the bight of the feed rolls 231 and 233 is located at this level. Moreover, the lower feed roll 233 is recessed into the forward edge of the strip 481, as shown in Fig. 9A so that the card is fed over this strip.

It should be observed that the two feed belts 230 are afforded opposite each section of the card magazine, and the rear ends of such belts are supported on guide pulleys 530 that are supported on shafts 531, such shafts being held in spaced relation with respect to the shaft 230 by spacer bars 532. The belts 230 are recessed into annular grooves in the feed rolls 231 so that the feed rolls 231 act as normal feed rolls so long as the card is between such rolls. Rearwardly of the rolls 231 however, the feed belts 230 are effective with a feeding action on the cards so as to complete the in-feeding movement of the cards, and this action is attained by downward pressure of the belts toward the upper face of the rail 481. The belts 230 thus complete the rearward movement of the card so that it drops downwardly past the rear edge of the rail 481 and into the card guideway CG. As each card C is fed into the guideway it passes into position under a guard plate 535 that maintains the advancing rear or leading edge of the card in engagement with the bottom of the card guideway, thus to assure that the card passes into position beneath the feed wheel 241, and two such guard plates 535 are provided in the present instance, and such guard plates are supported by means including support bars 536 extended from the rear rail 480 on the card guideway.

Rearwardly of the card guideway CG an elevated work or storage surface 537 is provided and this may be used as a supply source for cards C, two stacks of which are shown on this surface as illustrated in Fig. 1.

The card picker mechanism CP is arranged to afford four reciprocable slides 540 that are mounted on guide bars 541 so as to be movable back and forth in slots 542 formed in the bottom of the card magazine. It will be observed that two slides 540 are provided in each section of the card magazine CM, and these slides are arranged so as to be in front-to-rear alignment with the respective upstanding columns 525. The columns 525 have clearance recesses 525C in their lower rear portions so that the rear end portions of the slides 540 may move into these recesses when the slides 540 are at their most forward positions. These forward ends of the several slides have individual card engaging bars 545 fixed thereon, as shown in Fig. 9 of the drawings, and these bars engage a slight distance above the adjacent surface of the slides 540 so that when the slides 540 are moved in a rear or card advancing direction, the bars 545 will engage the forward edge of the lowermost card and will advance the same forwardly and into engagement with the card feed belts 230. In this respect it should be observed that the reciprocating stroke of the slides 540 is relatively short and is terminated soon after a card C has been engaged by the feed rolls 531 and 533.

Figure 8:
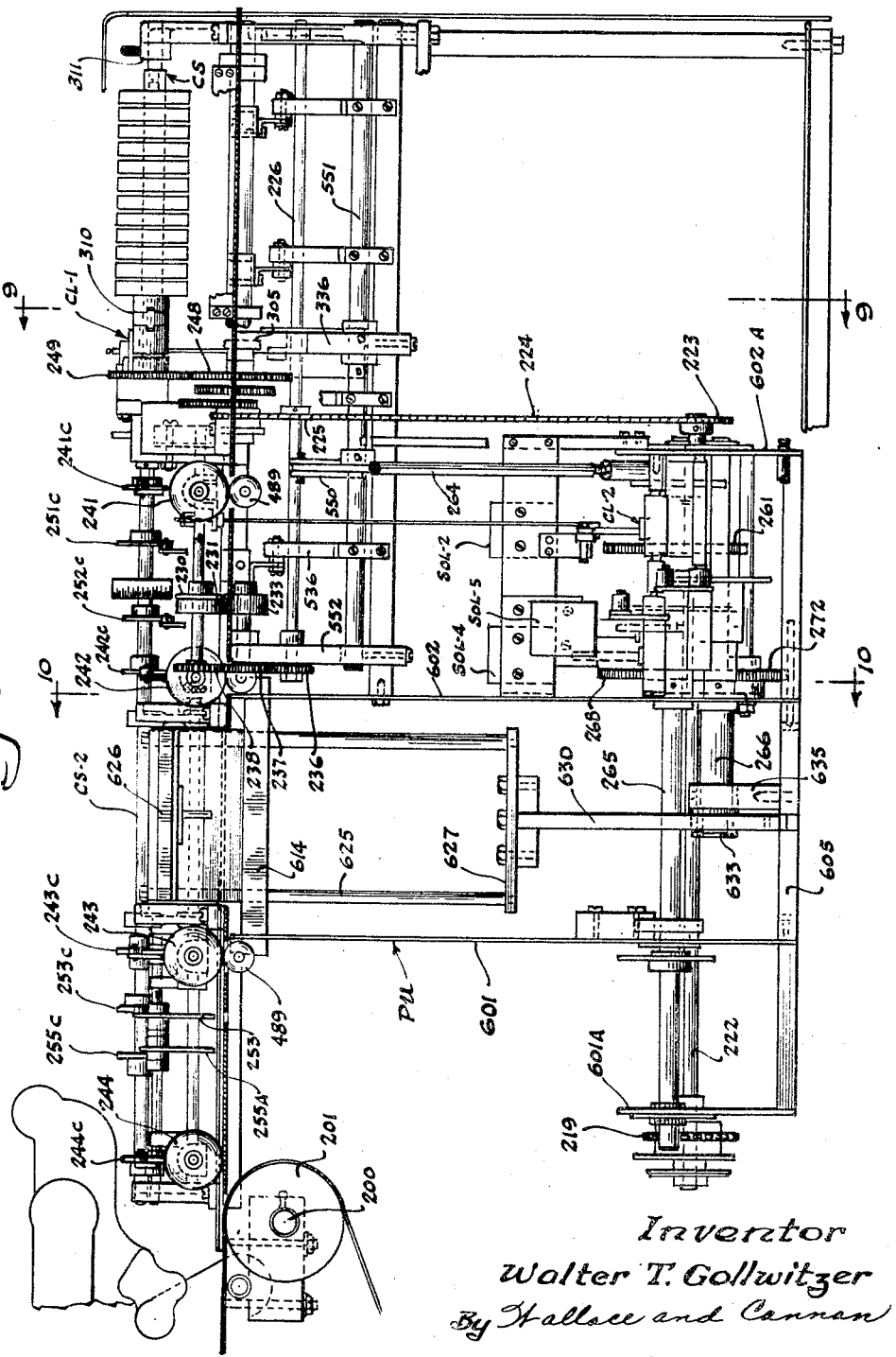
Fig. 8 is a front view taken partially in vertical section and showing the portion of the machine illustrated in Fig. 7.

The reciprocating movements are imparted to the slides 540 by means associated with the operating link 264. Thus, as shown in Figs. 8 and 9, the upper forward end of the link 264 is pivotally connected to the end of an upwardly and rearwardly extending arm 550 that is fixed on a rock shaft 551. This rock shaft is supported in bearings 552 that are suspended from the lower face of the card magazine. The rock shaft 551 has a plurality of operating arms 553 fixed thereto and extended upwardly and forwardly into positions beneath the respective slides 540, and a roller 556 on the upper end of each arm 555 is arranged to ride in a vertical slot in a connecting bracket 557 secured to the lower face of the related slide 540. Thus, in a rotation of the sleeve 260, the link 264 is moved downwardly and is then returned in an upward direction to the position shown in Fig. 9, and in this reciprocation, the rock shaft 551 is operated through a rocking movement in which the slides 540 are first moved in a forward direction through a card picking or ejecting stroke and are then returned to their retracted positions, as shown in Fig. 8.

*The punch unit in general*

The punch unit PU, Figs. 7 to 14, has its supporting frame afforded by spaced side plates 601 and 602, and spaced outwardly from the side plates 601 and 602, respectively, a pair of relatively low vertical frame plates 601A and 602A are provided to serve as outboard bearing structures for certain of the operating and transmitting shafts of the machine. Moreover, the main frame plates 601 and 602 have rearward extensions 601R and 602R that are spaced upwardly from the upper cover 604 of the lower base LB, as shown in Fig. 10. The plates 601 and 602 are spaced rigidly from each other by spacer bars, such as the bars 605, Figs. 8 and 10.

At the upper ends of the frame plates 601 and 602 a settable punch structure is provided for selectively forming data representing perforations such as perforations 168C and 171C in the cards C while they are disposed at punching position in the machine. Such punching structure as herein shown is constructed for punching in forty different columns and is therefore provided with a rigid punch block structure 610 having punches 611 mounted therein in forty rows of twelve punches each. The punch block 610 comprises an upper punch guide 610G and a lower die block 610D, these blocks being secured rigidly together so as to align corresponding located vertical openings 612G and 612D thereof. The lower face of the punch guide 610G is recessed upwardly at 613 so as to form a punch throat between the two blocks into and through which a card C may be moved, and the punch block 610 is supported between the side plates 601 and 602 on a mounting plate 614 so that this throat 613 is aligned with the card guideway CG.

The openings 612G serve as guides for the punches 611, while the openings 612D serve as the die openings for punching cooperation with the punches, and these elements are of rectangular form so that the data perforations will be of the form shown in Fig. 3. The punchings are discharged from the die openings 612D through a large passage 614P in the plate 614 and drop downwardly through a funnel-shaped disposal chute 615.

The punching and stripping movements are applied to the punches 611 by means including a punch ram structure mounted on four vertically movable rods 625 that have a punch ram plate 626 fixed at their upper ends so as to overlie all of the punches 611. The rods 625 extend slidably through the stationary guide plate 614 adjacent to the respective corners of the punch block 610, and at their lower ends these rods are fixed to the respective corners of a transmitting plate 627. The plate 627 has a relatively large vertical plate 630 fixed thereto in a central relation so as to extend downwardly therefrom, and near its lower end the plate 630 has a transverse guide slot 631 formed therein. A bearing block 632 is slidable across the slot 631, and has an eccentric 633 rotatable therein. The eccentric 633 is fixed on the shaft 266 and adjacent to the eccentric 633, a relatively heavy bearing block 635 is provided for the shaft 266 so as to support the shaft for transmission of the relatively heavy loads involved in the punching operations.

Figure 13:
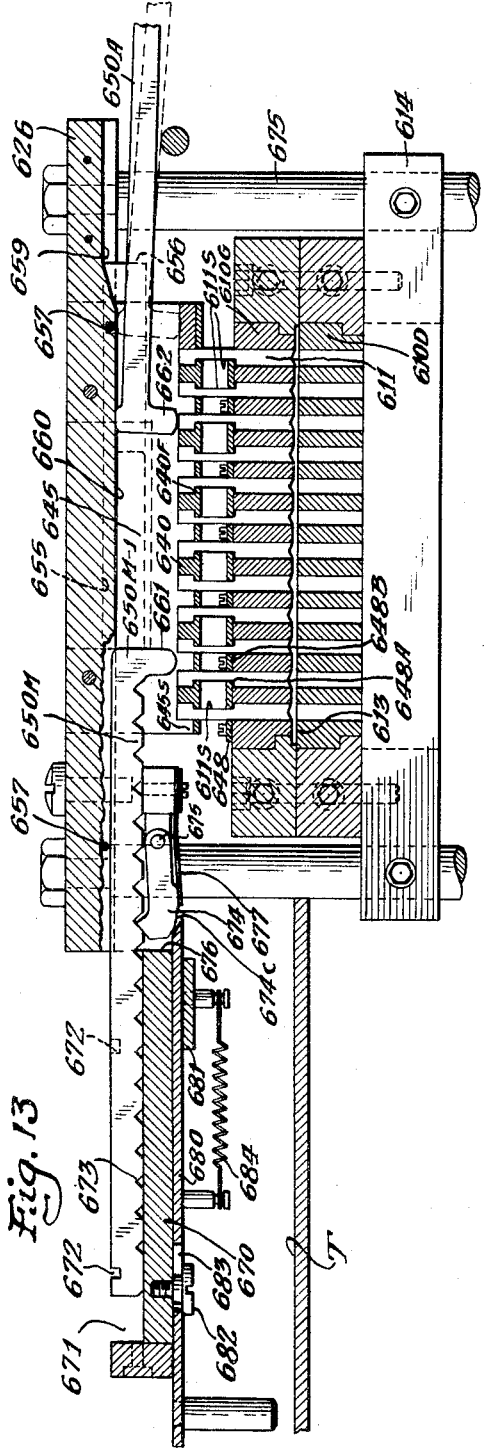
Fig. 13 is a vertical sectional view taken substantially along the line 13—13 of Fig. 12.
Figure 14:
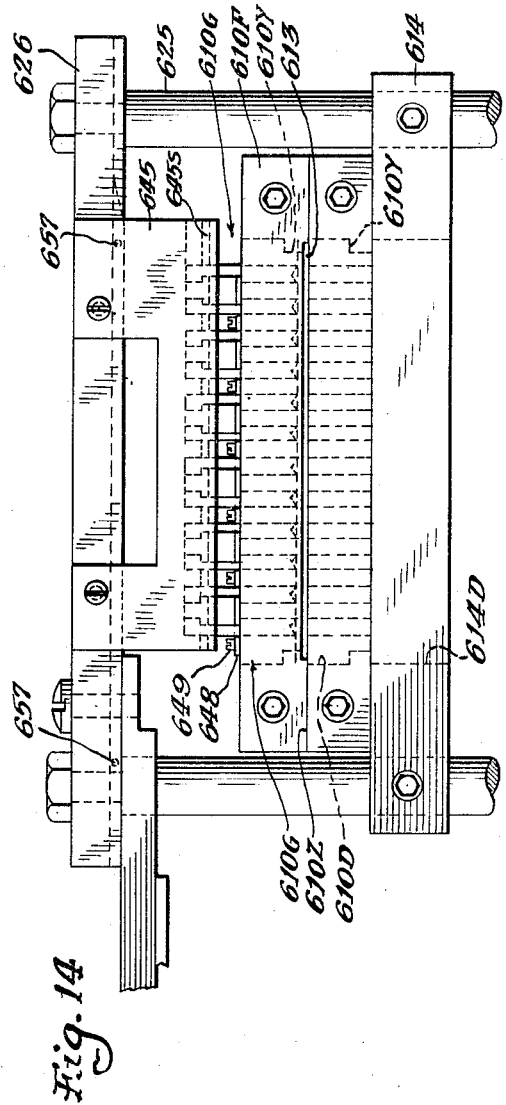
Fig. 14 is an elevational view taken from the line 14—14 of Fig. 12.

The twelve punches 611 in each column are each formed with a notch or slot 611S in one side thereof for use in attaining the necessary stripping or upward withdrawing movements thereof. These notches 611S are relatively close to, but are spaced downwardly from the upper ends of the punches, and the portion of the punches in which the notches 611S are formed are disposed at all times above the upper face of the punch guide block 610G. The twelve punches 611 are disposed in pairs as shown in Fig. 13, so that the notches 611S of the punches of each pair face toward each other, and six stripper bars 640 are provided which are of inverted T-shape in cross section. One such bar 640 extends between the punches of each pair so that the lower or bottom flanges 640F of the bar extend into the slots 611S of the punches of such pair, and it should be noted that the vertical extent of each notch 611S is greater than the thickness of the flange 640F so as to allow for selective punching movements of the punches relative to the stripper bars 640, as will hereinafter become apparent. The stripper bars 640 are suspended below the ram plate 626 by cheek plates 645 which are fixed to the sides of the ram plate, and the ends of the bars 640 are disposed in carrier slots 645S formed in the adjacent faces of the cheek plates 645.

The punches 611 are held in place against accidental displacement from the guiding openings 612D by means of retaining strips 648 which are of the same overall width as the flanged lower ends of the stripper bars 640 and these bars or strips 648 are arranged in the slots 611S of the punches in the same manner as the stripper bars. The retaining strips 648 are held in position on the top of the guide block 610G by retaining screws 649 so that the strips 648 are normally disposed at substantially the lower ends of the slots 611S although the punches 611 may move downwardly as required in the operation of the punch. The strips 648 serve to hold the punches 611 against upward displacement such as might interfere with the interposer operation or setting.

*The formation of the punch blocks*

Figure 12:
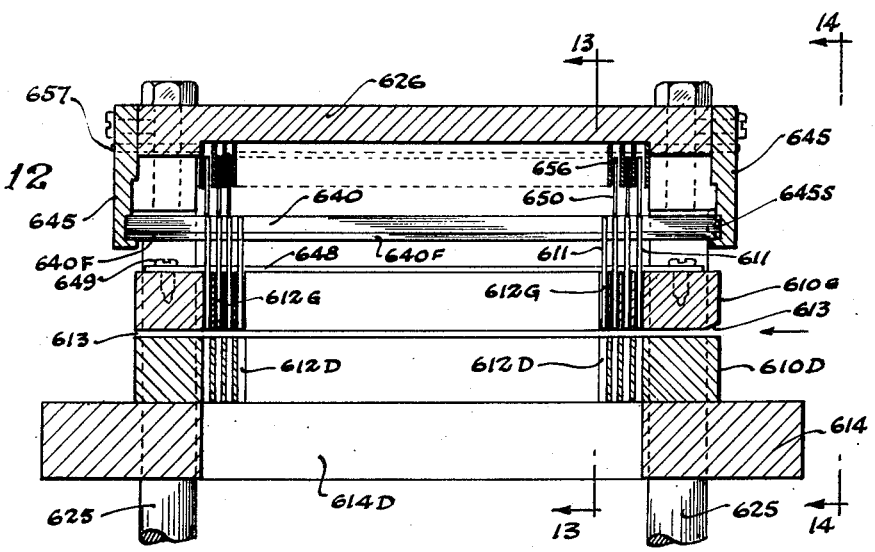
Fig. 12 is a vertical sectional view taken substantially along the line 12—12 of Fig. 11.
Figure 12A:
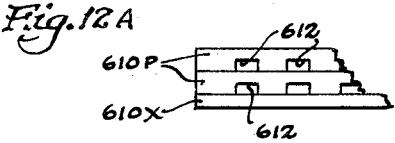
Fig. 12A is a plan view of certain individual elements that are utilized in producing the punch block structure.

The blocks 610G and 610D of the punching unit are formed in such a way as to assure proper alignment of the openings 612 thereof, and the way in which these blocks are formed is such as to materially simplify the formation of the slots 612 in an accurate relationship. Thus the material that is to make up the two blocks is originally formed as a plurality of individual plates 610P as shown in Fig. 12A of the drawings, one such plate 610P being afforded for each column of punches 611, and the total thickness that is equal to the width of the openings plus the spacing between adjacent openings. These plates 610P are of such a depth as to be somewhat greater than the total vertical dimension of the two blocks 610G and 610D that are to be made, and the side faces thereof are accurately machined so that the plates 610P are of the proper thickness which is equal to the column spacing to be employed in the card C. In one face of each plate 610P, a plurality of parallel slots or grooves are formed as indicated in Fig. 12A and these grooves have been identified by the reference character 612 in this figure. It will be evident of course that such slots may be accurately formed as to size and relationship, and after these grooves have been formed in the groove of plates 610P, these plates are positioned in a symmetrical face to face relationship and a closure plate 610X is put in position opposite the last one of these plates so that the proper number of slots 612 will be defined between the several plates that are thus assembled. Proper alignment of the slots in the several plates 610P may of course be facilitated by accurate machining of the end surfaces of the plates and by forming the grooves 612 in the plates through the use of the end surfaces as gauge surfaces.

The assembled plates are then brazed together, and in practice the plates are secured together in units of ten plates each so that a 40-column punch is made up of four such units secured together by clamping as will be described. After such brazing, the outside front and rear edge surfaces of the assembled blocks or units are machined to afford accurate positioning surfaces thereon such as rabbetted corner grooves 610Y, and the block is separated along the line indicated at 610Z in Figure 14 and the clearance throat 613 is formed in the lower face of the upper block 610G. The units forming the upper and lower blocks are then reassembled through the use of front and rear positioning frame bars 610F that have tongues 610T thereon engaging the end grooves 610Y. These front and rear bars are connected by side clamping bars 610S that are screwed thereto so as to clamp the four ten-column units together. The upper and lower frames are then secured in place by cap screws on the base plate 614, the inner edges of the upper bars 610F being arranged to overlie the edges of the block 610D so as to hold the same down. Thus the blocks 610G and 610D are accurately located with respect to each other and are secured in position on the mounting plate 614.

*The interposers*

The punches 610 of each column are adapted to be selectively actuated in the course of a downward or punching stroke of the ram plate 626 and this selection is brought about through the setting of individual interposers 650. These interposers take different forms, interposers 650A being adapted to be automatically set from and under control of the perforations in the printing devices D, and others of which are adapted to be set manually. This manual setting is accomplished by control members of two different types, one of which is identified as 650M and is adapted merely for control of interposers 650A, and the other of which types is identified as 650M–1 and is adapted to act as an interposer as will be described. Such members 650M and 650M–1 are disposed beneath the ram plate 626 and one such member may be afforded for each of the columns of punches. In affording a mounting and guiding means for such interposers, the lower face of the ram plate 626 is formed with a plurality of parallel slots 655 therein as indicated in Fig. 13 of the drawings, and these slots are arranged in such a spaced relation as to lie over the space between the adjacent columns of punches 611, and guide plates 656 are disposed in these slots so as to extend downwardly therefrom as will be evident in Figs. 12 and 13. These plates are held in position on the ram plate 626 by transverse retaining rods 657, and the spaces between the adjacent plates 656 afford downwardly facing guide slots which receive and guide the upper edge portions of the interposers 650.

Adjacent the rear edge of the ram plate 626 the lower surface of the plate is cut away as at 659 but in the portion of the plate 626 that directly overlies the several punches 611, the portions of the plate disposed between the slots 655 afford horizontal abutment surfaces 660 that face downwardly and which may engage upper surfaces of the interposers to transmit downward movement to such interposers and thereby actuate the selected punches.

The manually settable interposers 650M–1 are formed with flat upper edges, and at their rear ends, these interposers have downwardly extending arms 661, one such arm being afforded on each interposer 650M–1. Thus by longitudinally setting the interposers 650M–1 in alignment with a particular punch 611, downward punching force may be transmitted to such selected punch when the ram plate 626 is operated through its punching cycle. The manually settable members 650M are in reality nothing more than control members in that these elements 650M are not provided with downwardly projecting force transmitting arms 661, but are adapted to serve as abutments for stopping forward setting movement of the interposers 650A in certain instances as will be described hereinafter.

The interposers 650A have downwardly extending noses 662 thereon so that by longitudinal setting movement of these interposers, whether it be automatic or under control of the members 650M, is effective to select a punch 611 in the related column.

The manually settable elements 650M and 650M–1 are of course guided at their rear ends between guide plates 656 in the same manner as the automatically set interposers 650A, and a supporting plate 670 is carried on the lower face of the ram plate 626 so as to extend forwardly therefrom and provide a mounting and guiding means for the members 650M and 650M-1. This mounting plate 670 has the members 650M and 650M-1 rested thereon and guided in spaced relationship by the provision of separator plates 671, and each of these settable members has a relatively small recess 672 in the forward portion of its upper edge that may be engaged by a stylus to impart longitudinal setting movements to the individual members as shown in Fig. 11. The lower edges of these members are provided with a plurality of detent notches 673 at longitudinally spaced points for setting the elements for selection of different punches in the related column, and a plurality of detents 674 are mounted on a pivot 675 in a slot 676 in the forward portion of the mounting plate 670. The detents 674 act individually on the respective members 650M and 650M-1 and are urged toward such cooperation by a comb spring 677 that is secured to the bottom of the mounting plate 670 so that individual fingers of the comb spring act on the respective detents 674.

It is desirable of course to insure that the settable members 650M and 650M-1 be positively retained in the desired set positions, and for this purpose locking means are provided to lock the several detents 674 in engagement with the notches 673. Thus a slidable locking plate 680 is mounted on the lower face of the plate 670 by a cross bar 681 and guide studs 682 that extend upwardly through slots 683 in the plate 680. The plate 670 is thus adapted for movement from front to rear and is normally urged in a rearward direction by a spring 684. The rear edge portion of the plate 680 is arranged to engage cam surfaces 674C formed on the lower edge portions of the pawls 674 so that when the locking plate 680 is in its rearward position, all of the pawls 674 are urged upwardly and into a locking relationship with respect to the notches 673. When an operator desires to set one of the members 650M or 650M-1, the locking plate 680 is withdrawn by means of a handle 686 that extends downwardly from its forward edge and around the locking plate which is held in its withdrawn position and then the settable members are shifted to the desired set relationship after which the locking plate 680 is released for return to its locking position of Fig. 13.

*The rack bars and the setting and locking thereof*

The interposers 650A are settable automatically by operative association with a plurality of individual control slides 680 which in the present instance will be termed rack bars. The control slides 680 are provided for each order of the punch in which automatic setting is desired, and these slides are located in a horizontal position at a level substantially midway between the upper and lower edges of the rear frame extensions 601R and 602R. The control slides are mounted for horizontal sliding movement on comb bars 681 that are disposed within guide slots 682 formed in the control slides 680. The control slides or rack bars 680 are individually urged in a rearward or setting direction by means of springs 684 and such setting movement is individually controlled by means including the sensing head SH and the Bowden cables 465 as will hereinafter be described in some detail.

In the upper edges of the control slides 680, a relatively long notch 686 is provided in which the cross member of a restoring bail 687 is arranged to move. The length of the notch 686 is somewhat greater than the total range of setting movement of the control slides 680. The bail 687 is urged in a rearward or right-hand direction as viewed in Fig. 10 by a spring 688 and an arm 688A extended downwardly from the central pivot 689 of the bail 687 has a cam roller thereon which engages a rack bar restoring cam 690 that is fixed on the punch unit shaft 265. Thus in an operation of the shaft 265, the bail 287 is rocked in a counter-clockwise direction to restore the several control slides 680 to their forward positions in which they are retained by means including a zero gate 692 which operates in timed relation to the restoring bail 687 as will be described. The bail 687 then returns to the position shown in Fig. 10 so that selective setting movements of the control slides 680 may be effected. The zero gate 692 is in the form of a rocking plate pivoted at 693 and having a forward edge 692F that is adapted to be positioned in the path of control pawls 695 that are provided on the several control slides 680. These pawls 695 are pivoted at 696 and extend rearwardly beyond the rear end edges 680E of the several slides 680, and when the zero gate 692 is in its raised most clockwise position the edge 692F thereof is positioned in the path of the ends of the pawls 695 so as to retain the slides 680 in their forward or restored positions. The zero gate 692 tends by gravity to pivot in a counter-clockwise direction to its released position, and is positively shifted to its raised or effective position, as will hereinafter be described.

When a rack bar 680 has been released and has moved rearwardly to a particular set position in a manner to be described hereinafter, such rack bar is latched in its set position and is retained in such set position until early in the next machine cycle, as will be evident in the timing chart of Fig. 29. Such latching mechanism is afforded by means including a latch carrier 700 that overlies all of the racks 680 and is pivoted at its rear end on the lower end of an arm 702A of a bell crank 702. The bell crank 702 is pivoted at 702P and has an arm 702B extending rearwardly therefrom as will be evident in Figs. 10 and 10A. The latching and unlatching movements of the latching mechanism are attained by rocking movement of the bell crank 702 and when the latch mechanism is to be rendered effective, the bell crank 702 is rocked in a clockwise direction. To accomplish this, an operating link 703 is extended downwardly from the arm 702B and is connected at its lower end to one arm 704A of a bell crank 704 that is pivoted on the shaft 689. Another arm 704B of this bell crank has a cam roller thereon that engages the rear edge surface of a cam 705. This cam is formed in such a way that during a period of substantially 90° from the beginning of the cycle of operation of the cam shaft 265, the latch members are retained in their effective position, and then, just before the restoring bail 687 starts on its rearward movement, the latches are released. The latches are again rendered effective at about 270° of the operating cycle, and are retained in this effective position until the end of the cycle.

The arm 704B has a spring 706 acting thereon which tends to hold the cam roller in engagement with the cam 705.

The pawl carrier 700 has a plurality of individual pawls 710 mounted on a shaft 711 so that one pawl is adapted to engage the upper edge portion of each of the rack bars 680, and these rack bars are provided with ten rearwardly facing teeth 712 that may be engaged selectively by such pawls 710. The individual pawls 711 are urged downwardly by the individual arms of a comb spring 713, and the entire pawl carrier 700 is urged in an upward direction at its forward end by a spring 714. This upward movement is however, limited by rollers 718 that are mounted on the opposite ends of the shaft 711 and which engage cam surfaces 719 formed on stationary cam members 720 that are fixed on the side frames of the punch unit. When the pawl carrier 700 is in its rearward or withdrawn position, the rollers 718 engage the cam surfaces 719 in such a position that the pawls 710 are out of engagement with the teeth 712 and, in this respect it should be noted that the action of the comb spring 713 of respective pawls 710 is limited by engagement of abutment surfaces 721 on the pawls with abutment surfaces 722 on the carrier.

When the pawls 710 are to be engaged with the teeth 712 the pawl carrier 700 is shifted in a forward direction so that engagement of the rollers 718 with the cam surfaces 719 causes the forward end of the pawl carrier 700 to move downwardly against the action of the spring 714. This moves the pawls 710 into engagement with the teeth 712 and it should be observed that the forward movement of the pawl carrier 700 is accurately determined so that the locking action of the pawls 710 also serves to accurately align the carriers 680 in their respective set positions.

The zero gate 692 is operated in the present instance from the cam 705, and for this purpose an operating rod 730 has one end pivoted on the arm 704B. The other or rear end of the rod 730 extends slidably through the rearwardly and downwardly extending edge or arm of the zero gate 692. Beyond the zero gate the rod has a nut 734 fixed thereon so that when the rod 730 is withdrawn in a forward direction, the zero gate 692 may be positively actuated to an accurately determined upper or effective position wherein the gate is adjacent to but spaced slightly from a transverse rod 735.

The setting movements of the rack bars or slides 680 are effective to impart corresponding setting movements to the related interposers 650A, and for this purpose, connecting levers 740 are provided for connecting the related interposers and rack bars. The upper ends of the connecting levers 740 are pivotally connected as at 741 to the related interposers 650A, such connections being effected at the rear ends of such interposers and the connection being formed within a guide structure 742 that embodies guiding combs 743 between the elements of which the interposers 650A are arranged to move. At their lower ends the levers 740 are extended into slots 680S formed in the upper rear edge portions of the respective slides 680. Intermediate their ends the levers 740 are pivotally related to a cross shaft 745, and this pivotal inter-relationship is in the present instance attained in such a way that blocking or jamming of the interposers in set positions thereof will not cause breakage of the related parts of the mechanism. Thus each lever 740 is provided with a relatively large head portion 740H at the pivot point and the head portion is provided with a rearwardly opening slot 740S that is arranged to embrace the shaft 745 with suitable separating washers or collars 747 disposed between the adjacent levers. Springs 748 act on the levers 740 adjacent to the central pivot head 740H thereof so as normally to maintain the bottoms of the slots 740S in firm engagement with the shaft 745, and this causes the levers to move normally with a conventional pivoting action. If, however, one of the interposers is blocked in a forward position within the punch at a time when the positive restoring movements are applied to the slides 680, the forward movement of the lower end of the lever 740 will cause such lever to pivot about its upper end or in other words, about the pivot 741 and this in turn will cause movement of the central head 740H in a left-hand or forward direction as viewed in Fig. 10. Thus the related mechanism will not be damaged, and under the present invention, the machine is caused to stop by means of a safety switch mechanism that is operatively associated with the levers 740. Thus a safety operating bail 750 is pivotally mounted forwardly of the shaft 745 so that its cross member lies in the forward path of the heads 740H so that when anyone of such heads is displaced as above described due to faulty operation of the punch, the bail 750 will be shifted in a forward direction. When this occurs, a transmitting bail 751 associated with the bail 750 is arranged to engage and open a safety switch 1630 which, as will hereinafter be described, is effective to cause operation of the machine to be stopped. The operator may then release the interposer 650A that has been blocked or jammed, and the machine is then in condition for resumption of operation.

The setting movements of the slides 680 are controlled by settable pin mechanism of the general character disclosed in my Patent No. 2,513,998, patented July 4, 1950. This stop pin mechanism is effective to translate the five element positional code in which data is represented in the printing and control devices into a ten element positional code in accordance with which the slides 680 must be set, and reference may be had to my aforesaid Patent No. 2,513,998 for details of construction and operation. For present purposes, it should be observed that a pin carrier or slide 760 is provided for each of the slides 680, and in each pin carrier, five pins 761 are mounted for vertical sliding movement between lower restored positions in which the upper ends of these pins are disposed beneath the level of the lower edge of the slide 680, and upper set positions in which the pins are disposed above such level and in the path of the edge 680E of the slide.

Figure 16:
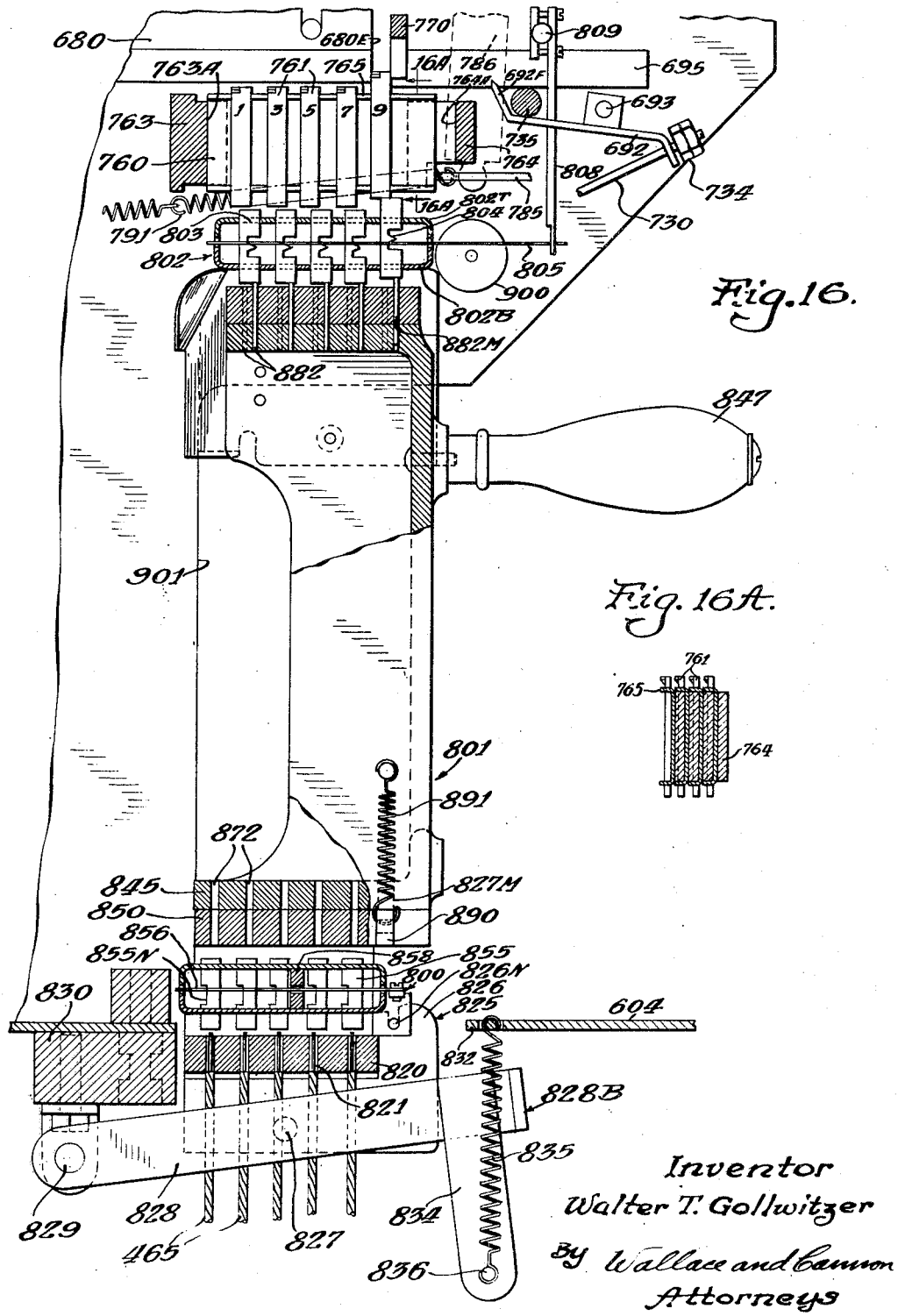
Fig. 16 is a vertical sectional view taken through the transfer frame and the related elements.
Figure 17:
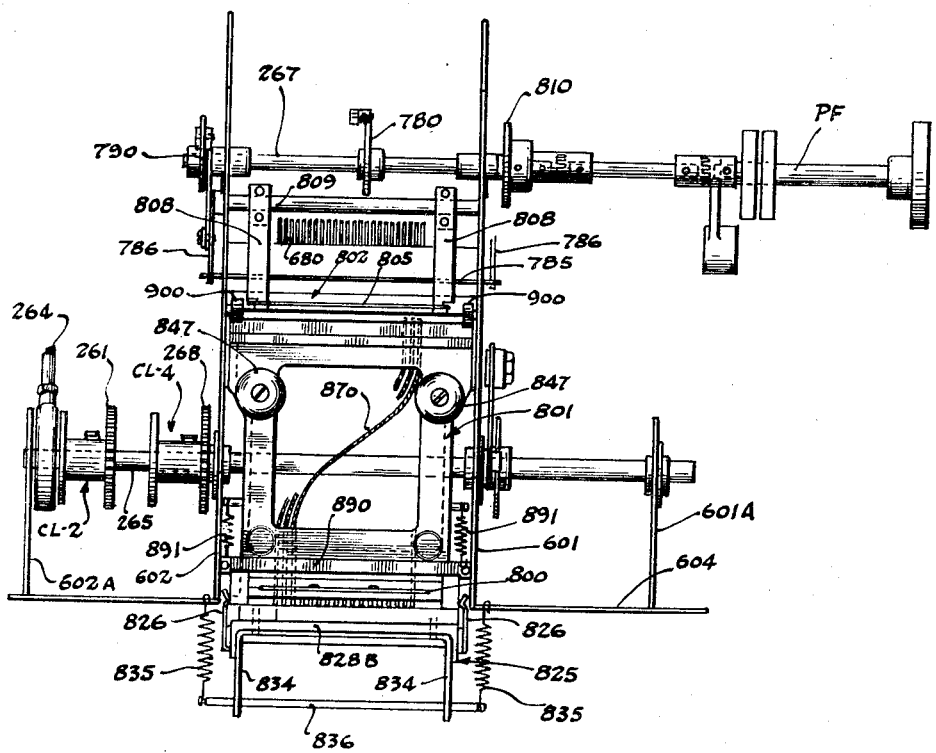
Fig. 17 is a rear view of the punch unit showing the transfer frame in its operative relationship in the punch unit.

The front and rear ends of the pin carriers 760 are mounted for sliding movement in comb bars 763 and 764, respectively, and at their upper and lower edges the carriers 760 have laterally bent flanges 765 and 766 that ride against the upper and lower edges of the teeth of the combs 763 and 764 to support the slides on the combs. The front and rear end edges of the slides are arranged to engage surfaces 763A and 764A of the respective combs to limit the sliding movement of such slides or carriers 760. The restored position of each carrier is in the forward position wherein the front end of the carrier engages the abutment surface 763A of the comb bar 763, and when the rack bars 680 are in their restored positions wherein the end of the pawl 695 is engaged with the edge 692F of the zero gate the edge 680E of the rack bar 680 is in vertical alignment with the surface 763A of the comb bar 763. Upon release of the pawl 695 from the zero gate 762, the related rack bar 680 is allowed to move in a setting direction to the right in an amount that is determined by the set positions of the several pins 761. For purposes of explanation these pins have been identified in Fig. 16 of the drawings by the digits 1, 3, 5, 7, and 9 numbered from left to right. Having in mind the code that is shown in Fig. 2A of the drawings, it will be observed that for any odd number the 9 pin will be set to its upper position as shown in Fig. 16, and this setting of the 9 pin is effective to prevent right and left movement of the related carrier 760. This result is effected by engagement of the right-hand edge of the 9 pin with the left-hand side of a comb bar 770 which serves also as a guide for the several pawls 695. Where only the 9 pin is operated the related rack bar 680 is allowed to move 9 increments or units of movement as shown in Fig. 16. Similarly, the rack bar 680 may be limited to a movement of one unit by concurrent actuation of the No. 1 pin and the No. 9 pin. Similar control may be attained through actuation of the 9 pin concurrently with the 3, 5, or 7 pin.

As to the even digits, it will be recalled that in accordance with the code of Fig. 2A, the 9 pin is not actuated, and hence carriers 760 will be free to shift in a right-hand direction and this shifting movement is limited to one unit of movement by engagement of the rear or right-hand and, Fig. 16, of the carrier 760 with the abutment surface 764A of the comb bar 764. Hence the several pins 761 will be moved with the carrier 760 one added unit to the right so that the digit 2 may be set up on the rack bar 680 by actuation of the No. 1 pin. The other even digits may of course be set up by individual actuation of the other pins 761 as described in my aforesaid Patent No. 2,513,998.

It should be pointed out that the actuation of any one of the pins 761 that is related to a particular rack bar 680 is effective to shift the related pawl 695 upwardly so as to disengage this pawl from the zero gate 692 and this permits setting movement of the rack bar 680 in a right-hand direction to the extent that is determined by the pins 761 that have been actuated.

The pawls 695 are of course returned in a left-hand direction with the rack bars 680 as such rack bars are restored, and during this restoring movement, the zero gate is down and the pawls 765 have a downward restoring movement imparted thereto which serves also to restore the pins 761 to their lower positions. This restoring action is attained through the operation of a restoring bail 775 that overlies the pawls 695 just to the right of the comb bar 770. This restoring bail 775 is guided for substantially vertical movement by a pin and slot guide mechanism 776 and at its upper end this bail is pivotally suspended at 777 from the forward end of a rocking frame 778. This rocking frame has an arm 779 extended rearwardly therefrom which rides on the edge of the restoring cam 780 and a spring 781 urges the arm 778 in an upward direction so as to normally maintain the bail 775 in an upper or ineffective position. The bail is moved downwardly through a restoring stroke at the time when the restoring of the pins 761 is to be effected.

It will be evident of course that the pin carrier 760 must also be restored, and this is accomplished by a restoring plate 785 that is suspended on the lower ends of a pair of levers 786, and these lever arms 786 are connected to a shaft 788 at their upper ends. This shaft has an arm 789 connected thereto which has a roller thereon that engages a cam 790 that is fixed on the shaft 261. A spring 791 acts on the restoring plate 785 to urge the same in a forward or restoring direction, and this acts to maintain the related cam roller in contact with the pin housing restoring cam 790.

The set up pins 761 are in the present instance actuated by means that include the Bowden cables 465, and the actuating movements are transmitted from the ends of the Bowden cables 465 to a lower transmitting pin box 800, a removable transfer frame 801 and a transmitting and locking unit 802, this locking unit 802 being permanently mounted in the machine beneath the pins 761.

The locking of the sensed pattern

Thus, as shown in Fig. 16, the transmitting and pattern locking unit 802 comprises a housing formed from sheet metal to provide top and bottom walls 802T and 802B and guide openings are formed in these top and bottom walls to slidably mount and guide a plurality of rows of transmitting and locking pins 803. These transmitting pins are arranged with five pins in each column and the number of columns corresponds to the number of rack bars 680. Each of the pins has a portion thereof cut away within the housing 802 and this cut-a-way portion affords a relatively deep rearwardly facing notch having a locking tooth 804 intermediate the ends of such cut-a-way portion. This tooth 804 in each instance provides a downwardly and rearwardly facing cam surface on the lower side of the tooth and an upwardly and rearwardly facing cam surface on the upper side of the tooth, and means are provided for engaging these cam surfaces to lock the transmitting pins 803 either in an upper set position or in a lower restored position, both of which positions are illustrated in Fig. 16 of the drawings. In accomplishing this locking action, a slidable horizontal locking plate 805 is extended through the front and rear walls of the housing of the unit 802, and this locking plate has openings therein through which the several pins 803 are extended. These openings are sufficiently large in a front to rear direction to allow the locking plate 805 to be moved rearwardly to an unlocked relationship or forwardly to a locked relationship.

The locking and unlocking movements are applied to the locking plate 805 by a pair of operating arms 808 that are fixed to and extend downwardly from a rock shaft 809. This rock shaft 809 has an arm 809A fixed thereon that carries a cam roller and this cam roller engages a cam 810 that is fixed on the shaft 267. At the time shown in the timing diagram of Fig. 30 the locking plate 805 is withdrawn in a rearward direction so that the pins 803 may be selectively moved from their lower or restored positions to their upper or actuated positions, and the locking plate 805 is then shifted in a forward direction so as to engage the lower cam surface of the tooth 804 of any pin 803 that has been actuated, and the locking plate 805 thus serves not only to lock the pin 803 in its actuated position but also to complete the upward actuation thereof in the event that this has not been accomplished by the sensing action.

The transfer frame 801

The transfer unit 801, which includes the transmitting unit 800 as a fixed part thereof, is arranged so that it may be removably mounted beneath the pattern locking unit 802, and when it is in this position, the lower end portions of the transmitting unit 800 must be in an operative motion transmitting relationship with respect to the ends of the Bowden cables 465. In order that this may be accomplished the ends of all of the Bowden cables 465 are terminated in a mounting block 820 so that the wires are normally positioned with their ends located at the upper surface of such block 820, such wires being extended through bores 821 in the block and the sheaths of the Bowden cables being anchored in such bores. The mounting block 820 forms part of a cradle 825 that has end walls 826 secured in a vertical relationship with the opposite ends of the mounting block 820, and these end walls 826 are in turn pivoted at 827 on a common horizontal axis between a pair of supporting arms 828 that form a part of a bail 828B. This bail 828B is pivoted adjacent its forward end on pivot pins 829 that are in turn supported in brackets 830 that are secured to the lower face of the top plate 604 of the lower base. The wall 604 has a relatively large opening 832 formed therein so that the cradle 825 and the mounting block 820 thereof are exposed through and are located at substantially the level of the plate 604. A pair of arms 834 are extended downwardly from the rear or free end of the bail 828B and springs 835 act between the plate 604 and a cross rod 836 in the arms 834 to urge the bail 828B in an upward direction, thereby to tend to raise the cradle 825. The side walls 826 of the cradle 825 are provided with notches 826N adjacent the rear edges thereof and these notches serve as a locating means in assuring the mounting of the transfer frame 801 in a predetermined relationship with respect to the Bowden cables 465 which terminate in the mounting block 820.

Figure 15:
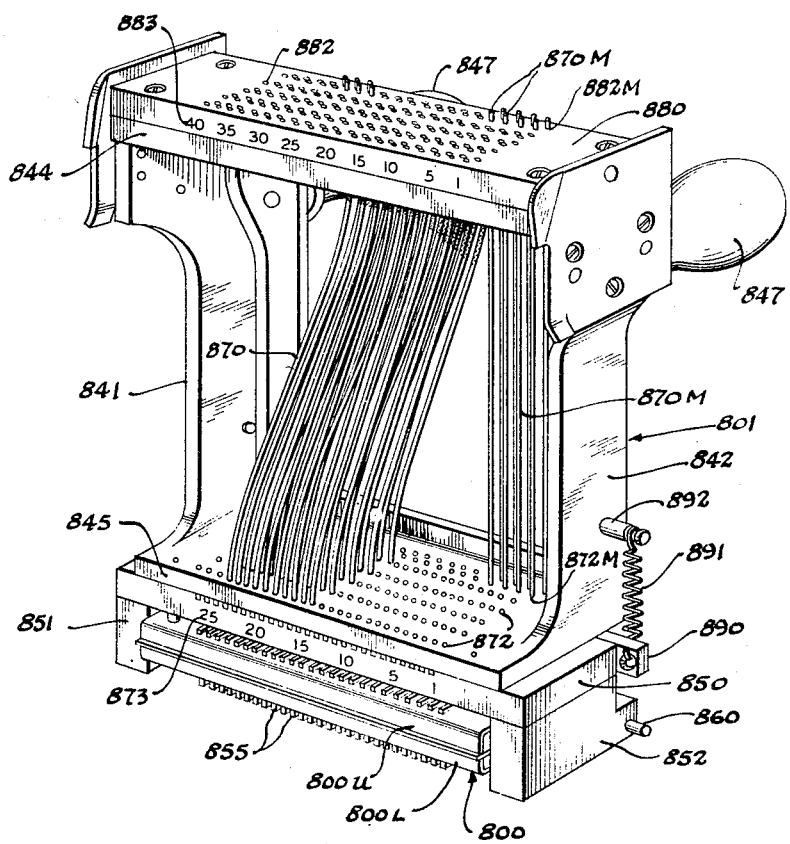
Fig. 15 is a perspective view taken so as to show the front of the transfer frame.

The transfer frame 801 is in the present instance made in the form of a casting having spaced side frame plates 841 and 842 and these side frame plates are connected at their upper and lower ends by cross webs 844 and 845. The transfer frame is provided with a pair of handles 847 that extend in a rearward direction from the side frame plates 841 and 842 adjacent to the upper ends of these plates and these handles 847 facilitate the manipulation of the frame 801 in mounting or dismounting the frame with respect to the machine. Beneath the bottom web 845, a separately formed and separately machined bottom plate 850 is secured, and adjacent to opposite ends of the bottom plate 850 a pair of mounting blocks 851 and 852 are secured so as to extend downwardly from the plate 850. The space between the blocks 851 and 852 is utilized to accommodate the transmitting unit 800 which, as shown in Figs. 15 and 16, comprises a hollow housing made from sheet metal to afford an upper section 800U and a lower section 800L. These sections have aligned openings therein to accommodate a plurality of columns of five transmitting pins 855 in each column. These transmitting pins have notches 855N in one edge thereof and a relatively thin retaining plate 856 is extended between the upper and lower sections of the housing 800 so as to engage the notches 855N and prevent endwise displacement of the pins 855 out of their mounted relationship with respect to the housing. The slots or notches 855N are of a sufficient length to permit the desired range of motion transmitting movement of the several pins. It will be observed in Fig. 16 of the drawings that a pair of spacing bars 858 are provided within the housing 800 and above and below central portions of the retaining plate 856 so as to maintain the retaining plate in a particularly centered relationship within the housing. When the transfer frame 801 is in its mounted position in the machine, the lower ends of the transmitting pins 855 are disposed over and in contact with the ends of the respective Bowden cables 465 that terminate in the mounting block 820, and this location is assured by means of locating pins 869 that are extended from the mounting blocks 851 and 852 and which are engaged with the upwardly opening mounting slots 826N that are formed in the side plates 826 of the cradle 825.

The transfer frame 801 is utilized to enable the sensing operation of the machine to set up the sensed data in any of the columns or orders of the punching apparatus regardless of the order in which such data may be formed on the printing and control device D.

Thus the numerical data derived from the printing and control device D is transmitted by the Bowden cables 465 to certain orders or columns of the transmitting unit 800, and the transfer frame 801 is so formed and arranged that transmitting means may be selectively set in place between such transmitting pins 855 and the upper portions of the transfer frame 801 that the sensed data may be rendered effective in different columns of the locking unit 802. In accomplishing this, means are provided whereby transmitting wires 870 may be put in place in the transfer frame as will be evident in Fig. 15 of the drawings.

In accomplishing this, the lower web 845 and the lower plate 850 have openings 872 formed therein in columns of five openings each and the columns are identified by column numbers 873 formed on the bottom plate 850 adjacent the forward face of the plate. These openings 872 in each column are aligned respectively with the five pins 855 of the corresponding order of the transmitting unit 800. The upper web 844 of the transfer unit has a separately formed and machined top plate 880 secured thereto and this top plate 880 and the web 844 have openings 882 formed therein through which the upper ends of the wires 870 may extend.

It will be observed that the top plate 880 provides for forty columns as indicated at 883 by numbers along the rear edge of the plate 880, and because of the relatively close spacing of these columns, the openings 882 are staggered. Such openings however, are formed with five openings in each column so as to thereby correspond to the openings 872. The wires 870 may thus be inserted downwardly through the openings 872 and extend upwardly along reverse curves and through corresponding openings in different columns of the top plate 880, thus to effect the desired transfer of the data from one order to another as desired. It will be recognized of course that the length of the wires 870 to be used must be varied in accordance with the number of columns through which the sensed data must be transferred.

It will be recognized that in those orders of the punch wherein the interposers 650A are associated with rack bars or slides 680, it may be desirable in some instances to place such interposers under the control of manually settable control slides 650M and when this is to be done it is necessary in each cycle of the machine that the related retaining pawl 695 be released. Provision for attaining this result is afforded in the transfer frame 801. Thus at the rear end of each column of openings 872, an opening 872M is afforded in the web 845 just rearwardly of the rear edge of the plate 850, and a wire 870M may be mounted with its lower end in the opening 872M and with its upper end extended through a corresponding opening 882M that is formed in the web 844 and in the top plate 880. The lower ends of the wires 872M are arranged to rest upon a yielding actuating bar 890 that extends horizontally along the rear edge of the plate 850 and is yieldingly urged in an upward direction by springs 891 that act between the bar 890 and anchoring pins 892 afforded in the side plates of the transfer frame. The pins 870M are thus yieldingly urged at all times in an upward direction so that the wires 870M project upwardly beyond the upper face of the top plate 880. The openings 882M are so positioned that the wires 870M are disposed beneath the rear one of the locking pins 803 as will be evident in Fig. 16 of the drawings so that when the transfer frame 801 is in position in the machine the wires 870M act normally to maintain the number 9 pin in that order in its upper or set position. Thus the related pawl 695 is released at all times except during the pin restoring operation of the bail 775 so that in the operation of the machine, the rack bar 680 in this order may move to the extent that is permitted by the setting of the manually controlled element 650M. The supporting bar 890 of course is yieldingly urged in an upward direction by the springs 891, and this arrangement permits normal restoring operation of the pin restoring bail 775 in respect to the pawl 695 and the several set up pins 761. The 9 pin in the orders in which the wires 870M are utilized will thus be moved downwardly in the restoring operation so as to shift the bar 890 downwardly, but upon withdrawal of the restoring bail 775, the bar 890 will act at once to move the wires 870M in an upward direction so as to thus release the related pawls 695.

In the mounting of the transfer frame 801 in the machine the pins 860 are put in position in the slots 826M and the frame 801 is forced downwardly in an amount sufficient to cause the upper end surfaces thereof to clear a pair of retaining and guiding rollers 900 that are mounted on the frame extensions 601R and 602R. The upper end of the transfer frame 801 is then tilted rearwardly until it is in the vertical position in which the rear face of the plate 880 engages an abutment face 901 on the machine frame. The cradle 825 during this period has not only been moved downwardly but has also moved through tilting movements, and upon completion of the inserting movement above described, the transfer frame 801 is allowed to move in upward direction so that its upper forward corners engage the retaining rollers 901 to maintain the transfer frame 801 on its operative position wherein the various wires 870 and 870M are properly related to the corresponding pins 803 of the locking frame 802.

Figure 31:
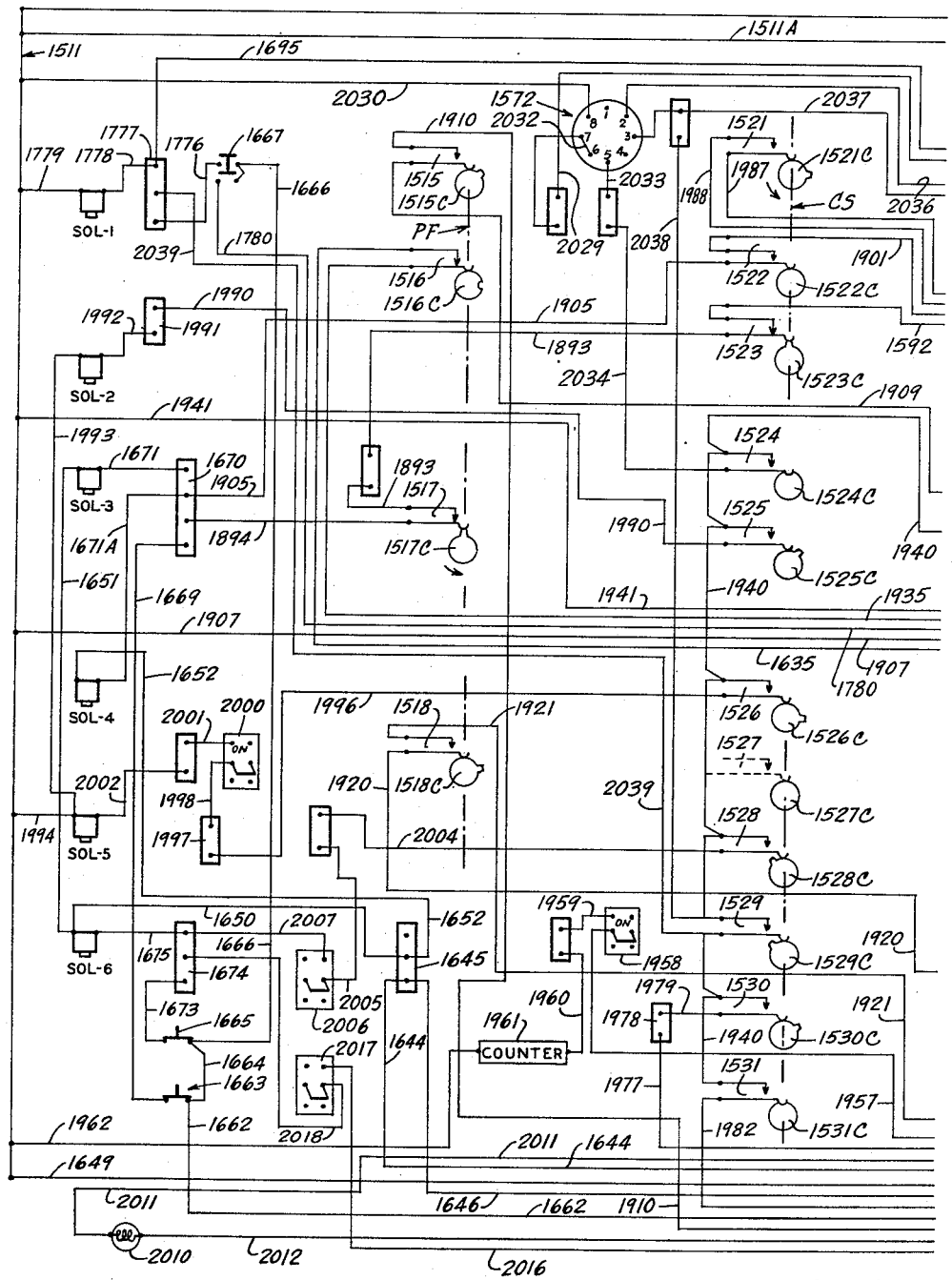
Figs. 31 and 31A, when taken together with Fig. 31 located to the left of Fig. 31A, constitute a wiring diagram showing the electrical power and control connections utilized in the machine.
Figure 31A:
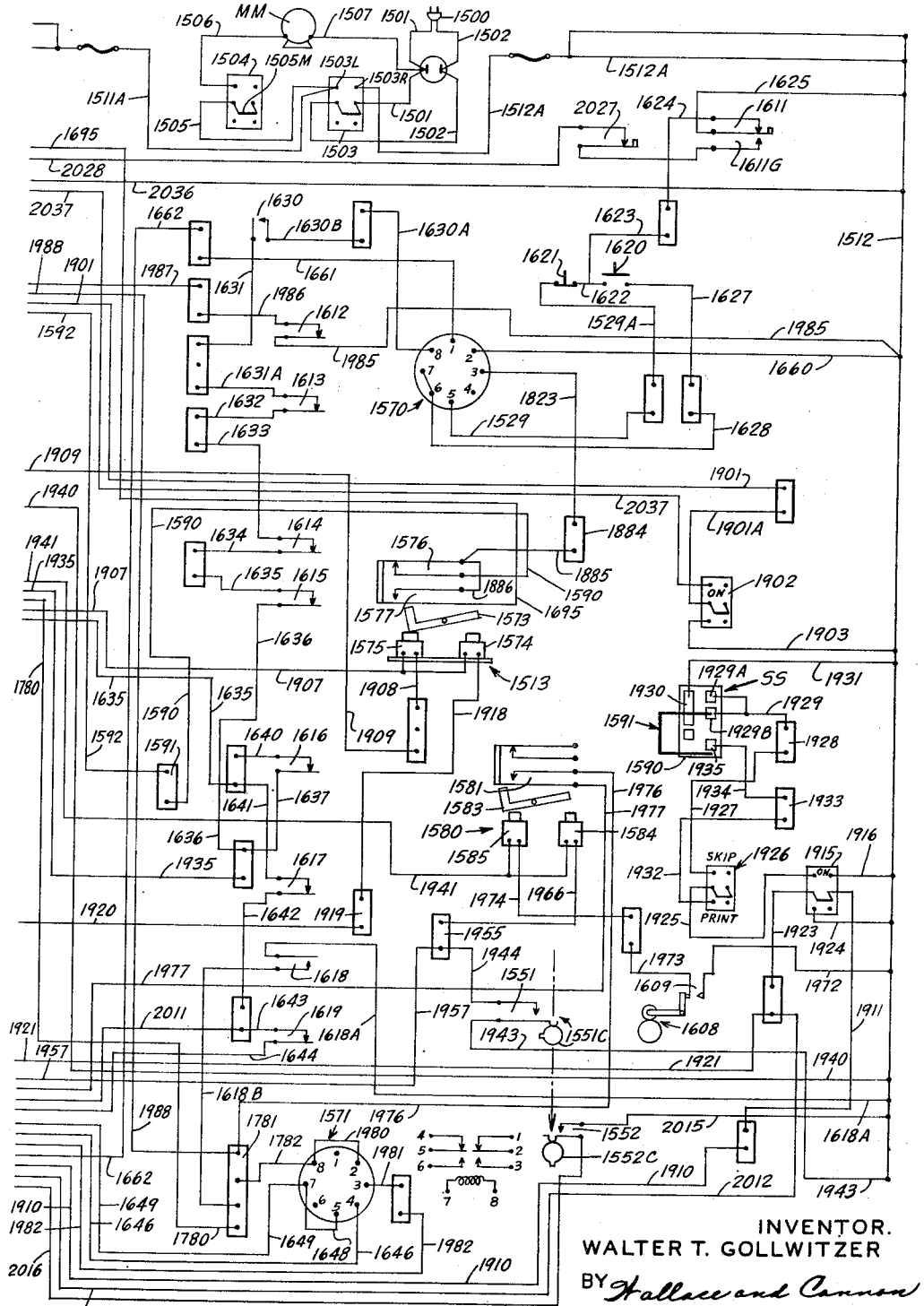

*The electrical circuits and controls, Figs. 31 and 31A*

The electrical power is supplied from a connector plug 1500 through wires 1501 and 1502 to the input terminals of a main switch 1503 which has a double pole switch member 1503M whereby circuit may be extended from the wires 1501 and 1502 respectively to output terminals 1503R and 1503L. A main motor switch 1504 has one terminal connected by a wire 1505 to the terminal 1503L, and by a movable contact 1505M, circuit may be extended to the other terminal 1504L of the switch 1504, such other terminal 1504L being connected by a wire 1506 to one terminal of the main motor MM, the other terminal of which is connected by a wire 1507 to the wire 1501. The primary control circuits for the machine are afforded between wires 1511 and 1512 that are connected respectively to the switch terminals 1503L and 1503R by wires 1511A and 1512A.

The control of the machine operation is attained primarily through timed and selective actuation of the several clutch control solenoids which are the main cam shaft clutch solenoid SOL-1, the card feed clutch solenoid SOL-2, the plate feed clutch solenoid SOL-3, the punch unit clutch solenoid SOL-4, the punch ram clutch solenoid SOL–5, and the platen clutch solenoid SOL–6, and this timed and selective control is brought about in part by the inter-related action of cam actuated timing switch means operated respectively by the plate feed drive shaft PF, the main cam shaft and the platen stop finger cam shaft 285, as well as the selector switch SS, the selector relay 1513, and various safety switches and other relays, as will be described in detail hereinafter.

Thus the plate feed drive shaft PF has a cam 1515C thereon which acts on a normally open selector relay restoring switch 1515 to close this switch for a short period at about 10° in the rotative cycle of this shaft. Another cam 1516C on the shaft PF serves to hold a plate drop safety switch 1516 closed except for a short period at substantially 90° of the cycle. A third cam 1517C on the shaft PF serves to close a normally open timing switch 1517 while the shaft PF is in its zero position, while a fourth cam 1518C on the shaft PF serves to close a normally open selector timing switch 1518 at substantially 90° of the cycle of the plate feed unit.

The main cam shaft CS has cams 1521C to 1531C fixed thereon, and these cams are arranged respectively to control normally open switches 1521 and 1531, and as shown in Fig. 31, the cams are of the form and setting utilized in consecutive operation of the machine.

Switch 1521 constitutes a card safety timing switch and is closed at substantially 90°; switch 1522 constitutes a control switch for the plate feed and is closed at substantially 240°; switch 1523 constitutes a zero position switch and is closed at substantially zero; switch 1524 constitutes a group release switch and is closed except at zero; switch 1525 constitutes a card feed switch and is closed at substantially 40°; switch 1526 constitutes a punch ram control switch and is closed at substantially 85°; switch 1527 constitutes a punch ram control switch and is closed at substantially 200°; switch 1528 constitutes a platen control switch and is closed at substantially 315°; switch 1529 constitutes a group control switch and is closed only at about 355°; switch 1530 constitutes a card safety switch and is closed at substantially 45°; and switch 1531 constitutes an emergency relay release switch and is closed at all times except when the main cam shaft CS is at zero.

The stop finger cam shaft 285 has a cam 1551C thereon which serves to close a card safety timing switch 1551 at substantially 270° of the rotative cycle of this shaft. Another cam 1552C is also fixed to this shaft and is arranged to close a second impression platen control switch 1552, this switch 1552 being connected in circuit only when the machine is being used for duplicate printing as will be described.

A start relay 1570, and emergency relay 1571 and a group control relay 1572 are provided, and these relays are of similar construction in that movable contacts 2 and 5 are engaged with contacts 1 and 4 respectively when the relays are de-energized, and are shifted into engagement with contacts 3 and 6 respectively when the relays are energized; and in each instance, the operating coil is connected across terminals 7 and 8 in the relays 1570 and 1572 the terminal 7 is connected to the terminal 6, while in the relay 1571 the terminals 5 and 7 are connected and the terminals 2 and 8 are connected.

The selector relay 1513 is of the mechanical lock-up type having a pivoted armature 1573 that may be shifted to an operated position by an operating coil 1574 or to a restored position by a restoring coil 1575. This relay has a normally closed switch 1576 that is opened by the armature 1573 in its operated position, and a normally open switch 1577 that is closed by the armature when it is in its operated position.

A similar card safety relay 1580 has a normally open switch 1581 that is closed when its armature 1583 is shifted to its operated position by its operating coil 1584, and which switch is again allowed to open when the armature is shifted to its released position by its restoring coil 1585.

The selector switch SS is of the general construction shown in my copending application Serial No. 58,742 filed November 6, 1948, and comprises a stationary contact block 1590 and a shiftable contact member 1591 that is operated by the sensing head SH as described in such application.

The card collector safety unit MS has a micrometer card sensing mechanism 1608 which is arranged to close a related safety switch 1609 when a card passes from the sheet guideway into the card collector.

The machine also has a series of normally closed safety switches 1611 to 1619, which are included in certain safety circuits as will be described. Thus, the switch 1611 constitutes card safety switch and is opened by the safety finger 252 when a card is not sensed at the initial card feed position; switch 1612 is a card safety switch that is opened by the safety sensing finger 254; switch 1613 is a plate feed drive safety switch, that is associated with an overload mechanism in the plate feed drive; switch 1614 is a punch unit drive safety switch that is associated with an overload means in the punch drive; switch 1615 is a last plate stop switch that is associated with a last plate sensing means of the magazine M; switch 1616 is a plate drop safety switch that is associated with a plate drop member 400; switch 1617 is a front chute safety switch that is associated with the collector tray 111; switch 1618 is a card safety switch that is operated by the safety sensing finger 253; and switch 1619 is the V-notch safety switch that is operated by the locating pawl 340 at the sensing position.

The starting and stopping operations of the machine are governed by a normally open push button start switch 1620 and a normally closed push button stop switch 1621 and these switches are connected in series by a wire 1622. Wires 1623 and 1624 extend from the wire 1622 to one contact of the card safety switch 1611, the other contact of which is connected by a wire 1625 to one side of the power circuit as represented by the wire 1512. Upon closure of the start switch 1620, circuit is extended from the other terminal of the switch through wires 1627 and 1628 to terminal 6 of the start relay 1570, and thus to one end of the operating coil of this relay. The other end of the operating coil is connected through a multiple-switch safety circuit from terminal 8 as will be described. When the start relay 1570 is energized, the closure of contacts 5 and 6 thereof establishes a running circuit through the stop switch 1621, and this is accomplished through wires 1629 and 1629A extended in series from terminal 5 of this relay to the other contact of switch 1621.

Thus, wires 1630A and 1630B extend in series from such terminal 8 to one contact of a punch safety switch 1630; and wires 1631 and 1632 extend from the other contact of switch 1630 to one contact of the plate feed drive safety switch 1613; wires 1632 and 1633 extend from the other contact of switch 1613 to one contact of the punch unit safety switch 1614; wires 1634 and 1635 extend from the other contact of switch 1614 to one contact of the last plate stop switch 1615; wires 1634 and 1637 extend from the other contact of switch 1615 to one contact of the plate drop safety switch 1616, it being noted that this switch 1616 is open at certain times in the cycle and is bridged with a shunt circuit at such times through the plate drop safety timing switch 1616 as will be described. The main safety circuit is extended from the other contact of the plate drop safety switch 1616 by wires 1640 and 1641 to one contact of the front chute safety switch 1617, the other contact of which is connected by wires 1642 and 1643 to one contact of the V-notch safety switch 1619. The other contact of the safety switch 1619 is connected by a wire 1644 to a terminal 1645 from which the safety circuit is extended to the line wire 1511 as will be described, through normally closed contacts 4 and 5 of the emergency relay 1571 so that the emergency relay constitutes an element of the safety circuit, and operation of the emergency relay will be effective to stop the machine. Thus the main safety circuit is extended from the terminal block 1645 by a wire 1646 to the terminal 4 of the emergency relay 1571, and when this relay is de-energized, circuit is extended between contacts 4 and 5, and by a wire 1648 to terminal 7 which is connected by a wire 1649 to the other side of the power source as represented by wire 1511.

The terminal 1645 constitutes one side of the power source for the plate feed solenoid SOL–3, the punch unit solenoid SOL–4, and the platen solenoid SOL–6, and is connected by a wire 1650 to one terminal of the platen solenoid SOL–6 and a wire 1651 is extended from the wire 1650 to one terminal of the plate feed solenoid SOL–3. Similarly a wire 1652 extends from terminal 1645 to one terminal of the punch unit solenoid SOL–4, thus rendering operation of solenoids SOL–3, SOL–4, and SOL–6 dependent upon the emergency relay 1571 being in its released condition. Thus when the emergency relay 1571 is operated, the platen solenoid, the punch unit solenoid, and the plate feed solenoid cannot be energized, and the main safety circuit is broken so as to stop the machine.

When the start relay 1570 is de-energized, it conditions certain single cycle controls for manual operation, and for this purpose a wire 1660 extends from the wire 1512 to terminal 2 of this relay. This circuit is extended by wires 1661 and 1662 from terminal 1 of this relay to one contact of a plate feed push button switch 1663. A wire 1664 extends from the wire 1662 to one contact of a single impression push button switch 1665. Thus, a wire 1666 extends from the wire 1664 to the common terminals of a double pole push button switch 1667 which serves to initiate a cycle of operation of the main cam shaft CS and also to cause a card C to be fed, as will be described. It should be noted that when the start relay 1570 is operated, the circuits to the manual switches just described are opened so that such switches are ineffective, and this constitutes an important safety feature in that it prevents damage to the machine that might otherwise result in the event of inadvertent closure of such manual switches during automatic machine operation.

Thus the switch 1663, when closed extends an energizing circuit to the plate feed clutch solenoid SOL–3, a wire 1669 being extended from the other terminal of the switch 1663 to a terminal block 1670 from which a wire 1671 extends to one terminal of the solenoid SOL–3. It will be observed that the other terminal of the solenoid SOL–3 is connected by the wires 1651 and 1650 back through the contacts of the emergency relay 1571 to the other side of the circuit as represented by the wire 1511. Similarly, a wire 1671A is extended from the terminal block 1670 to the other terminal of the punch unit solenoid SOL–4.

The single impression switch 1665 has its other contact connected by wire 1673 to the terminal block 1674 which is connected by a wire 1675 to the other terminals of the platen clutch solenoid SOL–6 so that closure of the switch 1665 causes operation of the platen.

The switch 1667 has the other terminal for one of its contact bars connected by a wire 1776 to a terminal block 1777 which in turn is connected by a wire 1778 to one terminal of the main cam shaft solenoid SOL–1, the other terminal of this solenoid being connected by a wire 1779 to the wire 1511. The other contact for the other of the contact bars of the switch 1667 is connected by a wire 1780 to a terminal block 1781 and this contact block is connected by a wire 1782 to the No. 8 terminal of emergency relay 1571 and this serves to energize the emergency relay since the contact No. 7 of this relay is connected to the wire 1511. Hence, when the card feed switch 1667 is closed, the emergency relay 1571 is operated as an incident to the starting of the main cam shaft CS, and this serves to disable the circuits to the platen solenoid, the punch unit solenoid and the plate feed solenoid which would normally be operated in a cycle of the main cam shaft.

When the start relay 1570 is in its energized or operated condition the contacts 5 and 7 thereof are engaged and this serves to afford a holding circuit for the start relay, it being recalled that terminals 6 and 7 thereof are connected. When the start relay is in its operated condition the contacts 2 and 3 thereof are also engaged, and terminal No. 2 of this relay is of course connected by the wire 1660 to the wire 1512. Contact No. 3 is connected by a wire 1883 to a terminal block 1884 from which a wire 1885 is extended to one contact of the switch 1576, of the selector relay 1513, a further extension 1886 also being provided to connect the wire 1885 to the stationary contact of the switch 1577. The switches 1576 and 1577 are parts of the selector relay 1513, and the switch 1576 is normally closed or in other words, is closed when the selector relay 1513 is in its restored relationship. When the switch 1576 is in this closed relation, circuit is extended from the other contact thereof by a wire 1590 to a terminal block 1591 from which a wire 1592 extends to one contact of the cam operated switch 1523. A wire 1893 extends from the other contact of this switch to one contact of the switch 1517, the other contact of this last switch being connected by a wire 1894 to the terminal block 1670. Hence so long as the selector relay remains in its restored condition and while the main cam shaft CS remains in its at rest or zero position, circuit will be extended through the switch 1517 each time the plate feed shaft reaches its zero position, and thus the plate feed clutch solenoid SOL–3 will be energized in each cycle of the plate feed shaft PF and the plate feed shaft will rotate continuously. If on the other hand, the main cam shaft CS is in the course of a rotative movement, the switch 1523 will be opened and the main cam shaft CS will be caused to stop until such time as the switch 1523 is again closed, or until such time as another circuit to the plate feed clutch solenoid SOL–3 is established.

When the selector relay 1513 is operated, the switch 1576 is opened and the switch 1577 is closed, and upon closure of the switch 1577, circuit is extended from its other or movable contact by a wire 1695 to the terminal block 1777, thus to complete an energizing circuit for the main cam shaft clutch solenoid SOL–1. As hereinabove pointed out this causes the switch 1576 to be opened and hence the plate feed shaft PF will come to rest at its zero position after completing its cycle. The next rotation of the plate feed shaft PF is then initiated at the proper time under control of the switch 1522, that is operated by the related cam on the main cam shaft, one contact of which switch 1522 is connected by wires 1901 and 1901A to the movable contact of a double throw group control switch 1902 which in its "off" position extends circuit to a wire 1903 that extends to the line wire 1512. The other contact of the switch 1522 is connected by a wire 1905 to the terminal block 1670 so that upon closure of the switch 1522 in the rotative movement of the main cam shaft CS, the plate feed clutch solenoid SOL–3 will be energized.

The operating and restoring coils 1574 and 1575 of the selector relay 1513 each have one terminal thereof connected to the line wire 1511 by a wire 1907, and in each rotation of the plate feed shaft PF, the restoring coil 1575 is energized so that the selector relay will be restored in the event that it has been operated in such machine cycle. Thus wires 1908 and 1909 are extended in series to one contact of the selector relay restoring switch 1515, the other contact of this switch being connected by a wire 1910 and a wire 1911 in series, to the other contact of a double throw, double pole selector switch 1915. This switch 1915 has an upper portion that constitutes the "on" position of the switch and when the center switch member is in this position, circuit is extended from the wire 1911 through a wire 1916 to the wire 1512, thus to complete the energizing circuit for the restoring coil 1575 each time the selector relay restoring switch 1515 is closed.

The operating coil 1574 of the selector relay 1513 is of course under the control of the main selector switch SS as will be described hereinafter, and a wire 1918 is extended from the other terminal thereof to a terminal block 1919 and a wire 1920 from this terminal block extends to one contact of the selector timing switch 1518. A wire 1921 from the other contact of the selector timing switch 1518 extends to a terminal block 1922 and a wire 1923 extends from this terminal block to the other center contact of the selector "off-on" switch 1915. When the movable member of this switch is in its "off" position circuit is extended from the wire 1923 through the switch and a wire 1924 to the wire 1512. In the other or "on" position of the selector "off-on" switch 1915, circuit is extended from the wire 1923 through a wire 1925 to a print-skip switch 1926 that is used as described in my aforesaid copending application to alter or revise the selecting action of the selector switch SS. Thus the wire 1925 connects to the center contact of the double throw print-skip switch 1926 and when the movable switch member is in its upper or skip position circuit is extended through a wire 1927 to what may be termed a skip terminal block 1928 from which a wire 1929 and a branch lead extend to a pair of contacts 1929 and 1929A on the stationary block 1590 of the selector switch SS. In certain positions of the movable member 1591 of this switch SS these stationary contact members may be connected with another stationary contact member 1930 which is in turn connected by a wire 1931 to the line wire 1512.

In its other position, the movable member of the print-skip switch 1926 extends circuit from the wire 1925 to a wire 1932 which is connected to what may be termed a print terminal 1933 and a wire 1934 extends from this terminal and is connected with a stationary contact 1935. As described in my aforesaid copending application, the closure of a circuit by the selector switch SS is accomplished in accordance with the sensed identifying means on the printing devices D that are passed through the machine, and whenever such a circuit is completed, the selector relay 1513 is operated due to closure of circuit through the operating coil 1574 thereof. As hereinbefore pointed out, this operation of the selector relay causes an operation of the main cam shaft CS to be initiated.

In the operation of the plate feed unit, the switch 1516 is opened in each cycle to serve as a timing means in the plate drop safety circuit, during the time when the plate drop safety switch 1616 is opened. Thus a wire 1935 extends from the wire 1637 to one contact of the switch 1516, and a wire 1936 from the other contact of this switch extends to the wire 1640. Thus at the time when the plate drop safety switch 1616 is to be normally closed by the action of the plate drop mechanism, the circuit through the switch 1516 will be opened so as to thereby render the switch 1616 effective to accomplish its desired function.

Of the other switches that are controlled by the main cam shaft, one contact of each switch is connected to the wire 1512 by a wire 1940, such wire extending from the line wire 1512 to one contact of each of the switches 1525, 1526, 1528, 1530 and 1531.

The card safety relay 1580 has one terminal of each of its coils 1584 and 1585 connected by a wire 1941 to the line wire 1511. The card safety relay 1580 is energized in each rotation of the stop finger cam shaft 285 by the closure of the switch 1551. Thus a wire 1943 is extended from the line wire 1512 to one contact of the switch 1551, and a wire 1944 extends from the other contact of this switch to a terminal block 1955. A wire 1966 extends from this terminal block to the other terminal of the operating coil 1584 of the card safety relay 1580, and thus the card safety relay is operated each time the stop finger cam shaft 285 is rotated. A further circuit is extended from the terminal 1955 by a wire 1957 to a counter switch 1958 and from this switch wires 1959 and 1960 extend in series to one terminal of an electrically operated counter 1961, the other terminal of which is connected by a wire 1962 to the line wire 1512.

The card safety relay 1580 is restored in each properly completed machine cycle through the action of the card as it leaves the printing device guideway. Thus the card passes through or between the micrometer wheels of the safety device 1608 and this causes the related micrometer switch 1609 to be closed. One contact of this switch 1609 is connected by a wire 1972 to the line wire 1512 and the other contact of this switch 1609 is connected by wires 1973 and 1974 to the other terminal of the restoring coil 1585 of the card safety relay 1580.

When the card safety relay 1580 is in its operated condition, the switch 1581 thereof is maintained in its closed position, and this conditions, but does not complete, an operating circuit for the emergency relay 1571. Thus, it will be recalled, that terminal 7 of this relay is directly connected by the wires 1649 to the line wire 1511, and that the terminal 8 of this relay is connected to the terminal block 1781. A wire 1976 is extended from the terminal block 1781 to one contact of the switch 1581 and a wire 1977 is extended from the other contact of this switch to a terminal block 1978 which is connected by a wire 1979 to the other contact of the card safety switch 1530. Thus the operating circuit for the emergency relay 1571 is conditioned by operation of the card safety relay 1581, and if the card has not passed out of the guideway so as to close the micrometer switch 1609, and cause restoring of the card safety relay 1580, then the closure of the switch 1530 early in the next cycle of the main cam shaft CS completes a circuit so that the emergency relay is operated. When the emergency relay 1571 is thus operated a holding circuit for such relay is established. This holding circuit is afforded by a wire 1980 that connects terminals 2 and 8 of the emergency relay, and when this relay is operated contact 2 of this relay is engaged with contact 3 thereof. The holding circuit is extended from contact 3 by wires 1981 and 1982 in series, to the other contact of the cam operated switch 1531 which at this time will be in its closed relationship so that circuit will be extended through the wire 1940 back to the line wire 1512. The switch 1531 is arranged to open when the main cam shaft reaches its zero position and thus the emergency relay 1571 is released at this time after having caused the plate feed solenoid, the platen solenoid and the punch unit solenoid to be disabled and after having caused the start relay 1570 to be released so as to stop the machine.

The emergency relay may also be operated by the card safety switch 1618, one contact of which is connected by a wire 1618A to the line wire 1512, and the other contact of which is connected to the terminal block 1781 by a wire 1618B.

The card safety switch 1521 is arranged in a circuit with the related card safety switch 1612. Thus a wire 1985 is extended from the line wire 1512 to one contact of the switch 1612 and the wires 1986 and 1987 in series connected to the other contact of this switch to one contact of the timing switch 1521. The other contact of the switch 1521 is connected by a wire 1988 to the terminal block 1781. This circuit is utilized to energize the emergency relay 1571 and thus stop the machine in the event that the card has not passed at the proper time from the punch to the printing position. Thus if the card has remained in an intermediate zone between these two positions, the safety finger will strike such card and will not open the switch 1612, and hence upon closure of the timing switch 1521, the circuit will be completed to the emergency relay 1571 so as to stop the machine.

The card feed switch 1525 has one contact thereof connected to the line wire 1512 by the wire 1940 and a wire 1990 is extended from the other contact of this switch to a terminal block 1991 from which another wire 1992 is connected to the card feed clutch solenoid SOL-2, a wire 1993 extends from the other terminal of this solenoid SOL-2 to one terminal of the solenoid SOL-5, and a wire 1994 extends from this terminal to the line wire 1511. Thus upon closure of the cam controlled switch 1525, the card feed solenoid SOL-2 will be energized.

The cam controlled switch 1526 governs the operation of the punch ram, and one contact of this switch is connected to the line wire 1512 as hereinbefore described. The other contact of this switch is connected by a wire 1996 to a terminal block 1997 from which a wire 1998 extends to one contact of an "off-on" switch 2000 whereby the punch ram may be rendered inoperative. Wires 2001 and 2002 extend in series from the other contact of this switch to the other terminal of the punch ram solenoid SOL-5, thus to afford the desired energized circuit of the solenoid under the control of the switch 1526.

The platen is governed by the switch 1528 and the other contact of this switch is connected by wires 2004 and 2005 in series to one contact of a platen control switch 2006. The other contact of this switch is connected by a wire 2007 to the terminal block 1674 which it will be recalled is connected by a wire 1675 to one terminal of the solenoid SOL-6, thus the solenoid SOL-6 may be energized by closure of the cam controlled switch 1528.

The presence of a print plate at the printing station of the machine is indicated by a signal light 2010 that has a circuit which extends through the V-notch safety switch 1619 and through the contacts 4 and 5 of the emergency relay 1571. Thus, a wire 2011 extends from one terminal of the light 2010 to the wire 1643 at the switch 1619, the other contact of which is connected by the wire 1644 to the terminal block 1645, thus to be connected through contacts 4—5 of the emergency relay 1571 to the line wire 1511 when the emergency relay 1571 is de-energized. The other terminal of the light 2011 is connected by a wire 2012 to the wire 1923 of the selector circuits, and when the selector switch SS is set in a position which selects a printing device for a print operation, circuit for the light 2010 is extended through the switch SS and back to the line wire 1512.

Figure 30:
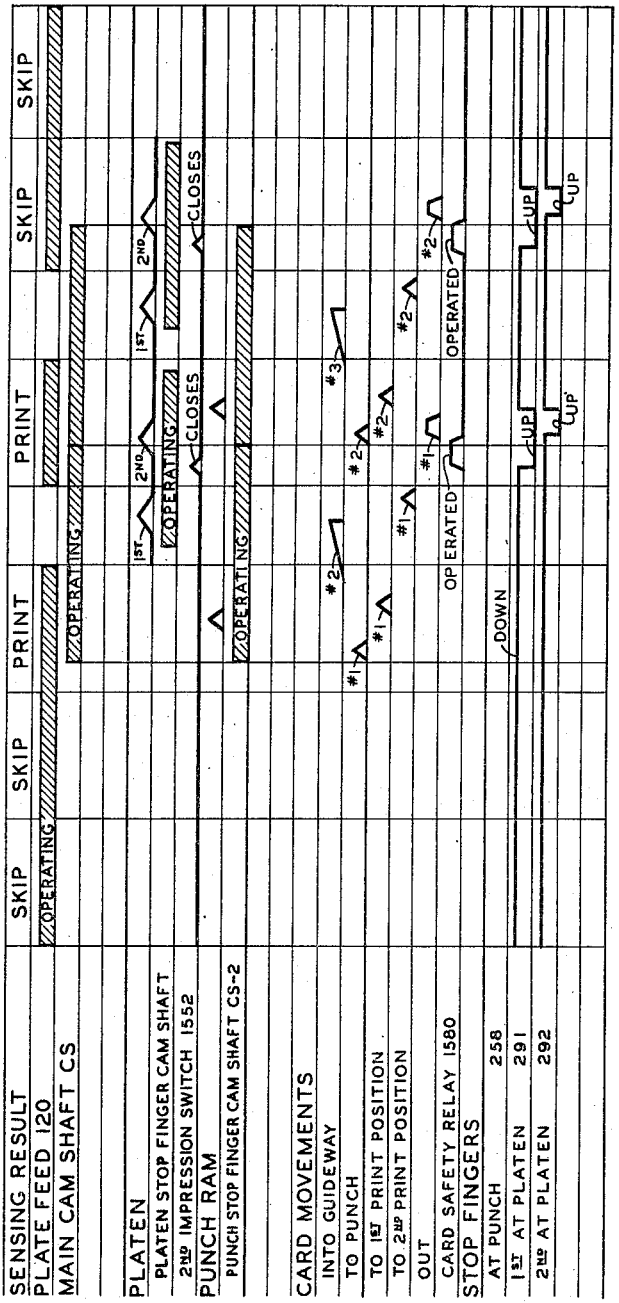
Fig. 30 is a similar timing chart showing the timing of the elements in duplicate operation of the machine.

When the machine is to be used for duplicate printing operations, the gearing to the stop finger cam shaft 285 is changed, a different cam shaft CS is put in place so as to change the timing of certain machine functions, such as the operation of the platen solenoid, and the switch 1552 is utilized to initiate a second operation of the platen P. Thus, one contact of this switch is connected by a wire 2015 to the line wire 1512, while the other contact is connected by a wire 2016 to one stationary contact of a duplicate control switch 2017. The movable contact of this switch is connected by a wire 2018 to the wire 1675 so that closure of the switch 1552 serves to energize the platen clutch solenoid SOL-6, thus to initiate another cycle of the platen P. In this connection it should be observed that in duplicate operation the change gear 248 to the main cam shaft CS is changed to produce a slower speed in the main cam shaft CS, and the change gears 283 are set so that the platen stop finger cam shaft 285 makes but one-half of a revolution for each rotation of the platen operating cam shaft 280. The timing of the machine attained in such duplicate operation is shown in Fig. 30.

When dividend checks or the like are to be produced, the present machine is particularly advantageous in that the process of group printing may be used to print the extensions or money amounts that result from multiplication of a first factor such as the number of shares which is relatively fixed and may be represented by the coded perforations 168 in a printing plate D, and a second factor such as a dividend rate which may be changed from time to time. Thus, the cards C may be printed and punched to produce the printed name and address, and to produce the punched numerical data 168C such as the number of shares derived from the perforations 168. The cards C are then sorted into groups according to the number of shares thus indicated, with group header cards GC at the head of each group, and the machine is set up for group printing and punching as will now be described, to print the extended money amounts on the checks.

Thus, the group control switch 1902 is shifted to its "On" position so as to render certain control functions of the group relay 1572 effective, and the selector switch 1915 is set in its "Off" position.

In such group printing, whenever a normal card is sensed by the two safety fingers 251 and 252, the switch 1611 which is associated with the sensing finger 251, remains closed so that the main safety circuit remains unbroken, and the machine continues operation. In this connection it should be noted that the sensing finger 251 is brought down slightly ahead of the finger 252, and is arranged to remain down until slightly after the finger 252 is raised, this being important in the attainment of the safety sensing action of the finger 251 as will be described.

When a group card GC is sensed by passage of the finger 252 through the opening in a group card GC, the switch 1611 is opened so as to release the start relay 1570 and thereby tend to stop the machine at the end of the cycle, and a normally open switch 1611G is closed so as to extend circuit from the wire 1625 through a wire 2026 to a second safety switch 2027 which is normally closed. This switch 2027 is arranged however to be opened by the sensing finger 251 when no card is present so that the finger 251 serves as a safety means which renders the switch 1611A ineffective when no card is in fact present at the time when the switch 1611G is closed. When a group card GC is thus sensed, circuit is extended from the other contact of the switch 2027 by wires 2028 and 2029 to the No. 7 terminal of the group relay 1572, the No. 8 terminal of which is connected by a wire 2030 to the line wire 1511. Thus, the group relay is operated upon sensing of a group card GC. When thus operated, a holding circuit is established, terminals 7 and 6 being connected together by a wire 2032, and contacts 6 and 5 being closed at this time. Contact No. 5 is connected by wires 2033 and 2034 to the other contact of the group release switch 1524, such switch being closed at the time when the relay 1572 is operated, and being arranged to open when the main cam shaft CS reaches its zero position, thus to release the relay 1572 at the end of the cam shaft cycle.

When the sensing of a group card causes operation of the group relay 1572, the resulting closure of contacts 2—3 of this relay conditions a circuit for the plate feed solenoid SOL-3, such circuit being through the switch 1522 that is controlled by the main cam shaft CS. Thus, a wire 2036 extends from the line wire 1512 to contact No. 2 of the relay 1572, and a wire 2037 extends to the upper or "on" contact of the group switch 1902. This circuit is extended by wires 1901A and 1901 to the plate feed switch 1522 so that in the cycle when the relay 1572 is operated, the subsequent closure of the switch 1522 causes operation of the plate feed clutch CL-3.

The closed contacts 2—3 of the group relay also extend circuit from the line wire 1512 through a wire 2038 to one contact of the group punch final cycle switch 1529 which upon closure late in the cycle of the cam shaft CS, extends circuit through a wire 2039 to the main cam shaft solenoid SOL-1, thus to cause another or final rotation of the cam shaft CS. Such closure of the switch 1529 occurs of course just prior to the opening of the group relay holding circuit by the switch 1524. In this final rotation of the cam shaft CS, the group card GC is advanced successively to punching and printing stations and perforations are formed and an impression of the money amount from the newly advanced group plate GP is made on the group card GC. The processed group card GC is discharged of course into the card collector, and since the start relay 1570 has been released at the time of the sensing of the group card GC, the machine will stop upon completion of the final cycle in which the group card was processed. The machine operator may thus remove the processed group card from the card collector for the purpose of verifying the extended money amount that is set up in the machine, and if this amount is correct, automatic machine operation may again be initiated by actuating the start switch 1620.

It will be observed that in group printing operations, the setting of the selector switch 1915 in its "Off" position results in leaving the selector relay 1513 constantly in its set position. This causes continuous operation of the main cam shaft CS so long as the start relay 1570 is in its operated condition. Hence when the machine has stopped after the final cycle in which a group card GC has been processed, the machine may again be started by closure of the start switch 1620. Such closure of the start switch 1620 again causes operation of the start relay 1570, which is held in its operated condition by its holding circuit so as to cause continuous machine operation until such time as the next group card is sensed.

*Consecutive operation*

When the machine is to be operated for consecutive printing wherein but one impression is to be made from each selected printing device, the manual controls of the punch unit PU are set so as to provide for data perforations representative of the fixed data such as date, ledger number and the like. This is accomplished by setting of the manually settable interposers 650M and the manually settable control elements 650M-1 in the manner illustrated in Fig. 11 of the drawings.

The printing and control devices D that are to be used in a particular run of the machine will have the numerical data representing perforations formed therein in a uniform manner and in particular orders of the data representing field thereof, and this numerical data may of course be punched into the cards C in any selected columns of the card, this being accomplished by setting of the transfer elements 870 in the transfer frame 801. This transfer frame 801 is therefore set up in accordance with the orders in which the numerical data appear on the printing and control devices D that are to be used and further in accordance with the particular columns of the card in which such data are to be perforated. Further, if fixed data are to be represented by perforations in any columns of the card wherein automatically operated interposers 650A are present, the transfer frame 801 is set up with control wires 870M in those columns where the control members 680 must be released in each cycle of the punch. After the transfer frame 801 has thus been set up, it is placed in position in the machine so that it may effect transfer of the sensed data from the Bowden cables 465 to the set-up pins 761 of the punching unit.

The printing devices D are then loaded into the magazine M and the cards C are loaded into the card magazine CM.

Since the operation of the machine that is being described is to be normal consecutive operation, the group switch 1902 is turned to its lower or off position, and the duplicate control switch 2017 is also turned to its off position, thus to disable the switch 1552. As hereinabove pointed out the second stop finger 292 at printing position that is utilized only in duplicate operation of the machine may be blocked or held continuously in its upper or ineffective position and this must of course be done in this instance. It should be observed however, that in some instances the particular timing of the stop finger 292 may be such that it does not interfere with consecutive operation of the machine and in such instance, the stop finger need not be blocked as aforesaid.

Since the machine is to operate in consecutive printing, the stop finger cam shaft 285 is set through adjustment of its change gearing so as to operate in a one-to-one relationship with respect to the platen operating cam shaft 280. In addition, the cam shaft CS that is in place in the machine must be one which has the cams thereof set for consecutive printing, and the change gear 248 which drives the cam shaft CS must be such that the cam shaft CS operates at its highest speed which is the speed that is needed for consecutive printing operation of the machine.

The main motor MM is then started by the closure of the main motor switch 1504, and the main switch 1503 is closed so as to energize the main power lines 1511 and 1512 of the control circuits of the machine.

With the machine thus conditioned, it is necessary to advance the first one of the printing and control devices D into sensing position, and this is accomplished by momentary closure of the manual plate feed switch 1663. This causes operation of the plate feed unit 120, in the course of which the first printing and control device D is advanced into sensing position beneath the sensing head SH. With the machine timed in the manner disclosed in Fig. 29 of the drawings, it is necessary to have the first card C advanced from the card magazine CM so as to be in position opposite the card magazine and in the sheet guideway CG, and this is accomplished by momentary actuation of the manual card feed switch 1667. Such operation of the card feed involves an operation of the main cam shaft CS, in the normal course of which the platen P and the plate feed unit 120 would be operated, but as hereinabove pointed out the closure of the card feed switch 1667 also serves to energize the emergency relay 1571 which serves when thus energized to disable the means which would, in the normal rotation of the main cam shaft, cause operation of the plate feed unit 120 and the platen P. Thus the operation of the manual card feed switch 1667 results only in a feeding of a card C into the initial position in the card guideway opposite the card magazine CM.

When the foregoing operations have been completed, the machine is ready to start on its normal course of automatic operation, and this is accomplished through momentary closure of the manual start switch 1620. This switch closure causes the start relay 1570 to be energized and a holding circuit for this relay is afforded through number 5 and 6 contacts of the relay and through the manual stop switch 1621 as well as through the various safety switches and through the normally closed safety contacts 4 and 5 of the emergency relay 1571.

When the start relay 1570 is thus operated, closure of the contacts 2 and 3 thereof closes a circuit to the common contacts of the switches of the selector relay 1513, and at this time in the machine cycle the selector relay 1513 is in its restored position wherein the switch 1576 is closed and the switch 1577 is open. Circuit is thus extended by closed switch 1576 through the zero position switch 1523 of the main cam shaft unit and through the zero position switch 1517 of the plate feed unit 120 and this serves to complete circuit to the control solenoid SOL-3 so as to cause closure of the plate feed clutch CL-3. A cycle of operation of the plate feed unit 120 is thus initiated, and if the operation of the sensing head SH in this cycle indicates that the printing and control device D that is sensed is one from which an impression is not to be made, then the return of the zero position cam 1518C on the plate feed shaft PF to its zero position will cause another cycle of the plate feed unit 120 to be initiated immediately upon completion of the first cycle thereof. Such continuous operation of the plate feed unit will continue, of course, so long as the result of the sensing operation constitutes a skip indication.

In each cycle of operation of the plate feed unit 120 a large number of different functions take place at times indicated in the timing chart of Fig. 29. Thus the selector switch SS is restored early in the cycle and the previous sensing or data pattern that has been locked up on the pins 803 of the pattern lock unit 802 is unlocked and the pins 761 and 803 are restored to their normal down positions through the operation of the restoring bail 775. The pin housings or carriers 760 are also restored to their forward positions by operation of the restoring plate 785. The rack bars 680 are also restored as shown in the timing chart of Fig. 29 and the rack bar locking pawls 710 are released. During the restoring of the rack bars 680, the pins 761 and their housings are first restored, and are then re-set in accordance with the new sensing operation, and hence, at the end of the restoring action, those rack bars 680 with respect to which one or more pins 761 have been set, are free to move to the right through their new setting movements while those rack bars 680 with respect to which no pins 761 have been set, are held in their restored positions by the zero gate 692 which is at this time in its upper or effective position as shown in Fig. 29.

The printing device D that is located at sensing position is sensed by downward movement of the sensing head SH, and the sensing switch SS set in accordance with the tabs 165 that are sensed by the pins 468P. The spring pins 468 of the sensing head SH are also effective to sense the numerical data represented by coded perforations in the printing and control device D that is at sensing position, and the Bowden cables 465 are effective through the transmitting pins 855 and the transfer wires 870 to actuate and set the locking pins 803 and the corresponding set-up pins 761. After the setting movement of the pins 803 and 761 has been accomplished the locking plate 805 is shifted to its effective or locking position, and the rack bars 680, the pawls 695 of which have been released, move to their set positions and are locked in these set positions by the locking pawls 710. The sensing head SH is then withdrawn, and as will be evident in Fig. 29, this takes place relatively early in the cycle of operation of the plate feed unit. While the above described operations are in progress, the carrier bars 333 are moving through their rearward movement, and as soon as the printing device D at sensing position has been freed by upward withdrawing movement of the sensing head SH, the rack bars start their forward or advancing movement and the printing device that is at sensing position is engaged almost immediately and the forward movement thereof is started as indicated in Fig. 29 so that this printing device comes to rest at printing position at substantially the end of the cycle of operation of the plate feed unit.

In the example that is being described, the sensing of the tabs 165 by the pins 468P will be assumed to have set the selector switch SS in its "skip" position, and hence the circuit to the selector relay will not be completed. Hence the selector relay 1513 will remain in its restored position in which it has been set at the very beginning of the plate feed cycle, and as hereinabove pointed out, the next cycle of the operation of the plate feed unit 120 will be immediately initiated, and there will be no printing operation in respect to the printing device D that has been fed into printing position.

When an operation of the sensing head SH sets the selector switch SS in its "print" position, the operating circuit for the selector relay 1513 will be completed when the selector timing switch 1518 is closed, the time of such closure being indicated in Fig. 29. The operation of the selector relay 1513 serves to open the switch 1576, thus to break the circuit which would normally initiate the next cycle of operation of the plate feed unit 120, and as a result the plate feed unit 120 will come to a stop at the end of its cycle. The operation of the selector relay 1513 also closes the switch 1577, and this completes a circuit to the solenoid SOL–1 which causes the main cam shaft clutch CL–1 to be engaged so as to start rotation of the main cam shaft CS. It should be observed in this regard that the selector relay 1513 is actuated to its restored position due to closure of the switch 1515 and that this takes place in the first part of the cycle of the shaft PF. One of the first functions that results from this cam shaft operation is the initiation of a feeding movement of the card C from its initial position in the card guideway CG toward the punch unit PU. This is accomplished by lowering of the feed wheel 241 which is governed by the cam shaft section CS–2.

At the time when this advancing movement of the card C is initiated the stop finger 258 at the punching unit is in its lowered or effective position, and the card C therefore comes to rest in the throat of the punch and in a proper relationship to the punching elements. The main cam shaft CS then causes the switch 1526 to be closed so as to thereby energize the punch ram solenoid SOL–5. This causes the punch ram clutch CL–5 to be engaged so that the punch ram 626 moves downwardly through a punching cycle. In this punching cycle the data perforations will be punched in the card C in accordance with the setting of the interposers that has been made in the last cycle of the plate feed unit 120. As the punches 611 start on their upward or withdrawing movement, the stop finger 258 is raised so that as soon as the punches 611 have been withdrawn, the card C is free to be advanced to the printing position. Such advance is caused by the feed roller 243 which has downward pressure applied at this time, and the card is advanced to the feed roller 244 which feeds the card onto the feed belt 202 which completes the advancing movement to the stop finger 291 which is then in its lowered position at the printing station. The operation of the platen P is then initiated by closure of the switch 1528 which energizes the platen control solenoid SOL–6.

The operation of the platen P by the platen cam shaft 280 serves also to operate the stop finger cam shaft 285 so that upon completion of the printing operation the stop finger 291 is raised and the card C is released for discharge to the collecting hopper K. In the course of rotation of the stop finger cam shaft 285, the switch 1551 is closed so as to cause the card safety relay 1580 to be operated to its "set" position, and this card relay remains in its set position until discharge of the card C through the micrometer switch unit MS causes the relay 1580 to be operated to its restored position. In the event that the card C does not pass through the micrometer switch unit MS, the emergency relay 1571 is operated, so as to stop the operation of the machine. If however, the card is discharged properly through the micrometer switch unit MS, the card safety relay 1580 is restored in proper time so that an operation of the machine will not be interrupted.

It will be observed that in the operation of the machine as thus described, the printing and control device D has been sensed, the punching unit PU has been set up and operated and the punched card has been advanced to printing position and an impression has been made thereon, and all of this has been accomplished in a single cycle of operation of the machine so that upon completion of this cycle there are no partially processed cards in the machine.

In the course of the operation of the main cam shaft, the plate feed unit 120 remains idle for a length of time that is dependent upon the amount of time that is required for the card feeding, punching and printing operations that are to be performed, and at a time in the cycle of the main cam shaft which is determined by the aforesaid considerations, the switch 1522 is closed so as to initiate another cycle of operation of the plate feed unit 1520. The operation of the machine as a whole then proceeds with the operation of the plate feed unit 120 interrupted or suspended only in those cycles where printing operations are required, and even then, the idle periods of the plate feed unit are determined only by the time that is required for performance of the required card feeding, punching and printing operations.

In the operation of the machine as aforesaid, the safety sensing fingers 252, 253 and 254 are effective to check on the presence of a card at different positions along the card guideway. Thus, the presence of a card at the initial position in this guideway is checked by the sensing finger 252, and if no card is sensed, the switch 1611 is opened so as to release the start relay 1570 and stop operation of the machine.

At the time when a card should be in position at the punch, the sensing finger 253 is operated, and if a card is not sensed, the switch 1618 is closed so as to energize the emergency relay 1571 and thus stop the machine.

The card sensing finger 254 is operated at a time when the card should have passed from the punch and through the intermediate space into the printing station, and if the card is still in this intermediate space, the finger 254 will fail to open the switch 1612, and the emergency relay will be operated so as to stop the machine.

Duplicate operation

Where the machine is to be operated for duplicate printing, the card magazine CM must in most instances be set to receive a larger or double length card, and the cam shaft 285 is set by means of the gears 283 so as to run through a complete revolution for two revolutions of the platen operating cam shaft. The duplicate switch 2017 is, of course, closed, and a different cam shaft CS is put in place and the cam shaft speed is reduced by substitution of a new gear 248. If the stop finger 292 has been blocked, such blocking is released, and the machine is then ready for operation which is initiated by the same manual operations of the card feed switch 1667 and the plate feed switch 1663, followed by operation of the start switch 1620, as hereinabove described in connection with consecutive operation of the machine.

As will be apparent in the duplicate timing chart of Fig. 30, the first platen operation occurs much earlier in the cycle of the main cam shafts CS, and since the second impression switch 1552 has been rendered effective, its closure by the cam shaft 285 results in a second operation of the platen P. The card feed movements take place as shown in Fig. 30, and it will be observed that the speed of the main cam shaft CS has been reduced in an amount just sufficient to allow for initiation of the second platen cycle just prior to the completion of the main cam shaft cycle. This, of course, increases the idle periods between cycles of the plate feed unit, as shown in Fig. 30. The total length of the machine cycle is, however, increased only in an amount sufficient to allow for the added printing cycle of the platen P.

It will be apparent of course that through the use of added stop fingers such as the stop fingers 291 and 292, the provision of added switch means such as the switch 1522, and by further reduction of the speed of the cam shaft CS, the multi-print operation of the machine may readily be extended to more than two impressions.

Group printing operation

Where the machine is to be used in accordance with the group printing system to punch and print extended money amounts on checks and like documents, the machine may be set for either consecutive or duplicate printing of such money amounts, and such setting is effected as hereinabove described. In addition, the selector switch 1915 is set to its "off" position, and the group control switch is set to its "on" position. The sorted groups of cards C, with group control cards GC as header cards for each group, are put in place in the card magazine CM, and the corresponding group plates GP in corresponding sequence are placed in the magazine M. The machine is then started by operation of the plate feed switch 1663 and the card feed switch 1667, in succession. The machine will operate, of course, to sense the group card GC at the initial position in the guideway CG, and the group relay 1572 will be operated so as to cause sensing of the group plate GP at sensing position so as to set up the punch unit, and the plate is then fed into printing position. The final cycle control switch 1529 will close in the same cycle of the main cam shaft CS, thereby to cause a final cycle of the main cam shaft in which the group card GC will be advanced and processed, after which the machine will stop.

After verifying the processed group card GC, the operator closes the start switch 1670, and the machine then operates to punch the extended money amount in each card C and will then print such extended amount on the card, and this will be repeated until the next group card GC is sensed, at which time the start relay 1570 will be released, the next group printing device GP will be sensed and fed into printing position, and a final cycle of the machine will take place in which the extended money amount from the new group printing device GP will be punched in and printed on the new group card GC. The verifying and machine starting operations are then repeated as above described.

Conclusion

From the foregoing description it will be apparent that the present invention enables business instruments to be produced at an extremely high and sustained production rate, and that the machine possesses flexibility in its mechanical and electrical organization whereby such high production capabilities may be maintained in duplicate or other multiprint operations. Moreover, it will be evident that the machine of the present invention is effective in each cycle to perform all of the processing operations in respect to a document, thus to avoid leaving a partially processed document in the machine when the machine stops.

It will also be apparent that under the present invention, the data that is to be punched into the documents is set up in the punching unit in such a way that the production of the machine is increased, and this is attained in such a way that stoppage of the machine does not cause a troublesome lapse in the machine production. This avoids the necessity for special operations in respect to those printing devices or business instruments that are in the machine at the time of stoppage.

It will also be evident that the present invention affords a data transfer means in the path of transmission of the sensed data whereby the order or column in which the data appears on the documents may readily be changed and determined; and this transfer means under the present invention provides for convenient use of manual control in any of the orders of the punching unit even though such orders may be arranged for normal automatic setting under control of the sensing means.

It will also be evident that the present invention avoids the usual dangers caused by sticking of the punches, and this is accomplished in such a way as to terminate machine operation when such an undesirable condition develops.

The present invention also provides an improved adjustable stop finger mechanism whereby accuracy of location of the sheets is assured in the different positions.

It will also be evident that the present invention simplifies and reduces the cost of producing accurate and accurately related punch guiding and die blocks.

Thus, while I have illustrated and described the preferred embodiment of my invention, it is to be understood that this is capable of variation and modification.

I claim:

1. In a printing machine through which printing devices, each adapted to bear identifying means at one or more identifying positions thereon are adapted to be fed successively to sensing and printing stations, sensing means at said sensing station for sensing such identifying means, printing device feeding means for feeding printing devices from one station to the next, a plate feed shaft having a one-revolution plate feed clutch for driving the same, means driven by said plate feed shaft and operable in a one revolution cycle of said plate feed shaft to operate said sensing means and then to operate said feeding means to advance the printing device that has just been sensed, impression means located at said printing station and operable through an impression movement for making an impression from a printing device located at printing station stop finger means located at said printing station and operable to position a sheet at such station, a common drive means effective on said impression means and said stop finger means in timed relation and including a one-revolution impression clutch, sheet feeding means for feeding sheets to said printing station, a main cam shaft having a one-revolution drive clutch, means normally operable to effect continuous engagement of said plate feed clutch, means governed by said sensing means operable, when the sensed identifying means indicates that an impression is to be made from the sensed printing device, to effect engagement of said main cam shaft clutch, means governed by said main cam shaft in a rotative cycle thus initiated to effect disengagement of said plate feed clutch at the end of the cycle of plate feed shaft to thereby stop said plate feed shaft, means operable by said main cam shaft to effect engagement of said impression clutch to cause a printing operation, and means operable by said main cam shaft, after said plate feed shaft has remained idle for a period equal to the added time required for such printing operation, to effect engagement of said plate feed clutch to initiate the next cycle of operation of the plate feed shaft.

2. In a machine for producing business instruments and the like, a printing device supply and feed unit through which printing devices, each adapted to bear identifying means at one or more identifying positions thereon, are adapted to be fed one by one into sensing and printing positions, said unit including sensing means at said sensing position for sensing the identifying means of said printing devices, and said unit also including printing device advancing means for feeding printing devices in a step by step manner into said positions, a plate feed shaft operable through a one-revolution cycle, means operated by said plate feed shaft operable in the first portion of its cycle to actuate said sensing means through a sensing and return movement, means operated by said plate feed shaft after completion of the sensing and return movements of such sensing means to advance the printing device that has just been sensed from said sensing position to said printing position, platen means at said printing position operable through a printing stroke for producing a printed impression on a sheet from a printing device at printing position, sheet feeding means including a sheet guideway along which a sheet may be advanced into and out of said printing position, stop finger means for bringing such a sheet to a stop in said printing position, a stop finger cam shaft for operating said stop finger means, means for operating said platen means and said stop finger cam shaft in timed relation including a one-revolution platen control clutch, a main cam shaft, means for driving said main cam shaft including a one-revolution main cam shaft clutch, means for driving said plate feed shaft including a one-revolution plate feed clutch, means normally operable to effect continued engagement of said plate feed clutch whereby said unit operates continuously during such continuous engagement, means governed by said sensing means operable, when the sensed identifying means indicates that an impression is to be made from the sensed printing device, to effect engagement of said main cam shaft clutch, means governed by said main cam shaft in a rotative cycle thus initiated to cause feeding of a sheet by said sheet feeding means to said printing position, means operated by said main cam shaft to effect disengagement of said plate feed clutch at the end of the cycle of plate feed shaft to thereby stop said plate feed shaft, means operable by said main cam shaft to effect engagement of said platen clutch to cause printing operation of said platen, and means operable by said main cam shaft, after said plate feed unit has remained idle for a period equal to the added time required for such sheet feeding and printing operations, to effect engagement of said plate feed clutch to initiate the next cycle of operation thereof.

3. In a machine for producing business instruments, a printing device guideway along which printing devices each adapted to bear data representations may be advanced successively and in a step-by-step manner to sensing and printing positions, sensing means at said sensing station movable into and out of sensing cooperation with such data representations, plate feed means in said guideway for advancing printing devices therealong, a plate feed shaft having a one-revolution drive clutch and operable to actuate said sensing means early in a cycle of said plate feed shaft and then to operate said plate feed means to advance the printing device that has just been sensed into printing position, a selective punching unit embodying a plurality of punches, settable selecting members for such punches, settable set-up elements for governing the setting of said selecting members, a first locking means for locking said set-up elements in set positions, and a second locking means for locking said selecting members in set positions, restoring means for said selecting members, means for locking and releasing said second locking means in timed relation to said restoring means, means operated by said sensing means for shifting said set-up elements to set positions, and means operated by said plate feed shaft for locking said first locking means immediately upon completion of the setting of said set-up elements so as to enable prompt termination of the sensing cooperation of said sensing means with respect to such data representations.

4. In a machine for producing business instruments, a printing device guideway along which printing devices each adapted to bear data representations may be advanced successively and in a step-by-step manner to sensing and printing positions, sensing means at said sensing station movable into and out of sensing cooperation with such data representations, plate feed means in said guideway for advancing printing devices therealong, a plate feed shaft having a one-revolution drive clutch and operable to actuate said sensing means early in a cycle of said plate feed shaft and then to operate said plate feed means to advance the printing device that has just been sensed into printing position, a selective punching unit embodying a plurality of punches, settable selecting members for such punches, settable set-up elements for governing the setting of said selecting members, a first locking means for locking said set-up elements in set positions, restoring means for said selecting members, means operated by said sensing means for shifting said set-up elements to set positions, and means operated by said plate feed shaft for locking said locking means immediately upon completion of the setting of said set-up elements so as to enable prompt termination of the sensing cooperation of said sensing means with respect to such data representations.

5. In a printing machine through which printing devices, each adapted to bear data representations as well as identifying means at one or more identifying positions thereon, are adapted to be fed successively to sensing and printing stations, sensing means at said sensing station for sensing such identifying means, printing device feeding means for feeding printing devices from one station to the next, a plate feed shaft having a one-revolution plate feed clutch for driving the same and operable in a one revolution cycle to operate said sensing means and then to operate said feeding means to advance the printing device that has just been sensed, punching unit defining a punching station and having selectively operable punches, interposers settable for selecting said punches, operating members for setting two respective interposers, set-up elements operated by said sensing means in accordance with sensed data representations for governing the setting of said operating members, a punch ram for operating the selected punches and having a one-revolution punch ram clutch, locking means for securing said operating elements in set positions, a punch unit shaft having a one revolution punch unit clutch for driving the same and operable to restore said operating members and to operate said locking means to hold said operating members in set positions until the end of the cycle of said punch unit shaft, means operable by said punch unit shaft for restoring said set-up elements late in the cycle of said punch unit shaft, impression means and stop finger means at said printing station, and having a common drive means including a one-revolution impression clutch, sheet feeding means for feeding sheets to said punching and printing stations successively, a main cam shaft having a one-revolution drive clutch, other stop finger means operated by said main cam shaft to stop each sheet at punching station, means normally operable to effect continuous engagement of said plate feed clutch, means governed by said sensing means operable, when the sensed identifying means indicates that a document is to be produced from and under control of the sensed printing device, to effect engagement of said main cam shaft clutch, means governed by said main cam shaft in a rotative cycle thus initiated to effect disengagement of said plate feed clutch at the end of the cycle of plate feed shaft to thereby stop said plate feed shaft, means operable by said main cam shaft to effect engagement of said punch ram clutch, means operable by said main cam shaft to effect engagement of said impression clutch to cause a printing operation, and means operable by said main cam shaft, after said plate feed shaft has remained idle for a period equal to the added time required for such punching and printing operations, to effect engagement of said plate feed clutch to initiate the next cycle of operation of the plate feed.

6. In a printing machine through which printing devices, each adapted to bear data representations as well as identifying means at one or more identifying positions thereon, are adapted to be fed successively to sensing and printing stations, sensing means at said sensing station for sensing such identifying means, printing device feeding means for feeding printing devices from one station to the next, a plate feed shaft having a one-revolution plate feed clutch for driving the same and operable in a one revolution cycle to operate said sensing means and then to operate said feeding means to advance the printing device that has just been sensed, punching unit defining a punching station and having selectively operable punches, interposers settable for selecting said punches, operating members for setting two respective interposers, set-up elements operated by said sensing means in accordance with sensed data representations for governing the setting of said operating members, a punch ram for operating the selected punches and having a one-revolution punch ram clutch, locking means for securing said operating elements in set positions, a punch unit shaft having a one revolution punch unit clutch for driving the same and operable to restore said operating members and to operate said locking means to hold said operating members in set positions until the end of the cycle of said punch unit shaft, means operable by said punch unit shaft for restoring said set-up elements late in the cycle of said punch unit shaft, impression means and stop finger means at said printing station, and having a common drive means including a one-revolution impression clutch, change speed means for driving said stop finger cam shaft in a different ratio with respect to said impression means, sheet feeding means for feeding sheets to said punching and printing stations successively, a main cam shaft having a one-revolution drive clutch, change speed means for driving said cam shaft clutch, means for replaceably mounting said cam shaft in relation to its clutch, other stop finger means operated by said main cam shaft to stop each sheet at punching station, means normally operable to effect continuous engagement of said plate feed clutch, means governed by said sensing means operable, when the sensed identifying means indicates that a document is to be produced from and under control of the sensed printing device, to effect engagement of said main cam shaft clutch, means governed by said main cam shaft in a rotative cycle thus initiated to effect disengagement of said plate feed clutch at the end of the cycle of plate feed shaft to thereby stop said plate feed shaft, means operable by said main cam shaft to effect engagement of said punch ram clutch, means operable by said main cam shaft to effect engagement of said impression clutch to cause a printing operation, and means operable by said main cam shaft, after said plate feed shaft has remained idle for a period equal to the added time required for such punching and printing operations, to effect engagement of said plate feed clutch to initiate the next cycle of operation of the plate feed.

7. In a machine for producing business instruments, through which printing devices, each adapted to bear printing means, and to bear identifying means at one or more identifying positions thereon as well as to bear numerical data representations, are adapted to be fed successively to sensing and printing stations, sensing means at said sensing station or sensing such data representations and such identifying means, printing device feeding means for feeding printing devices from one station to the next, a plate feed unit operable in a cycle thereof to operate said sensing means and then to operate said feeding means to advance the printing device that has just been sensed, impression means and stop finger means disposed at said printing station and having a common drive means, sheet feeding means for feeding sheets from an initial position in succession to punching and printing stations, a variable punching unit at said punching station settable under control of said sensing means in accordance with the plate representations sensed by said sensing means, a main cam shaft having a one-revolution cycle, governing means normally operable to effect continuous operation of said plate feed unit, means governed by said sensing means operable, when the sensed identifying means indicates that an impression is to be made from the sensed printing device, to effect a cycle of said main cam shaft, means governed by said main cam shaft in a rotative cycle thus initiated to stop said plate feed unit at the end of the cycle of the plate feed unit, means operable by said main cam shaft to initiate a cycle of operation of said punching unit and said impression means in succession, and means operable by said main cam shaft, after said plate feed unit has remained idle for a period equal to the added time required for such punching and printing operation, to initiate the next cycle of operation of the plate feed, and group control means settable to an effective relation and effective when so set to modify the action of said governing means to render said main cam shaft continuously operable, and to render said governing means ineffective to cause continuous operation of said plate feed unit, and sensing means at said initial position to sense a group control sheet and effective in response to such sensing to cause a single operation of said plate feed unit and to stop said main cam shaft.

8. In a machine for producing business instruments, through which printing devices, each adapted to bear printing means, and to bear identifying means at one or more identifying positions thereon as well as to bear numerical data representations, are adapted to be fed successively to sensing and printing stations, sensing means at said sensing station for sensing such data representations and such identifying means, printing device feeding means for feeding printing devices from one station to the next, a plate feed unit operable in a cycle thereof to operate said sensing means and then to operate said feeding means to advance the printing device that has just been sensed, impression means and stop finger means disposed at said printing station and having a common drive means, sheet feeding means for feeding sheets from an initial position in succession to punching and printing stations, a variable punching unit at said punching station settable under control of said sensing means in accordance with the plate representations sensed by said sensing means, a main cam shaft having a one-revolution cycle, governing means normally operable to effect continuous operation of said plate feed unit, means governed by said sensing means operable, when the sensed identifying means indicates that an impression is to be made from the sensed printing device, to effect a cycle of said main cam shaft, means governed by said main cam shaft in a rotative cycle thus initiated to stop said plate feed unit at the end of the cycle of the plate feed unit, means operable by said main cam shaft to initiate a cycle of operation of said punching unit and said impression means in succession, and means operable by said main cam shaft, after said plate feed unit has remained idle for a period equal to the added time required for such punching and printing operation, to initiate the next cycle of operation of the plate feed, and group control means settable to an effective relation and effective to render said main cam shaft continuously operable, and to render said governing means ineffective to cause continuous operation of said plate feed unit, and sensing means at said initial position to sense a group control sheet and effective in responsive to such sensing to cause a single operation of said plate feed unit and to stop said main cam shaft.

9. In a printing machine adapted for group printing operation and through which group printing and control devices, each adapted to bear numerical printing means and numerical data representations are adapted to be fed successively to sensing and printing stations, sensing means at said sensing station for sensing such identifying means, printing device feeding means for feeding printing devices from one station to the next, a plate feed shaft having a one-revolution plate feed clutch for driving the same and operable in a one revolution cycle to operate said sensing means and then to operate said feeding means to advance the printing device that has just been sensed, punching unit defining a punching station and having selectively operable punches, interposers settable under control of said sensing means for selecting said punches, operating members for setting the respective interposers, set-up elements operated by said sensing means in accordance with sensed data representations for governing the setting of said operating members, a punch ram for operating the selected punches and having a one-revolution punch ram clutch, locking means for securing said operating elements in set positions, a punch unit shaft having a one revolution punch unit clutch for driving the same and operable to restore said operating members and to operate said locking means to hold said operating members in set positions until the end of the cycle of said punch unit shaft, means operable by said punch unit shaft for restoring said set-up elements late in the cycle of said punch unit shaft, impression means and stop finger means at said printing station, and having a common drive means including a one-revolution impression clutch, sheet feeding means for feeding sheets from an initial position to said punching and printing stations successively, a main cam shaft having a one-revolution drive clutch, other stop finger means operated by said main cam shaft to stop each sheet at punching station, group control means normally operable to effect continuous engagement of said main cam shaft clutch, group sensing means at said initial position operable to sense group control sheet at such position and operable, when such a group control sheet is sensed, to effect engagement of said plate feed clutch for one revolution and to effect disengagement of the main cam shaft clutch after one additional revolution thereof, means operable by said main cam shaft in each rotation thereof to effect engagement of said punch ram clutch, and means operable by said main cam shaft to effect engagement of said impression clutch to cause a printing operation.

10. In a multiple-order punching apparatus having cooperating punch guide and die blocks and punches mounted in said guide block in a plurality of columns each including a plurality of punches, a punch ram having stripping means associated with the respective punches for withdrawing the same to normal positions, a plurality of interposers disposed between said punch ram and said punch guide and each adapted for setting movement along a particular column of said punches to select a punch in such column for punching operation, means for setting said interposers including a motion transmitting lever for each interposer pivoted at one end to said interposer, said levers each having a laterally extended slot intermediate its ends, a pivot rod embraced by said slots, spring means urging the intermediate portions of said levers in one direction laterally of said pivot rod to engage said slots with said rod to afford a normal pivotal relation between said levers and said rod, and means acting on the ends of said levers for imparting controlled setting movements in said one direction to said other ends of said levers and for imparting restoring movements to said other ends of said levers in the opposite direction.

11. In a multiple-order punching apparatus having cooperating punch guide and die blocks and punches mounted in said guide block in a plurality of columns each including a plurality of punches, a punch ram having stripping means associated with the respective punches for withdrawing the same to normal positions, a plurality of interposers disposed between said punch ram and said punch guide and each adapted for setting movement along a particular column of said punches to select a punch in such column for punching operation, means for setting said interposers including a motion transmitting lever for each interposer pivoted at one end to said interposer, said levers each having a laterally extended slot intermediate its ends, a pivot rod embraced by said slots, spring means urging the intermediate portions of said levers in one direction laterally of said pivot rod to engage said slots with said rod to afford a normal pivotal relation between said levers and said rod, means for imparting controlled setting movements in one direction to said levers and for imparting restoring movements to said levers in the opposite direction, a safety sensing bail disposed adjacent to said levers in position to be moved by any such lever when said lever is displaced laterally of said pivot rod, and means responsive to such movement of said bail for disabling said punching apparatus.

12. In a multiple-order punching apparatus having cooperating punch guide and die blocks and punches mounted in said guide block in a plurality of columns each including a plurality of punches, a punch ram having stripping means associated with the respective punches for withdrawing the same to normal positions, a plurality of interposers disposed between said punch ram and said punch guide and each adapted for setting movement along a particular column of said punches to select a punch in such column for punching operation, means for setting said interposers including a motion transmitting lever for each interposer pivoted at one end to said interposer, a pivot rod, means including springs urging the intermediate portions of said levers in one direction laterally of said pivot rod to maintain said levers in a normal pivotal relation to said rod, means connected to the other ends of the respective levers for imparting controlled setting movements in said one direction to said other ends of said levers and for imparting restoring movements to said other ends of said levers in the opposite direction.

13. In a multiple-order punching apparatus having cooperating punch guide and die blocks and punches mounted in said guide block in a plurality of columns each including a plurality of punches, a punch ram having stripping means associated with the respective punches for withdrawing the same to normal positions, a plurality of interposers disposed between said punch ram and said punch guide and each adapted for setting movement along a particular column of said punches to select a punch in such column for punching operation, means for setting said interposers including a motion transmitting lever for each interposer pivoted at one end to said interposer, yieldable pivot means for the levers arranged to afford a normal pivotal relation for said levers and adapted to yield when undue resistance to movement is encountered, means for imparting controlled setting movements in one direction to said levers and for imparting restoring movements to said levers in the opposite direction, and means for disabling said apparatus responsive to such yielding of one of said levers.

References Cited in the file of this patent

UNITED STATES PATENTS

| Number | Name | Date |
|---|---|---|
| 1,134,822 | Cross | Apr. 6, 1915 |
| 1,763,163 | Lasker | June 10, 1930 |
| 1,817,631 | Lake | Aug. 4, 1931 |
| 1,959,854 | Cameron | May 22, 1934 |
| 1,962,146 | Hampton | June 12, 1934 |
| 1,976,352 | Maul | Oct. 9, 1934 |
| 2,016,705 | Bryce | Oct. 8, 1935 |
| 2,042,516 | Elliott | June 2, 1936 |
| 2,069,918 | Gegenheimer | Feb. 9, 1937 |
| 2,132,413 | Gollwitzer | Oct. 11, 1938 |
| 2,133,136 | Gollwitzer | Oct. 11, 1938 |
| 2,222,860 | Sedgwick | Nov. 26, 1940 |
| 2,228,330 | Torkelson | Jan. 14, 1941 |
| 2,259,574 | Lillquist | Oct. 21, 1941 |
| 2,265,222 | Benes | Dec. 9, 1941 |
| 2,327,176 | Cory | Aug. 17, 1943 |
| 2,356,995 | Gollwitzer | Aug. 29, 1944 |
| 2,388,528 | Curtiss | Nov. 6, 1945 |
| 2,451,213 | Gollwitzer | Oct. 12, 1948 |
| 2,511,670 | Gollwitzer | June 13, 1950 |
| 2,540,198 | Gantnel | Feb. 6, 1951 |
| 2,542,658 | Garbell | Feb. 20, 1951 |